United States Patent Office
3,332,845
Patented July 25, 1967

3,332,845
COMPOSITIONS AND METHODS OF USE OF DIHALOGENATED ALKANE AMIDES
Alexander R. Surrey, Albany, N.Y., assignor to Sterling Drug Inc., New York, N.Y., a corporation of Delaware
No Drawing. Original application Oct. 8, 1959, Ser. No. 845,102, now Patent No. 3,143,566, dated Aug. 4, 1964. Divided and this application Apr. 13, 1964, Ser. No. 359,408
6 Claims. (Cl. 167—65)

This invention relates to compositions of matter of the class of N,N'-di-[halogenated-(lower-alkanoyl)]diamine derivatives, to intermediates and processes for their preparation, to their use, and to compositions for using them.

This application is a division of my copending application Ser. No. 845,102, filed Oct. 8, 1959, now U.S. Patent No. 3,143,566, which in turn is a continuation-in-part of my copending application Ser. No. 587,937, filed May 29, 1956, now abandoned, which claims certain embodiments of the instant invention, namely N,N'-bis[halogenated - (lower - alkanoyl)] - N,N' - disubstituted - 1, 4 - (and 1,3) - bis(aminomethyl)benzene derivatives, as well as intermediates and processes for forming these compounds and discloses compositions for the use of these compounds. Application Ser. No. 845,102 discloses and claims in addition to said subject matter of application Ser. No. 587,937 other related N,N'-di-[halogenated-(lower-alkanoyl)]-diamines, processes for their preparation and use and compositions comprising all of the above said N,N'-di-[halogenated-(lower-alkanoyl)]-diamines.

An aspect of my invention are the N,N'-di-[halogenated - (lower - alkanoyl)] - N,N' - disubstituted - diamines having the general structural formula I

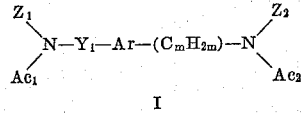

I where $Y_1$ is lower-alkylene; $m$ is a number from 0 to 6 inclusive and $C_mH_{2m}$ represents lower-alkylene when $m$ is from 1 to 6; Ar is a lower-divalent-aromatic radical; $Ac_1$ and $Ac_2$ each are halogenated-(lower-alkanoyl); and, $Z_1$ and $Z_2$ are members selected from the group consisting of hydrocarbon radicals of the formula R, hydroxyalkyl radicals of the formula —$Y_2$—OH, hydrocarbonoxyalkyl radicals of the formula —$Y_2$—O—R, acyloxyalkyl radicals of the formula —$Y_2$O—Ac', cyanoalkyl radicals of the formula —$Y_2$—CN and carbamylalkyl radicals of the formula —$Y_2$—$CONH_2$, where $Y_2$ is alkylene having from two to six carbon atoms and having its two free valence bonds on different carbon atoms, R is hydrocarbon radical having from one to eight carbon atoms and Ac' is carboxylic-acyl having from one to eight carbon atoms.

Another aspect of my invention are the N,N'-di-[halogenated - (lower - alkanoyl)] - N,N' - disubstituted - diamines having the general structural formula II

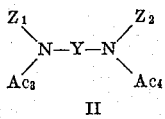

II where Y is selected from the group consisting of $$C_xH_{2x}(C_nH_{2n-2})C_yH_{2y}$$

and alkylene having from two to sixteen carbon atoms, wherein said alkylene can be interrupted by members selected from the group consisting of O, S, SO, $SO_2$, NH, N(lower-alkyl), N(lower-alkenyl), N(lower - alkynyl), N[halogenated - (lower - alkanoyl)], CH=CH and C≡C, where $x$ and $y$ each are numbers from 0 to 6 inclusive and $n$ is an integer from 3 to 8 inclusive, $C_xH_{2x}$ and $C_yH_{2y}$ each representing lower-alkylene when $x$ and $y$ each are from 1 to 6 and $C_nH_{2n-2}$ representing cycloalkylene; $Ac_3$ and $Ac_4$ each are halogenated-(lower alkanoyl) having from two to three halogen atoms; and $Z_1$ and $Z_2$ are members selected from the group consisting of hydrocarbon radicals of the formula R, hydroxyalkyl radicals of the formula —$Y_2$—OH, hydrocarbonoxyalkyl radicals of the formula —$Y_2$—O—R, acyloxyalkyl radicals of the formula —$Y_2$—O—Ac', cyanoalkyl radicals of the formula —$Y_2$—CN and carbamylalkyl radicals of the formula —$Y_2$—$CONH_2$ where $Y_2$ is alkylene having from two to six carbon atoms and having its two free valence bonds on different carbon atoms, R is a hydrocarbon radical having from one to eight carbon atoms and Ac' is carboxylic-acyl having from one to eight carbon atoms.

The compounds represented by Formulas I and II have been tested by standard chemotherapeutic evaluation procedures in vivo in hamsters and also in vitro and found to possess amebacidal activity. Many of them have been tested by standard endocrinological procedures in rats and found to possess gonadal hormone potentiating effects and antispermatogenic properties.

In the above Formula I $Y_1$ represents lower-alkylene and, also, when $m$ is an integer from 1 to 6 inclusive $C_mH_{2m}$ represents lower-alkylene each as illustrated by —$CH_2$—, —$CH_2CH_2$—, —$CH_2CH_2CH_2$—, $$-\text{CH}(\text{CH}_3),\ -\text{CH}(\text{C}_2\text{H}_5),\ -\text{CH}_2\text{CHCH}_3$$

—$CH(CH_3)CH_2$—, —$C(CH_3)_2CH_2$—, —$(CH_2)_4$—,

—$(CH_2)_5$—

—$(CH_2)_6$—, and the like. When $m$ is 0, i.e., zero, in Formula I, the nitrogen atom substituted by $Z_2$ and $Ac_2$ is linked directly to a ring-carbon atom of the lower-divalent-aromatic radical Ar.

The lower-divalent-aromatic radical as represented in Formula I by Ar has from one to three aromatic rings each having five or six ring-atoms which are carbocyclic or heterocyclic, as illustrated by divalent radicals derived from benzene (e.g., 1,3-phenylene, 2-chloro-1,4-phenylene), naphthalene, anthracene, pyridine, quinoline, isoquinoline, acridine, pyrimidine, furan, thiazole, thiophene, and the like. The two connecting linkages of Ar are each bound to any available carbon atom of the aromatic rings; and the aromatic rings can be further substituted with substituents, for example, halo, lower-alkoxy, lower - alkyl, lower - alkylsulfinyl, lower - alkylsulfonyl, nitro, hydroxy, trihalomethyl, di-(lower-alkyl)amino, and other related substituents which are unreactive or selectively unreactive under the reaction conditions used for the preparation of the intermediates and final products. Furthermore, said substituents can be in any of the available positions of the Ar nucleus, and where more than one substituent, they can be the same or different and can be in any of the various position combinations relative to each other. The halo substituents can be chloro, bromo, iodo or fluoro. The lower-alkoxy, lower-alkyl, lower-alkylmercapto, lower-alkylsulfinyl, lower-alkylsulfonyl substituents and the lower-alkyl radicals of said di-(lower-alkyl)amino substituent, have preferably from one to six carbon atoms, as illustrated by methoxy, ethoxy, methylenedioxy, ethylenedioxy, n-propoxy, isopropoxy, n-butoxy, isobutoxy, 2-butoxy, n-pentoxy, n-hexoxy, and the like, when lower-alkoxy; methyl, ethyl, n-propyl, isopropyl, n-butyl, isobutyl, 2-butyl, n-pentyl, n-hexyl, and the like, when lower-alkyl; methylmercapto, ethylmercapto, isobutylmercapto, n-hexylmercapto, and the like, when lower-alkylmercapto; methylsulfinyl, n-propylsulfinyl, isopentylsulfinyl, and the like, when lower-alkylsulfinyl; methylsulfonyl, isopropylsulfonyl, n-butylsulfonyl, and the like, when lower-alkylsulfonyl; and, dimethylamino, ethyl-methylamino, di-n-butylamino, di-n-hexylamino, and the like, when di-(lower-alkyl)amino.

In the above Formula I the halogenated-(lower-alkanoyl) radicals designated as $Ac_1$ and $Ac_2$ can be the same or different and each can have preferably from one to four carbon atoms and from one to three halogen atoms, as illustrated by chloroformyl(chloromethanoyl), chloroethanoyl), bromoacetyl, iodacetyl, fluoroacetyl, dichloroacetyl, dibromoacetyl, diiodoacetyl, difluoroacetyl, bromochloroacetyl, chlorofluoroacetyl, trichloroacetyl, tribromoacetyl, bromodichloroacetyl, chlorodibromoacetyl, dichlorofluoroacetyl, chloroiodoacetyl, 2-chloropropanoyl(alpha-chloropropionyl), 3-chloropropanoyl (beta-chloropropionyl), 2-bromopropanoyl, 2,2-dichloropropanoyl, 2,2-diiodopropanoyl, 2,2-dibromopropanoyl, 2,2-difluoropropanoyl, 2,3 - dichloropropanoyl, 2-bromo-3-chloropropanoyl, 2,2,3-trichloropropanoyl, 2-chlorobutanoyl (alpha-chlorobutyryl), 3-chlorobutanoyl, 4-chlorobutanoyl, 2,2-dichlorobutanoyl, 2,3-dibromobutanoyl, 2,2-dibromobutanoyl, 2,3,4-trichlorobutanoyl, 2,2,3-tribromobutanoyl, and the like.

The hydrocarbon radical R in each of Formulas I and II has from one to eight carbon atoms, and is, for instance, alkyl, alkenyl, alkynyl, cycloalkyl, cycloalkylalkyl, phenyl, alkylated-phenyl, benzyl or phenethyl, as further illustrated by methyl, ethyl, n-propyl, isopropyl, 2-butyl, isoamyl, n-hexyl, and the like, when alkyl; ethenyl (vinyl), 2-propenyl, 3-butenyl, 2-hexenyl, and the like, when alkenyl; 2-propynyl(propargyl), 3-hexynyl, and the like, when alkynyl; cyclopropyl, cyclobutyl, cyclopentyl, cyclohexyl, cyclooctyl, and the like, when cyclohexyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4,-dimethylphenyl, 3-ethylphenyl, and the like, when alkylated-phenyl.

The alkylene radical $Y_2$ in each of Formulas I and II has from two to six carbon atoms and has its two free valence bonds (or connecting linkages) on different carbon atoms, as illustrated by
—$CH_2CH_2$—, —$CH(CH_3)CH_2$—, —$C(CH_3)_2CH_2$—, —$CH(C_2H_5)CH_2$—, —$CH_2CH_2CH_2$—, —$CH_2CH_2\overset{|}{C}H(CH_3)$ —$(CH_2)_4$—, —$(CH_2)_5$—, —$(CH_2)_6$—, and the like.

The carboxylic-acyl group Ac' in each of Formulas I and II has from one to eight carbon atoms, and is, for instance, alkanoyl, haloalkanoyl, dihaloalkanoyl, trihaloalkanoyl, carboxyalkanoyl, di-(lower-alkyl)aminoalkanoyl, benzoyl, alkoxybenzoyl, carboxybenzoyl, carbalkoxybenzoyl, halobenzoyl, dihalobenzoyl, trihalobenzoyl, as illustrated by formyl, acetyl (ethanoyl), n-butanoyl, 3-methyl-n-butanoyl, n-hexanoyl, chloroacetyl, bromoacetyl, 3-iodopropanoyl, 2-fluorobutanoyl, dichloroacetyl, 2, 2 - dibromopropanoyl, 2 - chloro - 3-bromobutanoyl, tribromoacetyl, 2,2,3-trichloropropanoyl, 2,3,4-trichlorobutanoyl, 2,2-dibromo-6-chlorohexanoyl, carboxyethanoyl, 3-carboxypropanoyl, 2-carboxypropanoyl, 6-carboxyhexanoyl, diethylaminoacetyl, 2-dimethylaminopropanoyl, 4-diethylaminobutanoyl, 4-ethoxybenzoyl, 2-methoxybenzoyl, 2-carboxylbenzoyl, 4-carbethoxybenzoyl, 4-chlorobenzoyl, 3,4-dibromobenzoyl, 2,4,6-trichlorobenzoyl, and the like.

In the above Formula II when $x$ and $y$ are each integers from 1 to 6 inclusive $C_xH_{2x}$ and $C_yH_{2y}$ each represent lower-alkylene, as illustrated above for $Y_1$ and $C_mH_{2m}$, each of Formula I.

In the above Formula II the cycloalkylene radical represented by $C_nH_{2n-2}$ where $n$ is an integer from 3 to 8 inclusive is cyclic divalent radical having its two free valence bonds on different ring-carbon atoms, as illustrated by 1,2-cyclopropylene, 1,3-cyclobutylene, 1,3-cyclopentylene, 1,4-cyclohexylene, 1,3-cyclohexylene, 1,4-cycloheptylene, 1,5-cyclooctylene, and the like.

In the Formula II the alkylene radical Y when uninterrupted as designated above has from two to sixteen carbon atoms and can be straight-chained or branched, as illustrated by —$CH_2CH_2$—, —$CH(CH)CH_2$, —$CH_2\overset{|}{C}HCH_3$

—$C(CH_3)_2CH_2$—, —$CH_2CH_2CH_2$—,

—$CH_2\overset{|}{C}HCH_2CH_3$, —$CH_2CH_2CH_2CH_2$—, —$CH_2CH_2\overset{|}{C}HCH_3$ —$CH_2\overset{|}{C}HCH_2CH_2CH_3$, —$CH_2\overset{|}{C}HCH_2CH_2CH_3$ —$(CH_2)_5$—, —$(CH_2)_6$—
—$CH_2CH(CH_3)CH_2CH_2CH_2CH_2$—
—$CH_2CH(CH_3)CH(CH_3)CH_2CH_2CH_2$—
—$(CH_2)_7$—, —$(CH_2)_8$—, —$(CH_2)_9$—
—$(CH_2)_{10}$—, —$(CH_2)_{12}$—, —$(CH_2)_{14}$, $(CH_2)_{16}$—, and the like.

Also, as designated above, Y in Formula II comprehends the above-illustrated alkylene radicals which can be interrupted by the connecting linkages O, S, SO (i.e., sulfinyl), $SO_2$ (i.e., sulfonyl), NH, N(lower-alkyl), N(lower-alkenyl), N(lower-alkynyl), N[halogenated-(lower-alkanoyl)], CH=CH ond C≡C where lower-alkyl has preferably from one to about six carbon atoms, lower-alkenyl and lower-alkynyl each have preferably from three to about six carbon atoms and halogenated-(lower-alkanoyl) are radicals as illustrated above for $Ac_1$ and $Ac_2$ of Formula I, said interrupted alkylene radicals being illustrated by —$CH_2CH_2OCH_2CH_2$—
—$CH_2CH_2OCH_2CH_2OCH_2CH_2$—
—$CH_2CH_2CH_2SCH_2CH$—, —$CH_2CH_2S(O)CH_2CH_2$—
—$CH_2CH_2S(O)_2CH_2CH_2$—, $CH_2CH_2NHCH_2CH_2$—
—$(CH_2)_3NH(CH_2)_4NH(CH_2)_3$—
—$CH_2CH_2CH_2N(CH_3)(CH_2)_3$—
—$(CH_2)_4N(CH_2CH=CH_2)(CH_2)_3$—
—$(CH_2)_4N(CH_2C≡CH)(CH_2)_4$—
—$CH_2CH_2CH_2N(COCHCl_2)CH_2CH_2CH_2$—
—$CH_2CH_2CH=CHCH_2CH_2$—
—$CH_2CH_2CH=CHCH_2CH=CHCH_2CH_2$—
—$(CH_2)_3$—C≡C—$(CH_2)_3$— and the like.

In the above Formula II the halogenated-(lower-alkanoyl) radicals designated as $Ac_3$ and $Ac_4$ can be the same or different and each has more than one halogen atom, preferably from two to three, and each can have preferably from two to four carbon atoms, as illustrated by dichloroacetyl, dibromoacetyl, diiodoacetyl, difluroacetyl, bromochloroacetyl, chlorofluoroacetyl, trichloroacetyl, tribromoacetyl, bromodichloroacetyl, chlorodibromoacetyl, dichlorofluoroacetyl, chloroiodoacetyl, 2,2-dichloropropanoyl (alpha, alpha-dichloropropionyl), 2,2-diiodopropanoyl, 2,2-dibromopropanoyl, 2,2-difluoropropanoyl, 2,3-dichloropropanoyl, 2-bromo-3-chloropropanoyl, 2,2,3-trichloropropanoyl, 2,2-dichlorobutanoyl, 2,3-dibromobutanoyl, 2,2-dibromobutanoyl, 2,3,4-trichlorobutanoyl, 2, 2,3-tribromobutanoyl, and the like.

Preferred embodiments because of their high amebacidal activity, low toxicity and commercial practicability due to availability of intermediates are N,N,N',N'-tetrasubstituted-1,4(or 1,3)-bis(aminomethyl)benzenes having the Formula III

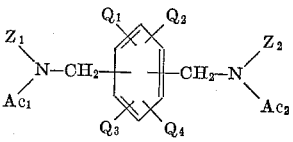

III where $Z_1$ and $Z_2$ are preferably each —$Y_2$—OH, —$Y_2$—O—R, —$Y_2$—O—Ac' or R, where $Q_1$, $Q_2$, $Q_3$ and $Q_4$ are each any of the substituents given hereinabove for Ar of Formula I but preferably H, halo, lower-alkoxy or lower-alkyl, and where $Ac_1$, $Ac_2$, $Y_2$, R and Ac' have the meanings given hereinabove for Formula I. Some of these embodiments, in particular those where $Z_1$ and $Z_2$ are lower-alkyl and $Ac_1$ and $Ac_2$ are dichloroacetyl, are also useful because of their gonadal hormone potentiating effects and antispermatogenic properties.

Also preferred because of their high amebacidal activity, low toxicity and commercial practicability due to availability of intermediates are the N,N,N',N' - tetra-substituted-alkanediamines having the above Formula II where Y is alkylene having from two to sixteen carbon atoms, $Ac_3$ and $Ac_4$ are each halogenated-(lower-alkanoyl) having preferably from two to three carbon atoms, and $Z_1$ and $Z_2$ are preferably each R or —$Y_2$—O—R, wherein R and $Y_2$ are defined as above for Formula II. Some of these compounds, especially those where $Ac_3$ and $Ac_4$ are each dichloroacetyl, are also preferred embodiments because of their useful gonadal hormone potentiating effects and antispermatogenic properties.

Also preferred because of their high amebacidal activity are the N,N,N',N' - tetrasubstituted - bis(aminomethyl)cycloalkanes having the Formula IV

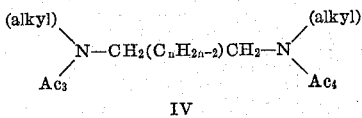

IV where alkyl in each instance has from one to eight carbon atoms, $Ac_3$ and $Ac_4$ are each halogenated-(lower-alkanoyl) having preferably from two to three halogen atoms, n is an integer from 3 to 8 inclusive and $C_nH_{2n-2}$ represents cycloalkylene as defined and illustrated above for Formula II.

Another preferred aspect of my invention are the novel N,N'-bis(dichloroacetyl)alkanediamine embodiments having the Formula V

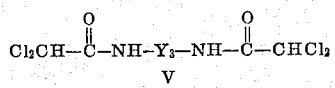

V where $Y_3$ is alkylene having from seven to nine carbon atoms and preferably having its two connecting linkages on carbon atoms which are separated by a chain of at least five other carbon atoms. These embodiments are preferred because of their high degree of activity in terms of gonadal hormone potentiating effects and antispermatogenic properties.

Another aspect of my invention are the phenylendiamine derivatives having the Formula VI

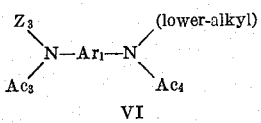

VI where $Ar_1$ is a divalent-aromatic radical of the benzene series, $Ac_3$ and $Ac_4$ are each halogenated-(lower-alkanoyl) having from two to three halogen atoms, and $Z_3$ is H or lower-alkyl. These novel compounds have amebacidal activity.

Another aspect of my invention are the novel N,N'-di-[polybrominated-(lower-alkanoyl)]-alkanediamines having the Formula VII

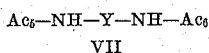

VII where Y is alkylene having from two to sixteen carbon atoms, and $Ac_5$ and $Ac_6$ are each polybrominated-(lower-alkanoyl), the latter each preferably having from two to four carbon atoms and from two to three bromo substituents. These novel compounds have amebacidal activity.

The N,N'-di-[halogenated-(lower-alkanoyl)]-diamines having the above Formula I (or III) where $Ac_2=Ac_1$ and where $Ac_1$, $Z_1$, $Z_2$, Ar and $C_mH_{2m}$ have the meanings designated above for the compounds of Formula I, are prepared by reacting the di-amine having the Formula I but where $Ac_1=Ac_2=H$ with two molar equivalents of a halogenated-alkanoylating agent derived from an acid of the formula $Ac_1$—OH. Found particularly useful as halogenated-alkanoylating agents were halogenated-alkanoyl halides having the formula $Ac_1$-halogen and lower-alkyl halogenated-alkanoates having the formula $Ac_1$-O-(lower-alkyl) where $Ac_1$ has the meaning given above for Formula I and the lower-alkyl portion of the ester is preferably methyl, but, can have from one to six carbon atoms, as illustrated by methyl, ethyl, isopropyl, n-butyl, 2-pentyl, n-hexyl and the like. The halo radical attached to the carbonyl of the acyl halide is preferably chloro; however, other halo radicals, i.e., bromo, iodo and fluoro, also can be used. When a lower-alkyl halogenated-alkanoate is used as the halogenated-alkanoylating agent, the reaction is facilitated by warming the reactants together on a steam bath at about 50° to 100° C. The reaction takes place at room temperature; however, the reaction time is usually longer without application of heat. The lower-alkyl halogenated-alkanoates were particularly useful as the halogenated-alkanoylating agents for the preparation of the compounds of Formula I where $Z_1$ and $Z_2$ were each hydroxyalkyl, e.g., 2-hydroxyethyl, and where $Z_1=Z_2=$methyl. When a halogenated-alkanoyl halide is used as the halogenated-alkanoylating agent for the preparation of the compounds of Formula I, the reaction is carried out preferably below room temperature, e.g., between about 0°–10° C., and preferably in the presence of an acid-acceptor, e.g., NaOH, to take up the hydrogen halide formed by the reaction. Illustrations of the process of this aspect of my invention are: the preparation of N,N'-bis(dichloroacetyl)-N,N'-bis(2-ethoxyethyl) - 1,4 - bis(aminomethyl)benzene by reacting N,N' - bis(2 - ethoxyethyl) - 1,4 - bis(aminomethyl)benzene with dichloroacetyl chloride; the preparation of N,N' - bis(bromoacetyl) - N,N' - bis(2-methoxyethyl)-1,3-bis(aminomethyl) - 2,6-dimethyl-4-methoxybenzene by reacting N,N'-bis(2-methoxyethyl)-1,3-bis(aminomethyl)-2,6-dimethyl-4-methoxybenzene with bromoacetyl bromide; the preparation of N,N'-bis(2,2-dichloropropanoyl)-N,N'-diisopropyl-1,4 - bis(aminomethyl)benzene by reacting N,N'-diisopropyl-1,4-bis(aminomethyl)-benzene with 2,2-dichloropropanoyl chloride; N,N'-bis(dichloroacetyl) - N,N' - diethyl - 1,3 - bis(aminomethyl)-2-methoxy-5-chlorobenzene by reacting N,N'-diethyl-1,3-bis(aminomethyl) - 2 - methoxy-5-chlorobenzene with dichloroacetyl chloride; the preparation of N,N'-bis(diiodoacetyl) - N,N' - bis(2 - hydroxyethyl) - 1,4 - bis(aminomethyl)benzene by reacting N,N'-bis(2-hydroxyethyl)-1,4-bis(aminomethyl)benzene with methyl diiodoacetate or diiodoacetyl chloride. In the preparation of a bis(chloroformamide), i.e., where Ac is chloroformyl, the bis-amine, preferably as its dihydrochloride, is reacted with phosgene while suspended in a nonpolar solvent, e.g., toluene, as illustrated by the preparation of N,N'-bis(chloroformyl) - N,N' - diethyl-1,4-bis(aminomethyl)-benzene or N,N'-bis(chloroformyl)-N,N'-diethyl-1,6 - hexanediamine by bubbling phosgene into a stirred refluxing suspension of N,N'-1-diethyl-1,4-bis(aminomethyl)benzene or N,N'-diethyl-1,6-hexanediamine, respectively.

The N,N'-di-[halogenated - (lower-alkanoyl)]diamines having the above Formulas II, IV, V, VI, and VII where in each instance the compounds have the same halogenated-(lower alkanoyl) radical attached to each of the two nitrogen atoms of a given diamine, i.e., where for the compounds of Formulas II, IV and VI $A_4=A_3$ and for the compounds of Formula VII $A_6=A_5$, are prepared by the same general procedure described above for the preparation of the compounds having Formula I, that is, by reacting the appropriate corresponding diamine, e.g., $Z_1$—NH—Y—NH—$Z_2$ to prepare the compounds of Formula II, with two molar equivalents of the appropriate halogenated-alkanoylating agent derived from an acid of the formula $Ac_3$—OH for the compounds of Formulas II, IV and VI where $Ac_4=Ac_3$ and from dichloroacetic acid, e.g., methyl dichloroacetate or dichloroacetyl chloride, for the compounds of Formula V, and from an acid of the formula $Ac_5$—OH for the compounds of Formula VII where $Ac_6=Ac_5$. Illustrations of these preparations are: the preparation N,N'-bis(2,2,3-trichloropropanoyl) - N,N'-diethyl-1,6-hexanediamine by reacting N,N'-diethyl - 1,6 - hexanediamine with 2,2,3-trichloropropanoyl chloride; the preparation of N,N'-bis(dichloroacetyl) - N,N' - bis(3-hydroxypropyl) - 1,4-bis(aminomethyl)cyclohexane with ethyl dichloroacetate; the preparation of N,N'-bis(dichloroacetyl) - 1,8 - octanediamine by reacting 1,8 - octanediamine with dichloroacetyl chloride; the preparation of N,N'-bis(trichloroacetyl) - N,N'-dimethyl - 1,4 - phenylenediamine by reacting N,N'-dimethyl - 1,4 - phenylenediamine with trichloroacetyl chloride; and the preparation of N,N'-bis(dibromoacetyl) - 1,10 - decanediamine by reacting 1,10-decanediamine with dibromoacetyl bromide.

The compounds of my invention of Formulas I and II where $Z_1$, and $Z_2$ are each —$Y_2$—O—Ac' are prepared by reacting one of my compounds of Formula I or II where $Z_1$ and $Z_2$ are each —$Y_2$—OH, hereinabove described, with an acylating agent selected from the group consisting of those having the formula Ac"-halogen or (Ac")$_2$O, or formic acid, where $Y_2$ has the meaning given above for Formula I or II and Ac" is like Ac' but excluding formyl, that is, Ac" is a carboxylic acyl group having from two to eight carbon atoms as illustrated above for Ac'. When an acyl halogen, Ac"-halogen, is used, the halide halogen, i.e., the halo radical attached to carbonyl is preferably chloro; however, other halo radicals, i.e., bromo, iodo and fluoro, also can be used. Illustrations of my invention are: the preparation of N,N'-bis(dichloroacetyl) - N,N' - bis(2-acetoxyethyl) - 1,4-bis(aminomethyl)benzene by reacting N,N' - bis(dichloroacetyl) - N,N' - bis(2-hydroxyethyl) - 1,4 - bis(aminomethyl)benzene with acetyl chloride or acetic anhydride; the preparation of N,N' - bis(bromoacetyl)-N,N'-bis[2-(n-butanoyl)ethyl] - 1,3 - bis(aminomethyl) - 2,4,6 - trimethylbenzene by reacting N,N' - bis(bromoacetyl)N-N' - bis(2-hydroxyethyl) - 1,3 - bis-(aminomethyl)-2,4,6-trimethylbenzene with n-butanol chloride or n-butanoic anhydride; and the preparation of N,N'-bis(2,2-dichloropropanoyl) - N.N' - bis(3 - formyloxypropyl) - 1,3 - bis(aminomethyl) - 2 - ethoxy - 5 - bromobenzene by reacting N,N' - bis(2,2-dichloropropanoyl) - N,N' - bis(3-hydroxypropyl) - 1,3 - bis(aminomethyl-2-ethoxy-5-bromobenzene with formic acid. When an acyl halide, Ac"-halogen, is used as the acylating agent, the reaction is carried out preferably below room temperature, with chilling if necessary. When an acyl anhydride, (Ac")$_2$O, is used, the reaction can be carried out at room temperature or preferably higher, e.g., heating on a steam bath.

The intermediate N,N'-disubstituted-diamines, i.e., the compounds of formulas like Formulas I, II, and VI but where $Ac_1=Ac_2=Ac_3=Ac_4=H$, are generally known compounds and can be prepared by various generally known methods. For example, in the preparation of the compounds where $Z_2=Z_1$, one method is the reaction of the diamine, e.g., $H_2N$—Y—$NH_2$, with two molar equivalents of the halide, $Z_1$-halogen, where halogen is any halogen, preferably chloro and bromo; another method is the reaction of the dihalo-compound, e.g., halogen-Y-halogen, with two molar equivalents of the amine $Z_1$—$NH_2$; and in a third method, for the preparation of the compounds of Formula I where $Y_1$ and $C_mH_{2m}$ are each $CH_2$, an aromatic-di-aldehyde Ar(CHO)$_2$ is reacted with two molar equivalents of the amine, $Z_1$—$NH_2$, to form the bis-anil, Ar(CH=N—$Z_1$)$_2$, which is then selectively hydrogenated (usually directly without isolation) to form the intermediate Ar(CH$_2$NHZ$_1$)$_2$.

The latter method is illustrated in more detail for the preparation of intermediates for the preferred embodiments of Formula III (where $Z_2=Z_1$) as follows. Terephthalaldehyde, isophthalaldehyde or their ring substituted analogs are reacted with two molar equivalents of the amine, $Z_1$—$NH_2$. The resulting bis-anil of the Formula VIII

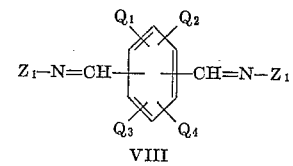

VIII where $Z_1$, $Q_1$, $Q_2$, $Q_3$ and $Q_4$ are defined as hereinabove for Formula III, is then catalytically reduced with hydrogen directly without isolation of the bis-anil to yield the intermediate N,N'-disubstituted - 1,4(or 1,3) - bis(aminomethyl)benzene derivative. The formation of the bis-anil is carried out preferably by heating the amine, $Z_1$—$NH_2$ with the terephthalaldehyde (or isophthalaldehyde) at about 50° to 150° C., usually on a steam bath, and preferably removing the water as it is formed. This reaction also can be run at room temperature using a longer reaction time. The catalytic hydrogenation of the anil is carried out using pressures of hydrogen of preferably one to three atmospheres although higher pressures can be used if desired. The hydrogenation can be run over a wide temperature range with about 25 to 60° C. being preferred; the reaction is carried out by starting at room temperature and gradually raising the temperature until the hydrogen uptake starts. Higher temperatures can be used if desired. Catalysts suitable in the hydrogenation step are those usually employed in the reduction of anils to secondary amines, e.g., palladium-on-charcoal, Raney nickel, platinum from its oxide, etc. Illustrative of the preparation of these intermediate N,N'-disubstituted-bis(aminomethyl)benzenes is the preparation of N,N'-bis(2-hydroxyethyl) - 1,4 - bis(aminomethyl)-benzene by reacting terephthalaldehyde with two molar equivalents of 2-hydroxyethylamine (ethanolamine) and reducing the resulting bis-anil by catalytic hydrogenation. Similarly prepared are: N,N'-bis(2-ethoxyethyl) - 1,4-bis(aminomethyl)benzene using 2-ethoxyethylamine in place of ethanolamine; N,N'-diisopropyl - 1,4 - bis(aminomethyl)benzene using isopropylamine; N,N'-bis(2-methoxyethyl) - 1,3-bis(aminomethyl)benzene using isophthalaldehyde and 2-methoxyethylamine; and N,N'-bis(2-hydroethyl) - 1,4 - bis(aminomethyl) - 2,5-diethoxybenzene using 2,5 - diethoxyterephthalaldehyde and 2-hydroxyethylamine.

The ring substituted analogs of terephthalaldehyde and isophthalaldehyde bearing alkoxy, alkyl, halo and other substituents are generally old in the art and can be prepared by conventional means. This method can also be used for the preparation of the intermediates of the formula $Z_1$—NH—$CH_2$—Ar—$CH_2$—NH—$Z_1$ where Ar is a lower-divalent-aromatic radical having the other meanings given hereinabove.

The method of preparing the intermediate diamines, $Z_1$—NH—$Y_1$—Ar—$(C_mH_{2m})$—NHZ$_1$ or $Z_3$—NH—Y—NH—$Z_3$ by reacting two molar equivalents of the amine $Z_1NH_2$ or $Z_3NH_2$ with the respective dihalide, (halogen)—$Y_1$—Ar—$(C_mH_{2m})$—(halogen)

or (halogen)—Y—(halogen), is illustrated again for the preferred bis(aminomethyl)benzene derivatives (Formula X below) as follows. They can be prepared by reacting the corresponding xylylene dihalides (Formula IX), preferably the dichlorides or dibromides, with two molar equivalents of a primary amine of the formula $Z_1$—$NH_2$, preferably in the presence of an acid acceptor, e.g., NaOH, $Na_2CO_3$. This procedure is illustrated structurally as follows:

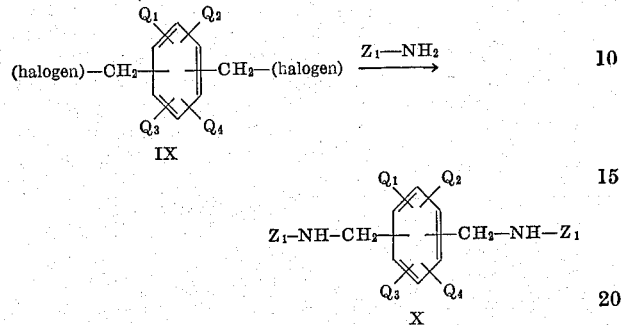

where the two halomethyl substituents are para or meta to each other, and $Z_1$, $Q_1$, $Q_2$, $Q_3$ and $Q_4$ have the meanings given above for Formula III. Illustrative of this procedure is the preparation of N,N'-(2-ethoxyethyl) - 1,4-bis(aminomethyl) - 2,5 - dichlorobenzene by reacting 2,5-dichloro-para-xylylene dichloride [same as 1,4-bis(chloromethyl) - 2,5 - dichlorobenzene] with two molar equivalents of 2-ethoxyethylamine. Alternatively, these intermediate N,N'-disubstituted - 1,4(or 1,3) - bis(aminomethyl)benzenes (X) can be prepared stepwise by first reacting a xylyene dihalide (XI) with excess ammonia and then reacting the resulting bis(aminomethyl)benzene (XII) with two molar equivalents of a halide of the formula $Z_1$—(halogen), where halogen is preferably chlorine or bromine. This procedure is illustrated structurally as follows:

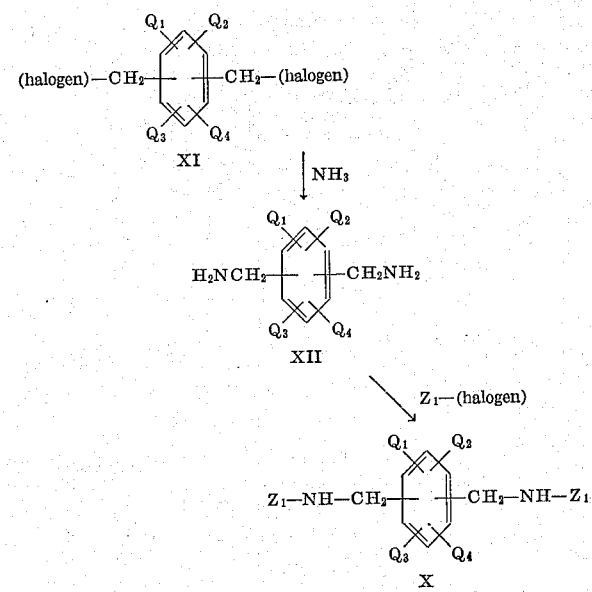

Illustrative of this procedure is the preparation of N,N'-(2-hydroxyethyl) - 1,4 - bis(aminomethyl) - 2,5 - dimethylbenzene by reacting 2,5-dimethyl-para-xylylene dichloride with excess ammonia as known in the art and reacting the resulting 1,4 - bis-(aminomethyl) - 2,5-dimethylbenzene with two molar equivalents of 2-hydroxyethyl chloride.

Preparation of the unsymmetrical compounds of Formula I, i.e., where $Z_1$ and $Z_2$ are different and/or $Ac_1$ and $Ac_2$ are different can be accomplished by various methods, as illustrated structurally as follows for the compounds where $Y_1$—Ar—$(C_mH_{2m})$ is 1,4-bis$(CH_2)C_6H_4$:

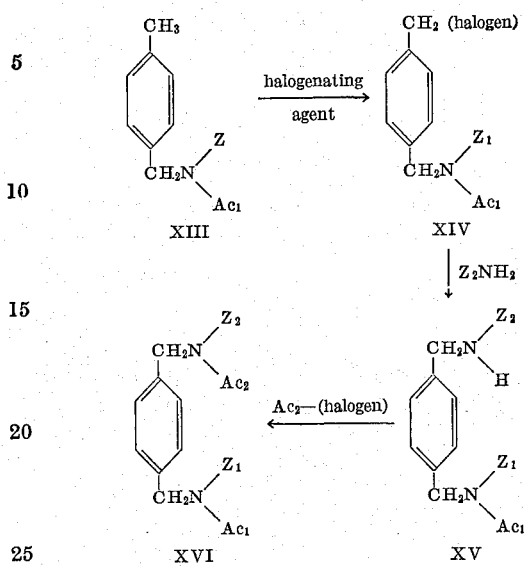

Thus, in the above illustrative procedure the $$N—(Z_1)—N—(Ac_1)\text{-4-methylbenzylamine}$$

(Formula XIII) is treated with a halogenating agent, e.g., $Br_2$, $SO_2Cl_2$, N-bromosuccinimide, etc.; the resulting 4-halomethylbenzylamine (Formula XIV) is treated with the primary amine $Z_2$—$NH_2$ to yield the $$N—(Z_1)—N—(Ac_1)—N'—(Z_2)\text{-1,4-bis}$$
$$\text{(aminoethyl)benzene}$$

(Formula XV); and the latter compound is reacted with the acyl halide, $Ac_2$-(halogen), to yield the unsymmetrical compound having Formula XVI. This procedure for the preparation of the unsymmetrical compounds of Formula I is also useful for the preparation of the symmetrical compounds of Formula I where $Y_1$-Ar-$(C_mH_{2m})$ is 1,2-bis$(CH_2)C_6H_4$, e.g., N,N'-bis(dichloroacetyl-N,N'-diethyl-1,2-bis(aminomethyl)benzene is formed by first reacting N - dichloroacetyl-N-ethyl-2-methylbenzylamine with bromine, reacting the corresponding 2-bromomethyl-benzylamine with ethyl amine to yield N-dichloroacetyl-N,N'-diethyl-bis(1,2-aminomethyl)benzene which is then reacted with dichloroacetyl chloride.

Preparation of the unsymmetrical compounds of Formula II, i.e., where $Z_1$ and $Z_2$ are different and/or $Ac_3$ and $Ac_4$ are different can be accomplished by various methods, as illustrated by the following procedure: A compound of the formula halogen—Y—OH is reacted with $Z_1$—$NH_2$ to yield $Z_1$—NH—Y—OH, which is then reacted with a halogenated-alkanoylating agent derived from an acide of the formula $Ac_3$—OH to form $$Z_1(Ac_3)N—Y—OH$$

which is next reacted with a halogenating agent to convert the alcohol into the corresponding halide of the formula $Z_1(Ac_3)N$—Y—halogen. The halide is then reacted $Z_2$—$NH_2$ to yield $Z_1(Ac_3)N$—Y—$NHZ_2$ which is reacted with a halogenated-alkanoylating agent derived from an acid of the formula $Ac_4$—OH to form $$Z_1(Ac_3)N—Y—N(Ac_4)Z_2$$

where $Z_1$, $Z_2$, $Ac_3$, $Ac_4$ and Y have the meanings given above for the compounds of Formula II.

Another aspect of my invention are the novel intermediate N,N-disubstituted-1,4-(or 1,3)-bis(aminomethyl) benzene derivatives having the above Formula X where the two aminomethyl substituents are attached to the benzene ring at positions selected from the group consisting of meta and para to each other; $Q_1$, $Q_2$, $Q_3$ and $Q_4$ are each members selected from the preferred group consisting of H, halogen and lower alkoxy; and Z is a member selected from the preferred group consisting of hydroxyalkyl radicals of the formula —Y$_2$—OH and hydrocarbonoxyalkyl radicals of the formula

—Y$_2$—O—R where Y$_2$ is alkylene having from two to six carbon atoms and having its two free valence bonds on different carbon atoms and R is a hydrocarbon radical having from one to eight carbon atoms. These compounds can be prepared by the procedures described above and their preparation is illustrated further in the specific examples that follow.

The chemical structures of my novel N,N'-di-[halogenated(lower-alkanonyl)]-diamines of the foregoing formulas and my above described novel intermediate N,N'-bis(hydroxyalkyl and hydrocarbonoxyalkyl) - bis(aminomethyl)benzenes are established by the modes of syntheses and corroborated by the correspondence of calculated and found values for the elementary analyses for representative examples.

The following examples will further illustrate specific embodiments of the invention without, however, limiting it thereto.

*Example 1*

A. *N,N' - bis(hydroxyalkyl) - bis(aminomethyl)benzenes.*—The preparation of these intermediates is illustrated by the following preparation of N,N'-bis(2-hydroxyethyl)-1,4-bis(aminomethyl)benzene: A mixture of 30 g. of terephthalaldehyde and 27.3 g. of ethanolamine was heated in vacuo on a steam bath for one hour. The resulting solid bis-anil was almost completely dissolved in 300 ml. of ethanol and reduced catalytically with hydrogen in the presence of palladium-on-charcoal at 50° C. After removing the catalyst by filtration, the solvent was distilled off. The solid residue was recrystallized from ethanol to give 20 g. of product melting at 127–129° C.

*Analysis.*—Calcd. for C$_{12}$H$_{20}$N$_2$O$_2$: N, 12.47. Found: N, 11.95.

Other N,N'-bis(hydroxyalkyl)-bis(aminomethyl)benzenes that can be prepared following the above procedure using the appropriate phthalaldehyde and alkanolamine are: N,N'-bis(3-hydroxypropyl)-1,4-bis(aminomethyl)benzene using 3-hydroxypropylamine and terephthalaldehyde, N,N'-bis(2 - hydroxypropy) - 1,4 - bis(aminomethyl)benzene using 2-hydroxypropylamine and terephthalaldehyde, N,N'-bis(4 - hydroxybutyl)-1,4-bis(aminomethyl)benzene using 4-hydroxybutylamine and terephthalaldehyde, N,N'-bis(3-hydroxypentyl)-1,3-bis(aminomethyl)benzene using 3 - hydroxypenylamine and isophthalaldehyde, N,N' - bis(6 - hydroxyhexyl)-1,4-bis(aminomethyl)benzene using 6-hydroxyhexylamine and terephthalaldehyde, N,N' - bis(2 - hydroxyethyl)-1,3-bis(aminomethyl)-2,6-dimethyl-4-methoxybenzene using 2-hydroxyethylamine and 2,6 - dimethyl - 4 - methoxyisophthalaldehyde, N,N'-bis(2-hydroxyethyl)-1,3-bis(aminomethyl)-2-methoxy-5-chlorobenzene using 2-hydroxyethylamine and 2-methoxy-5-chloroisophthalaldehyde, N,N' - bis(2-hydroxyethyl)-1,3-bis(aminomethyl) - 4,6-dimethoxy-5-ethylbenzene using 2-hydroxyethylamine and 4,6-dimethoxy-5-ethylisophthalaldehyde, N,N'-bis(2-hydroxyethyl) - 1,3 - bis(aminomethyl)-2,4,6-trimethylbenzene using 2-hydroxyethylamine and 2,4,6-trimethylisophthalaldehyde, N,N' - bis(2-hydroxyethyl) - 1,3-bis(aminomethyl)-2-ethoxy - 5 - bromobenzene using 2-hydroxyethylamine and 2-ethoxy-5-bromoisophthalaldehyde, N,N'-bis(2-hydroxyethyl)-1,4-bis(aminomethyl)-2,5-diethoxybenzene using 2-hydroxyethylamine and 2,5-diethoxyterephthalaldehyde, N,N' - bis(2-hydroxyethyl)-1,4-bis(aminomethyl)-2,5-dichlorobenzene using 2-hydroxyethylamine and 2,5-dichloroterephthalaldehyde, N,N'-bis(2-hydroxyethyl) - 1,4 - bis(aminomethyl)-2,3,5-trichlorobenzene using 2 - hydroxyethylamine and 2,3,5-trichloroterephthalaldehyde, N,N'-bis(2-hydroxyethyl)-1,3-bis(aminomethyl)-2,4,6-trichlorobenzene using 2-hydroxyethylamine and 2,4,6 - trichloroisophthalaldehyde, and the like.

B. *N,N'-bis[halogenated - (lower-alkanoyl)]-N,N'-bis(hydroxyalkyl)-bis(aminomethyl)benzenes.*—The preparation of these compounds is illustrated by the following preparation of N,N'-bis(dichloroacetyl)-N,N'-bis-(2-hydroxyethyl)-1,4-bis(aminomethyl)benzene: A mixture of 5 g. of N,N'-bis(2-hydroxyethyl)-1,4-bis(aminomethyl)benzene and 7.1 g. of methyl dichloroacetate was heated at 60° C. for four hours. The solid product was stirred in 40 ml. of 1 N hydrochloric acid, collected and washed with water; the yield was 8 g. After three recrystallizations from isopropyl alcohol, the product melted at 162.9–164.8° C. (corr.).

*Analysis.*—Calcd. for C$_{16}$H$_{20}$Cl$_4$N$_2$O$_4$: C, 43.08; H, 4.51; Cl, 31.79. Found: C, 42.84; H, 4.91; Cl, 31.9.

The same product is obtained by reacting, preferably at a lower temperature (0° to 25° C.), N,N'-bis(2-hydroxyethyl)-1,4-bis(aminomethyl)benzene with two molar equivalents of dichloroacetyl chloride instead of methyl dichloroacetate.

N,N' - bis(dichloroacetyl) - N,N' - bis(2 - hydroxyethyl) - 1,4 - bis(aminomethyl)benzene when administered orally to hamsters infected with *Endamoeba criceti* was found to have an ED$_{50}$ of 6.5±0.8 mg./kg./day.

Other representative N,N' - bis[halogenated - (loweralkanoyl)] - N,N' - bis(hydroxyalkyl) - bis(aminomethyl) benzenes that can be prepared following the above procedure in Example 1B using molar equivalent quantities of the appropriate reactants are the following compounds of Examples 2–25.

*Example 2*

N,N' - bis(dibromoacetyl) - N,N' - (2 - hydroxyethyl)-1,4 - bis - (aminomethyl)benzene is obtained using N,N'-bis(2 - hydroxyethyl) - 1,4 - bis(aminoethyl)benzene and methyl dibromoacetate.

*Example 3*

N,N' - bis(diiodoacetyl) - N,N' - bis(2 - hydroxyethyl) - 1,4 - bis - (aminomethyl)benzene is obtained using N,N' - bis(2 - hydroxyethyl) - 1,4 - bis(aminomethyl)benzene and ethyl diiodoacetate.

*Example 4*

N,N' - bis(difluoroacetyl) - N,N' - bis(2 - hydroxyethyl) - 1,4 - bis(aminomethyl)benzene is obtained using N,N' - bis(2 - hydroxyethyl) - 1,4-bis(aminomethyl)benzene and methyl difluoroacetate.

*Example 5*

N,N' - bis(chlorobromoacetyl) - N,N' - bis(2 - hydroxyethyl) - 1,4 - bis(aminomethyl)benzene is obtained using N,N' - bis(2 - hydroxyethyl) - 1,4 - bis(aminomethyl)benzene and n-propyl chloro-bromoacetate.

*Example 6*

N,N' - bis(monochloroacetyl) - N,N' - bis(2 - hydroxyethyl) - 1,4 - bis(aminomethyl)benzene is obtained using N,N' - bis(2 - hydroxyethyl) - 1,4 - bis(aminomethyl)benzene and monochloroacetyl chloride.

*Example 7*

N,N' - bis(2,2 - dichloropropropanoyl) - N,N' - bis-(2 - hydroxyethyl) - 1,4 - bis(aminomethyl)benzene is obtained using N,N' - bis(2 - hydroxyethyl) - 1,4 - bis(aminomethyl)benzene and 2,2-dichloropropanoyl chloride.

*Example 8*

N,N' - bis(2,2 - dibromopropanoyl) - N,N' - bis(2-hydroxyethyl) - 1,4 - bis(aminomethyl)benzene is obtained using N,N' - bis(2 - hydroxyethyl) - 1,4 - bis(aminomethyl)benzene and methyl 2,2-dibromopropanoate.

Example 9

N,N' - bis(2 - bromo - 3 - chloropropanoyl) - N,N'-bis(2 - hydroxyethyl) - 1,4 - bis(aminomethyl)benzene is obtained using N,N' - bis - (2 - hydroxyethyl) - 1,4 - bis(aminomethyl)benzene and 2-bromo-3-chloropropanoyl chloride.

Example 10

N,N' - bis(2,2 - dichlorobutanoyl) - N,N' - bis(2-hydroxyethyl) - 1,4 - bis(aminomethyl)benzene is obtained using N,N' - bis(2 - hydroxyethyl) - 1,4 - bis(aminomethyl)benzene and 2,2-dichlorobutanoyl chloride.

Example 11

N,N' - bis(2,4 - dibromobutanoyl) - N,N' - bis(2-hydroxyethyl) - 1,4 - bis(aminomethyl)benzene is obtained using N,N' - bis(2 - hydroxyethyl) - 1,4 - bis(aminomethyl)benzene and 2,4-dibromobutanoyl bromide.

Example 12

N,N' - bis(dichloroacetyl) - N,N' - bis(3 - hydroxypropyl) - 1,4 - bis(aminomethyl)benzene is obtained using N,N' - bis(3 - hydroxypropyl) - 1,4 - bis(aminomethyl)benzene and dichloroacetyl chloride.

Example 13

N,N' - bis(dibromoacetyl) - N,N' - bis(2 - hydroxypropyl) - 1,4 - bis(aminomethyl)benzene is obtained using N,N' - bis(2 - hydroxypropyl) - 1,4 - bis(aminomethyl)benzene and methyl dibromoacetate.

Example 14

N,N' - bis(2,2 - dichloropropanoyl) - N,N' - bis(4-hydroxybutyl) - 1,4 - bis(aminomethyl)benzene is obtained using N,N' - bis(4 - hydroxybutyl) - 1,4 - bis(aminomethyl)benzene and 2,2 - dichloropropanoyl chloride.

Example 15

N,N' - bis(monoiodoacetyl) - N,N' - bis(3 - hydroxypentyl) - 1,4 - bis(aminomethyl)benzene is obtained using N,N' - bis(3 - hydroxypentyl) - 1,4 - bis(aminomethyl)benzene and monoiodoacetyl chloride.

Example 16

N,N' - bis(dichloroacetyl) - N,N' - bis(6 - hydroxyhexyl) - 1,4 - bis(aminomethyl)benzene is obtained using N,N' - bis(6 - hydroxyhexyl) - 1,4 - bis(aminomethyl)benzene and dichloroacetyl chloride.

Example 17

N,N' - bis(dichloroacetyl - N,N' - bis(2 - hydroxyethyl) - 1,3 - bis(aminomethyl) - 2,6 - dimethyl - 4 - methoxybenzene is obtained using N,N'-bis(2-hydroxyethyl) - 1,3 - bis(aminomethyl) - 2,6 - dimethyl - 4 - methoxybenzene and dichloroacetyl chloride.

Example 18

N,N' - bis(dichloroacetyl) - N,N' - bis(2 - hydroxyethyl) - 1,3 - bis(aminomethyl) - 2 - methoxy - 5 - chlorobenzene is obtained using N,N' - bis(2 - hydroxyethyl) - 1,3 - bis(aminomethyl) - 2 - methoxy - 5 - chlorobenzene and methyl dichloroacetate.

Example 19

N,N' - bis(dichloroacetyl) - N,N' - bis(2 - hydroxyethyl) - 1,3 - bis(aminomethyl) - 4,6 - dimethoxy - 5-ethylbenzene is obtained using N,N'-bis(2-hydroxyethyl) - 1,3 - bis(aminomethyl) - 4,6 - dimethoxy - 5-ethylbenzene and methyl dichloroacetate.

Example 20

N,N' - bis(dichloroacetyl) - N,N' - bis(2 - hydroxyethyl) - 1,3 - bis(aminomethyl) - 2,4,6 - trimethylbenzene is obtained using N,N' - bis(2 - hydroxyethyl) - 1,3-bis(aminomethyl) - 2,4,6 - trimethylbenzene and methyl dichloroacetate.

Example 21

N,N' - bis(dibromoacetyl) - N,N' - bis(2 - hydroxyethyl) - 1,3 - bis(aminomethyl) - 2 - ethoxy - 5 - bromobenzene is obtained using N,N' - bis(2 - hydroxyethyl)-1,3 - bis(aminomethyl) - 2 - ethoxy - 5 - bromobenzene and methyl dibromoacetate.

Example 22

N,N' - bis(dichloroacetyl) - N,N' - bis(2-hydroxyethyl) - 1,4 - bis(aminomethyl)-2,5-diethoxybenzene is obtained using N,N' - bis(2 - hydroxyethyl) - 1,4 - bis(aminomethyl)-2,5 - diethoxybenzene and ethyl dichloroacetate.

Example 23

N,N'-bis(dichloroacetyl) - N,N' - bis(2 - hydroxyethyl) - 1,4 - bis(aminomethyl) - 2,5 - dichlorobenzene is obtained using N,N' - bis(2 - hydroxyethyl) - 1,4 - bis(aminomethyl) - 2,5 - dichlorobenzene and methyl dichloroacetate.

Example 24

N,N' - bis(dichloroacetyl) - N,N' - bis(2 - hydroxyethyl) - 1,4 - bis(aminomethyl) - 2,3,5 - trichlorobenzene is obtained using N,N'-bis(2 - hydroxyethyl) - 1,3 - bis(aminomethyl) - 2,3,5 - trichlorobenzene and methyl dichloroacetate.

Example 25

N,N' - bis(dichloroacetyl) - N,N' - bis(2 - hydroxyethyl) - 1,3 - bis(aminomethyl) - 2,4,6 - trichlorobenzene is obtained using N,N' - bis(2 - hydroxyethyl) - 1,3 - bis(aminomethyl) - 2,4,6 - trichlorobenzene and methyl dichloroacetate.

Example 26

A. *N,N' - bis(hydrocarbyl) - bis(aminomethyl)benzenes.*—The preparation of these intermediates is illustrated by the following preparation of N,N'-diethyl-1,4-bis(aminomethyl)-benzene [or 1,4-bis(ethylaminomethyl)benzene]: Terephthalaldehyde (5.0 g., 0.037 mole) was added to 12 ml. of a 70% aqueous ethylamine solution and allowed to stand one-half hour. To this mixture containing the bis-anil was added 10 ml. of 95% ethanol, 250 mg. of $PdCl_2$, and 2 g. of charcoal; and the hydrogenation was conducted at 35–40° C. in a Parr apparatus with 83% of the theory of hydrogen being absorbed. After filtration to remove the catalyst, the alcohol and excess ethylamine were evaporated under reduced pressure to yield 1,4-bis(ethylaminomethyl)benzene, which when treated with ethanolic hydrochloric acid and ether yielded 6.0 g. of white crystalline product, 1,4-bis(ethylaminomethyl)benzene as its dihydrochloride, M.P. over 300° C.

*Analysis.*—Calcd. for $C_{12}H_{20}N_2 \cdot 2HCl$: $Cl^-$, 26.74. Found: $Cl^-$, 26.50.

Following the above procedure using other lower alkylamines in place of ethylamine, the following compounds are prepared: 1,4 - bis(n - propylaminomethyl)benzene using n-propylamine, 1,4 - bis(isobutylaminomethyl)benzene using isobutylamine, 1,4-(n-hexylaminomethyl)benzene using n-hexylamine, 1,4-bis(allylaminomethyl)benzene using allylamine, 1,4-bis(cyclohexylaminomethyl)benzene using cyclohexylamine, 1,4-bis(cyclopropylmethylaminomethyl)benzene using cyclopropylmethylamine, 1,4 - bis(phenylaminomethyl)benzene using aniline, 1,4-bis(benzylaminomethyl)benzene using benzylamine, and the like.

Following the above procedure using isophthalaldehyde in place of terephthalaldehyde, 1,3-bis(ethylaminoethyl)benzene is obtained.

Other representative N,N'-bis(hydrocarbyl)-bis(aminomethyl)benzenes that can be prepared following the above procedure using molar equivalent quantities of the appropriate reactants are: 1,4-bis(ethylaminoethyl)-2,5-dibromobenzene using 2,5-dibromoterephthalaldehyde and ethylamine, 1,3-bis(isopropylaminomethyl) - 2,6-dimethyl-4-methoxybenzene using 2,6-dimethyl-4-methoxyisophthalaldehyde and isopropylamine, 1,3-bis(ethylaminoethyl)-2-methoxy - 5 - chlorobenzene using 2-methoxy-5-chloroisophthalaldehyde and ethylamine, 1,3-bis(methylaminomethyl)-4,6-dimethoxy-5-ethylbenzene using 4,6-dimethoxy-5-ethylisophthalaldehyde and methylamine, 1,3-bis(isopropylaminomethyl)-2,4,6-trimethylbenzene using 2,4,6-trimethylisophthalaldehyde and isopropylamine, 1,3-bis(ethylaminomethyl)-2-ethoxy-5-bromobenzene using 2-ethoxy-5-bromoisophthalaldehyde and ethylamine, 1,4-bis(ethylaminomethyl)-2,5-diethoxybenzene using 2,5- diethoxyterephthalaldehyde and ethylamine, 1,4-bis(isopropylaminomethyl)-2,5-dichlorobenzene using 2,5 - dichloroterephthalaldehyde and isopropylamine, 1,4-bis-(ethylaminomethyl)-2,3,5-trichlorobenzene using 2,3,5-trichloroterephthalaldehyde and ethylamine, 1,3-bis(isobutylaminomethyl)-2,4,6-trichlorobenzene using 2,4,6-trichloroisophthalaldehyde and isobutylamine, and the like.

B. *N,N'-bis[halogenated-(lower-alkanoyl)] - N,N'-bis-(hydrocarbyl) - bis(aminomethyl)benzenes.*—The preparation of these compounds is illustrated by the following preparation of N,N'-bis(monochloroacetyl)-N,N'-diethyl-1,4-bis(aminomethyl)benzene: A mixture of 7.0 g. of 1,4-bis(ethylaminomethyl)benzene dihydrochloride dissolved in 15 ml. of water, 45 ml. of 10% aqueous sodium hydroxide, and 50 ml. of ethylene dichloride was stirred while chilling in an ice bath. To the cold mixture was added dropwise over the course of one-half hour 6.6 g. of monochloroacetyl chloride dissolved in 10 ml. of ethylene dichloride. The organic layer was separated and washed first with 5% aqueous sodium hydroxide and then with 10% aqueous hydrochloric acid. The solution was filtered and the solvent evaporated. The resulting oil was poured into water and chilled to yield the whtie crystalline product, N,N'-bis(monochloroacetyl)-N,N'-diethyl-1,4-bis(aminomethyl)benzene, one recrystallization of which from isopropyl alcohol-n-hexane gave 6.0 g. (66%) of purified product M.P. 100.4–103.2° C. (corr.).

*Analysis.*—Calcd. for $C_{16}H_{22}Cl_2N_2O_2$: C, 55.66; H, 6.42; Cl, 20.54. Found: C, 55.68; H, 5.95; Cl, 20.74.

In the above procedure the intermediate 1,4-bis(ethylaminomethyl)benzene dihydrochloride is first converted by the sodium hydroxide into its free base form which then reacts with the monochloroacetyl chloride. Alternatively, this procedure can be carried out using the bisamine in free base form and a correspondingly smaller quantity of sodium hydroxide.

N,N'-bis(monochloroacetyl) - N,N' - diethyl-1,4 - bis-(aminomethyl)benzene when administered orally to hamsters infected with *Endamoeba criceti* was found to have an $ED_{50}$ of 3.8±0.5 mg./kg./day.

Other repersentative N,N' - bis[halogenated(loweralkanoyl)]-N,N' - bis(hydrocarbyl) - bis(aminomethyl) benzenes that can be prepared following the above procedure of Example 26B using molar equivalent quantities of the appropriate reactants are the following compounds of Examples 27–46.

*Example 27*

N,N'-bis(monochloroacetyl)-N,N'-di-n-propyl - 1,4-bis-(aminomethyl)benzene is obtained using 1,4-bis(n-propylaminomethyl)benzene and monochloroacetyl chloride.

*Example 28*

N,N'-bis(monobromoacetyl)-N,N' - diisobutyl - 1,4-bis-(aminomethyl)benzene is obtained using 1,4-bis(isobutylaminomethyl)benzene and monobromoacetyl bromide.

*Example 29*

N,N'-bis(monoiodoacetyl)-N,N'-di - n - hexyl - 1,4-bis-(aminomethyl)benzene is obtained using 1,4-bis(n-hexylaminomethyl)benzene and monoiodoacetyl chloride.

*Example 30*

N,N'-bis(2-chloropropanoyl) - N,N' - diallyl - 1,4 - bis-(aminomethyl)benzene is obtained using 1,4-bis(allylaminomethyl)benzene and 2-chloropropanoyl chloride.

*Example 31*

N,N'-bis(2-bromobutanoyl)-N,N'-bis(cyclohexyl - 1,4-bis(aminomethyl)benzene is obtained using 1,4-bis(cyclohexylaminomethyl)benzene and 2-bromobutanoyl bromide.

*Example 32*

N,N'-bis(2,2-dibromopropanoyl) - N,N' - bis(cyclopropylmethyl)-1,4-bis(aminomethyl)benzene is obtained using 1,4-bis(cyclopropylmethylaminomethyl)benzene and 2,2-dibromopropanoyl bromide.

*Example 33*

N,N'-bis(2,3-dichloropropanoyl)-N,N' - diphenyl - 1,4-bis(aminomethyl)benzene is obtained using 1,4-bis(phenylaminomethyl)benzene and 2,3-dichloropropanoyl chloride.

*Example 34*

N,N'-bis(2,2-dichlorobutanoyl)-N,N'-dibenzyl - 1,4-bis-(aminomethyl)benzene is obtained using 1,4-bis(benzylaminomethyl)benzene and 2,2-dichlorobutanoyl chloride.

*Example 35*

N,N'-bis(diiodoacetyl)-N,N'-diisobutyl-1,4 - bis(aminomethyl)benzene using 1,4-bis(isobutylaminomethyl)benzene and diiodoacetyl chloride.

*Example 36*

N,N'-bis(difluoroacetyl)-N,N'-diethyl - 1,4 - bis(aminomethyl)benzene is obtained using 1,4-bis(ethylaminomethyl)benzene and difluoroacetyl chloride.

*Example 37*

N,N'-bis(dibromoacetyl)-N,N'-diethyl-1,4 - bis(aminomethyl)-2,5-dibromobenzene is obtained using 1,4-bis-(ethylaminomethyl)-2,5-dibromobenzene and dibromoacetyl bromide.

*Example 38*

N,N'-bis(dichloroacetyl)-N,N'-diethyl-1,3 - bis(aminomethyl)-2,6-dimethyl-4-methoxybenzene is obtained using 1,3-bis(ethylaminomethyl)-2,6-dimethyl - 4 - methoxybenzene and dichloroacetyl chloride.

*Example 39*

N,N'-bis(dichloroacetyl)-N,N'-diethyl-1,3 - bis(aminomethyl)-2-methoxy-5-chlorobenzene is obtained using 1,3-bis(ethylaminomethyl)-2-methoxy - 5 - chlorobenzene and dichloroacetyl chloride.

*Example 40*

N,N'-bis(dichloroacetyl)-N,N'-dimethyl - 1,3 - bis(aminomethyl)-4,6-dimethoxy-5-ethylbenzene is obtained using 1,3-bis(methylaminomethyl)-4,6-dimethoxy - 5 - ethylbenzene and dichloroacetyl chloride.

*Example 41*

N,N'-bis(dichloroacetyl)-N,N'- - diisopropyl - 1,3 - bis-(aminomethyl)-2,4,6-trimethylbenzene is obtained using 1,3 - bis(isopropylaminomethyl) - 2,4,6 - trimethylbenzene and dichloroacetyl chloride.

*Example 42*

N,N'-bis(dichloroacetyl)-N,N'-diethyl-1,3 - bis(aminomethyl)-2-ethoxy-5-bromobenzene is obtained using 1,3-bis(ethylaminomethyl)-2-ethoxy-5-bromobenzene and dichloroacetyl chloride.

*Example 43*

N,N'-bis(dichloroacetyl)-N,N'-diethyl-1,4 - bis(aminomethyl)-2,5-diethoxybenzene is obtained using 1,4-bis (ethylaminomethyl)-2,5-diethoxybenzene and dichloroacetyl chloride.

Example 44

N,N'-bis(dichloroacetyl)-N,N' - diisopropyl - 1,4 - bis-(aminomethyl)-2,5-dichlorobenzene is obtained using 1,4-bis(isopropylaminomethyl)-2,5-dichlorobenzene and dichloroacetyl chloride.

Example 45

N,N'-bis(dichloroacetyl)-N,N'-diethyl-1,4 - bis(aminomethyl)-2,3,5-trichlorobenzene is obtained using 1,4-bis(ethylaminomethyl)-2,3,5-trichlorobenzene and dichloroacetyl chloride.

Example 46

N,N'-bis(dichloroacetyl)-N,N'-diisobutyl-1,3 - bis(aminomethyl)-2,4,6-trichlorobenzene is obtained using 1,3-bis(isobutylaminomethyl) - 2, 4, 6 - trichlorobenzene and dichloroacetyl chloride.

Example 47

A. *N,N'-bis(hydrocarbyloxyalkyl) - bis(aminomethyl) benzenes.*—The preparation of these intermediates is illustrated by the following preparation of N,N'-bis(2-ethoxyethyl)-1,4-bis - (aminomethyl)benzene: Terephthalaldehyde (6.7 g.) was added in small portions with swirling and cooling in an ice bath to 8.9 g. of 2-ethoxyethylamine. The mixture was allowed to stand at room temperature for two hours, about 25 ml. of ethanol was added, and the bis-anil was hydrogenated at 45° C. and 40 pounds pressure of hydrogen using 250 mg. of palladium chloride and 2.0 g. of charcoal. After the theoretical quantity of hydrogen had been used, the catalyst was removed by filtration and the alcohol was removed by distillation in vacuo to yield N,N'-bis(2-ethoxyethyl)-1,4-bis(aminomethyl)benzene which when treated with ethanolic hydrochloric acid and ether gave 6.5 g. of the crystalline product as its dihydrochloride, M.P. over 250° C. A sample was recrystallized from ethanol for analysis.

*Analysis.*—Calcd. for $C_{16}H_{28}N_2O_2 \cdot 2HCl$: Cl⁻, 20.07. Found: Cl⁻, 19.93.

Following the above procedure using isophthalaldehyde in place of terephthalaldehyde, the resulting product is N,N'-bis(2-ethoxyethyl)-1,3-bis(aminomethyl)benzene.

Other N,N' - bis(hydrocarbyloxyalkyl)-1,4-bis(aminomethyl)benzene that can be prepared according to the above procedure using the appropriate hydrocarbyloxyalkylamine in place of 2-ethoxyethylamine are:

N,N'-bis(3-isopropoxypropyl)-1,4-bis-(aminomethyl) benzene using 3-isopropoxypropylamine,
N,N'-bis-(2-methoxyethyl)-1,4-bis(aminomethyl)benzene using 2-methoxyethylamine,
N,N'-bis(2-n-hexoxyethyl)-1,4-bis(aminomethyl)benzene using 2-n-hexoxyethylamine,
N,N'-bis(6-methoxyhexyl)-1,4-bis(aminomethyl)benzene using 6-methoxyhexylamine,
N,N'-bis(2-ethoxypropyl)-1,4-bis(aminomethyl)benzene using 2-ethoxypropylamine,
N,N'-bis(2-cyclohexoxyethyl)-1,4-bis(aminomethyl) benzene using 2-cyclohexoyethylamine,
N,N'-bis[2-(1-propenoxy)ethyl]-1,4-bis(aminomethyl) benzene using 2-(1-propenoxy)ethylamine,
N,N'-bis[2-(cyclopentylmethyloxy)ethyl]-1,4-bis(aminomethyl)benzene using 2-(cyclopentylmethyloxy)ethylamine,
N,N'-bis(2-phenoxyethyl)-1,4-bis(aminomethyl)benzene using 2-phenoxyethylamine,
N,N'-bis(2-benzoxyethyl)-1,4-bis(aminomethyl) benzene using 2-benzyloxyethylamine,
N,N'-bis[2-(para-tolyloxy)ethyl]-1,4-bis(aminomethyl)-benzene using 2-(para-tolyloxy)ethylamine,
N,N'-bis[2-(2-phenylethoxy)ethyl]-1,4-bis(aminomethyl)benzene using 2-(2-phenylethoxy)ethylamine, and the like.

Other N,N' - bis(hydrocarbyloxyalkyl) - bis(aminomethyl)-benzenes that can be prepared according to the above procedure using molar equivalent quantities of the appropriate reactants are:

N,N'-bis(2-ethoxyethyl)-1,3-bis(aminomethyl)-2-methoxy-5-chlorobenzene using 2-methoxy-5-chloroisophthalaldehyde and 2-ethoxyethylamine,
N,N'-bis(2-ethoxyethyl)-1,3-bis(aminomethyl)-4,6-dimethoxy-5-ethylbenzene using 4,6-dimethoxy-5-ethylisophthalaldehyde and 2-ethoxyethylamine,
N,N'-bis(2-ethoxyethyl)-1,3-bis(aminomethyl)-2,4,6-trimethylbenzene using 2,4,6-trimethylisophthalaldehyde and 2-ethoxyethylamine,
N,N'-bis(2-ethoxyethyl)-1,4-bis(aminomethyl)-2,5-dichlorobenzene using 2,5-dichloroterephthalaldehyde and 2-ethoxyethylamine,
N,N'-bis-(2-ethoxyethyl)-1,4-bis(aminomethyl)-2,3,5-trichlorobenzene using 2,3,5-trichloroterephthalaldehyde and 2-ethoxyethylamine, and the like.

B. *N,N'-bis[halogenated - (lower-alkanoyl)] - N,N'-bis(hydrocarbyloxyalkyl) - bis(aminomethyl)benzenes.*—The preparation of these compounds is illustrated by the following preparation of N,N'-bis(dichloroacetyl)-N,N'-bis-(2-ethoxyethyl) - 1,4 - bis(aminomethyl)benzenes: A mixture of 6.0 g. of N,N'-bis(2-ethoxyethyl)-1,4-bis (aminomethyl)benzene dihydrochloride dissolved in 15 ml. of water, 30 ml. of 10% sodium hydroxide, and 45 ml. of ethylene dichloride was stirred in a flask placed in an ice bath. To the cold mixture was added dropwise over the course of one-half hour 5.5 g. of dichloroacetyl chloride dissolved in 25 ml. of ethylene dichloride. Stirring was continued for an additional ten minutes; the organic layer was separated and washed first with 5% aqueous sodium hydroxide and then with 5% aqueous hydrochloric acid and finally with water. Evaporation in vacuo gave a solid which was recrystallized from ethanol to yield 4.5 g. of crystalline product. N,N'-bis(dichloroacetyl)-N,N'-bis(2-ethoxyethyl) - 1,4 - bis(aminomethyl) benzene, M.P. 137.6–143.9° C. (corr.) when recrystallized from ethanol.

*Analysis.*—Calcd. for $C_{20}H_{28}Cl_4N_2O_4$: C, 47.82; H, 5.62; Cl, 28.23. Found: C, 47.77; H, 5.68; Cl, 28.19.

As noted in Example 26B, the above procedure can be carried out using the bis-amine in free base form and a correspondingly smaller amount of sodium hydroxide.

N,N'-bis(dichloroacetyl) - N,N' - bis(2-ethoxyethyl)-1,4-bis(aminomethyl)benzene when administered orally to hamsters infected with *Endamoeba criceti* was found to have an $ED_{50}$ of 1.14±0.10 mg./kg./day. This compound was found to have an approximate acute oral toxicity ($ALD_{50}$) in mice of greater than 8,000 mg./kg.

Other representative N,N' - bis[halogenated - (lower-alkanoyl)]-N,N' - bis(hydrocarbyloxyalkyl) - bis(aminomethyl)benzenes that can be prepared following the above procedure of Example 47B using molar equivalent quantities of the appropriate reactants are the following compounds of Example 48–65.

Example 48

N,N'-bis(dibromoacetyl)-N,N'-bis(2-ethoxyethyl)-1,4-bis-(aminomethyl)benzene is obtained using N,N'-bis(2-ethoxyethyl)-1,4-bis(aminomethyl)benzene and dibromoacetyl bromide.

Example 49

N,N' - bis(diiodoacetyl) - N,N'-bis(2-ethoxyethyl)-1,4-bis(aminomethyl)benzene is obtained using N,N'-bis(2-ethoxyethyl)-1,4 - bis(aminomethyl)benzene and diiodoacetyl chloride.

Example 50

N,N' - bis(bromochloroacetyl) - N,N' - bis(3 - isopropoxypropyl)-1,4-bis(aminomethyl)benzene is obtained using N,N'-bis(3-isopropoxypropyl)-1,4-bis(aminomethyl)benzene and bromochloroacetyl chloride.

Example 51

N,N' - bis(difluoroacetyl) - N,N' - bis(2 - methoxyethyl)-1,4-bis(aminomethyl)benzene is obtained using N,N'-bis(2 - methoxyethyl) - 1,4 - bis(aminomethyl)benzene and difluoroacetyl chloride.

Example 52

N,N' - bis(2,2 - dichloropropanoyl) - N,N' - bis(2 - n-hexoxyethyl)-1,4-bis(aminomethyl)benzene is obtained using N,N' - bis(2 - n - hexoxyethyl) - 1,4 - bis(aminomethyl)benzene and 2,2-dichloropropanoyl chloride.

Example 53

N,N' - bis(2 - bromo - 3 - chloropropanoyl) - N,N'-bis(6 - methoxyhexyl) - 1,4 - bis(aminomethyl)benzene is obtained using N,N'-bis(6-methoxyhexyl)-1,4-bis(aminomethyl)benzene and 2-bromo-3-chloropropanoyl chloride.

Example 54

N,N' - bis(2,2 - dichlorobutanoyl) - N,N' - bis(2-cyclohexoxyethyl)-1,4-bis(aminomethyl)benzene is obtained using N,N' - bis(2 - cyclohexoxyethyl) - 1,4 - bis(aminomethyl)benzene and 2,2-dichlorobutanoyl chloride.

Example 55

N,N' - bis(2,3 - dichlorobutanoyl) - N,N' - bis[2 - (1-propenoxy)ethyl] - 1,4 - bis(aminomethyl)benzene is obtained using N,N'-bis[2-(1-propenoxy)ethyl]-1,4-bis(aminomethyl)benzene and 2,3-dichlorobutanoyl chloride.

Example 56

N,N' - bis(2,4 - dichlorobutanoyl) - N,N' - bis[2-(cyclopentylmethoxy)ethyl] - 1,4 - bis(aminomethyl)benzene is obtained using N,N'-bis[2-(cyclopentylmethoxy)ethyl]-1,4-bis(aminomethyl)benzene and 2,4-dichlorobutanoyl chloride.

Example 57

N,N' - bis(monochloroacetyl) - N,N' - bis(2 - phenoxyethyl)-1,4-bis(aminomethyl)benzene is obtained using N,N' - bis(2 - phenoxyethyl) - 1,4 - bis(aminomethyl)benzene and monochloroacetyl chloride.

Example 58

N,N' - bis(2 - iodopropanoyl) - N,N' - bis(2 - benzyloxyethyl)-1,4-bis(aminomethyl)benzene is obtained using N,N' - bis(2 - benzyloxyethyl) - 1,4 - bis(aminomethyl)benzene and 2-iodopropanoyl chloride.

Example 59

N,N' - bis(dichloroacetyl) - N,N' - bis[2 - (para - tolyloxy)ethyl]-1,4-bis(aminomethyl)benzene using N,N'-bis[2 - (paratolyloxy)ethyl] - 1,4 - bis(aminomethyl)benzene and dichloroacetyl chloride.

Example 60

N,N' - bis(dichloroacetyl) - N,N' - bis[2 - (2 - phenylethoxy)ethyl]-1,-bis(aminomethyl)benzene is obtained using N,N' - bis[2 - (2 - phenylethoxy)ethyl] - 1,4 - bis(aminomethyl)benzene and dichloroacetyl chloride.

Example 61

N,N' - bis(dichloroacetyl) - N,N' - bis(2 - ethoxyethyl)-1,3 - bis(aminomethyl) - 2 - methoxy - 5 - chlorobenzene is obtained using N,N'-bis(2-ethoxyethyl)-1,3-bis(aminomethyl) - 2 - methoxy - 5 - chlorobenzene and dichloroacetyl chloride.

Example 62

N,N' - bis(dichloroacetyl) - N,N' - bis(2 - ethoxyethyl) - 1,3 - bis(aminomethyl) - 4,6 - dimethoxy - 5 - ethylbenzene is obtained using N,N'-bis(2-ethoxyethyl)-1,3-bis(aminomethyl)-4,6-dimethoxy-5-ethylbenzene and dichloroacetyl chloride.

Example 63

N,N' - bis(dichloroacetyl) - N,N' - bis(2 - ethoxyethyl) - 1,3 - bis(aminomethyl) - 2,4,6 - trimethylbenzene is obtained using N,N'-bis(2-ethoxyethyl)-1,3-bis(aminomethyl)-2,4,6-trimethylbenzene and dichloroacetyl chloride.

Example 64

N,N' - bis(dichloroacetyl) - N,N' - bis(2 - ethoxyethyl) - 1,4 - bis(aminomethyl) - 2,5 - dichlorobenzene is obtained using N,N'-bis(2-ethoxyethyl)-1,4-bis(aminomethyl)-2,5-dichlorobenzene and dichloroacetyl chloride.

Example 65

N,N' - bis(dichloroacetyl) - N,N' - bis(2 - ethoxyethyl) - 1,4 - bis(aminomethyl) - 2,3,5 - trichlorobenzene is obtained using N,N'-bis(2-ethoxyethyl)-1,4-bis(aminomethyl)-2,3,5-trichlorobenzene and dichloroacetyl chloride.

Example 66.—N,N'-bis[halogenated-(lower-alkanoyl)]-N,N'-bis(formyloxyalkyl)-bis(aminomethyl)benzenes The preparation of these compounds is illustrated by the following preparation of N,N'-bis(dichloroacetyl)-N,N' - bis(2 - formyloxyethyl) - 1,4 - bis(aminomethyl)benzene: A mixture of 3.6 g. of N,N'-bis(dichloroacetyl)-N,N' - bis(2 - hydroxyethyl) - 1,4 - bis(aminomethyl)benzene and 10 ml. of formic acid was heated on a steam bath for three hours. The resulting oil was poured into water and extracted with chloroform. The chloroform solution was filtered and the filtrate concentrated in vacuo to yield an oily product which was first triturated with ethyl acetate; n-hexane was added and trituration was continued whereupon there resulted the crystalline product, N,N' - bis(dichloroacetyl) - N,N' -bis(2 - formyloxyethyl)-1,4-bis(aminomethyl)benzene, M.P. 133.5–137.1° C. (corr.) when recrystallized from ethylacetate.

*Analysis.*—Calcd. for $C_{18}H_{20}Cl_4N_2O_6$: C, 43.05; H, 4.01; Cl, 28.24. Found: C, 42.99; H, 3.90; Cl, 28.02.

N,N' -bis(dichloroacetyl) - N,N' - bis(2 - formyloxyethyl)-1,4-bis(aminomethyl)benzene when administered orally to hamsters infected with *Endamoeba criceti* was found to have an $ED_{50}$ of $10.5 \pm 0.9$ mg./kg./day.

Other N,N' - bis[halogenated - (lower - alkanoyl)]-N,N' - bis(formyloxyalky)l - bis(aminomethyl)benzenes that can be prepared following the above procedure using formic acid and the corresponding N,N'-bis[halogenated-(lower - alkanoyl)] - N,N' - bis(hydroxyalkyl) - 1,4-(or 1,3)-bis(aminomethyl)benzene are:

N,N-bis(dibromoacetyl)-N,N'-bis(2-formyloxyethyl)-1,4-bis(aminomethyl)benzene,
N,N'-bis(diiodoacetyl)-N,N'-bis(2-formyloxyethyl) 1,4-bis(aminomethyl)benzene,
N,N'-bis(difluoroacetyl)-N,N'-bis(2-formyloxyethyl)-1,4-bis(aminomethyl)benzene,
N,N'-bis(bromochloroacetyl)-N,N'-bis(2-formyloxyethyl)-1,4-bis(aminomethyl)benzene.
N,N'-bis(monochloroacetyl)-N,N'-bis(2-formyloxyethyl)-1,4-bis(aminomethyl)benzene,
N,N'-bis(2-bromopropanoyl)-N,N'-bis(2-formyloxyethyl)-1,4-bis(aminomethyl)benzene,
N,N'-bis(2,2-dichloropropanoyl)-N,N'-bis(3-formyloxypropyl)1,4-bis(aminomethyl)benzene,
N,N'-bis(2,2-dichlorobutanoyl)-N,N'-bis(2-formyloxypropyl)-1,4-bis(aminoethyl)benzene,
N,N'-bis(2,4-dibromobutanoyl)-N,N'-bis(3-formyloxypentyl)-1,4-bis(aminomethyl)benzene,
N,N'-bis(dichloroacetyl)-N,N'-bis(6-formyloxyhexyl)-1,4-bis(aminomethyl)benzene,
N,N'-bis(dichloroacetyl)-N,N'-bis(2-formyloxyethyl)-1,3-bis(aminomethyl)-2,6-dimethyl-4-methoxybenzene,
N,N'-bis(dichloroacetyl)-N,N'-bis(2-formyloxyethyl)-1,3-bis(aminomethyl)-2-methoxy-5-chlorobenzene, N,N'-bis(dichloroacetyl)-N,N'-bis(2-formyloxyethyl)-
  1,3-bis(aminomethyl)-4,6-dimethoxy-5-ethylbenzene,
N,N'-bis(dichloroacetyl)-N,N'-bis(2-formyloxyethyl)-
  1,3-bis(aminomethyl)-2,4,6-trimethylbenzene,
N,N'-bis(dichloroacetyl)-N,N'-bis(2-formyloxyethyl)-
  1,4-bis(aminomethyl)-2,3,5-trichlorobenzene,
and the like.

*Example 67.—N,N'-bis[halogenated-(lower-alkanoyl)]-N,N'-bis(acyloxyalkyl)-bis(aminomethyl)benzenes*

The preparation of these compounds is illustrated by the following preparation of N,N'-bis(dichloroacetyl)-N,N'-bis(2-acetoxyethyl)-1,4-bis(aminomethyl)benzene: A mixture of 2.5 g. of N,N'-bis(dichloroacetyl)-N,N'-bis(2-hydroxyethyl)-1,4-bis(aminomethyl)benzene, 1.5 g. of acetic anhydride and 0.45 g. of pyridine was allowed to stand at room temperature for twelve hours. About 10 ml. of water was added to the reaction mixture and the solid that separated was filtered and recrystallized from ethyl acetate to give 2.3 g. of white crystalline N,N'-bis(dichloroacetyl)-N,N'-bis(2-acetoxyethyl)-1,4-bis(aminomethyl)benzene, M.P. 152.2–154.4° C. (corr.).

*Analysis.*—Calcd. for $C_{20}H_{24}Cl_4N_2O_6$: C, 45.33; H, 4.57; Cl, 26.76. Found: C, 45.26; H, 4.60; Cl, 26.84.

The same product is obtained by reacting N,N'-bis(dichloroacetyl)-N,N'-bis(2-hydroxyethyl)-1,4-bis(aminomethyl)benzene with acetyl chloride instead of acetic anhydride.

N,N'-bis(dichloroacetyl)-N,N'-bis(2-acetoxyethyl)-1,4-bis(aminomethyl)benzene when administered orally to hamsters infected with *Endamoeba criceti* was found to clear none out of 5 and 6 out of 10 of the animals at dose levels of 12.5 and 25 mg./kg./day, respectively.

Using other acyl anhydrides or halides and the corresponding N,N'-[halogenated-(lower-alkanoyl)]-N,N'-bis(hydroxyalkyl)-bis(aminomethyl)benzene and following the foregoing procedure, the resulting products are obtained:

N,N'-bis(dibromoacetyl)-N,N'-bis(2-n-butanoyloxyethyl)-1,4-bis(aminomethyl)benzene using n-butanoyl chloride,
N,N'-bis(diiodoacetyl)-N,N'-bis(3-chloroacetoxypropyl)-1,4-bis(aminomethyl)benzene using chloroacetic anhydride or chloroacetyl chloride,
N,N'-bis(difluoroacetyl)-N,N'-bis(2-dichloroacetoxypropyl)-1,4-bis(aminomethyl)benzene using dichloroacetyl chloride,
N,N'-bis(bromochloroacetyl)-N,N'-bis(4-trichloroacetoxybutyl)-1,4-bis(aminoethyl)benzene using trichloroacetyl chloride,
N,N'-bis(monochloroacetyl)-N,N'-bis(3-acetoxypentyl)-1,4-bis(aminomethyl)benzene using acetyl chloride,
N,N'-bis(2-bromopropanoyl)-N,N'-bis(6-acetoxyhexyl)-1,4-bis(aminomethyl)benzene using acetic anhydride,
N,N'-bis(2,2-dichloropropanoyl)-N,N'-bis-[2-(3-carboxypropanoyloxy)ethyl]-1,4-bis(aminomethyl)benzene using succinic anhydride.
N,N'-bis(2,2-dichlorobutanoyl)-N,N'-bis(2-diethylaminoacetoxyethyl)-1,4-bis(aminomethyl)benzene using diethylaminoacetyl chloride,
N,N'-bis(2,2-dichloropropanoyl)-N,N'-bis(3-benzoyloxypropyl)-1,4-bis(aminomethyl)benzene using benzoyl chloride,
N,N'-bis(2,4-dibromobutanoyl)-N,N'-bis[2-(4-chlorobenzoyloxy)ethyl]1,4-bis(aminomethyl)benzene using 4-chlorobenzoyl chloride,
N,N'-bis(dibromoacetyl)-N,N'-bis(2-acetoxyethyl)-1,3-bis(aminomethyl)-2-ethoxy-5-bromobenzene using acetic anhydride,
N,N'-bis(dichloroacetyl)-N,N'-bis(2-acetoxyethyl)-1,4-bis(aminomethyl)-2,5-diethoxybenzene using acetic anhydride,
N,N'-bis(dichloroacetyl)-N,N'-bis(2-acetoxyethyl)-1,4-bis(aminomethyl)-2,5-dichlorobenzene using acetic anhydride,
N,N'-bis(dichloroacetyl)-N,N'-bis(2-acetoxyethyl)-1,3-bis(aminomethyl)-2,4,6-trichlorobenzene using acetic anhydride, and the like.

*Example 68*

A. *N,N'-diisopropyl-1,4-bis(aminomethyl)benzene.*—This compound was prepared following the procedure described above in Example 26A using 7.0 g. of terephthalaldehyde and 12 g. of isopropylamine. There was thus obtained after hydrogenation of the anil 7 g. of N,N'-diisopropyl-1,4-bis(aminomethyl)benzene dihydrochloride, M.P. over 260° C.

*Analysis.*—Calcd. for $C_{14}H_{24}N_2 \cdot 2HCl$: Cl⁻, 24.18. Found: Cl⁻, 23.93.

B. *N,N'-bis(monochloroacetyl)-N,N'-diisopropyl-1,4-bis(aminomethyl)benzene.*—This compound was prepared following the procedure described above in Example 26B using 7.0 g. of N,N'-diisopropyl-1,4-bis(aminomethyl)benzene dihydrochloride in a mixture containing 45 cc. of 10% aqueous sodium hydroxide solution and 50 cc. of ethylene dichloride, and 6.5 g. of monochloroacetyl chloride in 15 cc. of ethylene dichloride. There was thus obtained 4.2 g. of product, M.P. 126.1–128.2° C. (corr.).

*Analysis.*—Calcd. for $C_{18}H_{26}Cl_2N_2O_2$: C, 57.92; H, 7.02; Cl, 19.00. Found: C, 57.86; H, 7.03; Cl, 18.99.

N,N'-bis(monochloroacetyl)-N,N'-diisopropyl-1,4-bis(aminomethyl)benzene when administered orally to hamsters infected with *Endamoeba criceti* was found to have an $ED_{50}$ of 2.5±0.4 mg./kg./day. This compound was found to have an approximate acute oral toxicity ($ALD_{50}$) in mice of greater than 8,000 mg./kg.

*Example 69*

A. *N,N'-dimethyl-1,4-bis(aminomethyl)benzene.*—This compound was prepared following the procedure described in Example 26A using 13.4 g. of terephthalaldehyde and 30 ml. of 60% aqueous methylamine. There was thus obtained after hydrogenation of the anil an 80% yield of the product isolated as its dihydrochloride, M.P. over 260° C.

*Analysis.*—Calcd. for $C_{10}H_{16}N_2 \cdot 2HCl$: Cl⁻, 29.91. Found: Cl⁻, 29.40.

B. *N,N'-bis(dichloroacetyl)-N,N'-dimethyl-1,4-bis(aminomethyl)benzene.*—This compound was prepared following the procedure described in Example 26B using 4.5 g. of N,N'-dimethyl-1,4-bis(aminomethyl)benzene dihydrochloride in an aqueous-ethylene dichloride mixture containing 3.3 g. of sodium hydroxide, and 6.1 g. of dichloroacetyl chloride in ethylene dichloride. There was thus obtained 3.7 g. of white crystalline product, M.P. 105.2–107.7° C. (corr.).

*Analysis.*—Calcd. for $C_{14}H_{16}Cl_4N_2O_2$: C, 43.54; H, 4.18; Cl, 36.73. Found: C, 43.98; H, 3.96; Cl, 36.39.

N,N',bis(dichloroacetyl)-N,N'-dimethyl-1,4-bis(aminomethyl)benzene when administered orally to hamsters infected with *Endamoeba criceti* was found to have an $ED_{50}$ of 4.3±1.2 mg./kg./day.

*Example 70.—N,N'-bis(dichloroacetyl)-N,N'-diethyl-1,4-bis(aminomethyl)benzene*

This compound was prepared following the procedure described in Example 26B using 7 g. of N,N'-diethyl-1,4-bis(aminomethyl)benzene dihydrochloride in a water-ethylene dichloride mixture containing 4.5 g. of sodium hydroxide, and 8.8 g. of dichloroacetyl chloride in ethylene dichloride. There was thus obtained 7 g. of product, M.P. 98.0–102.2° C. (corr.).

*Analysis.*—Calcd. for $C_{16}H_{20}Cl_4N_2O_2$: C, 46.40; H, 4.87; Cl, 34.23. Found: C, 46.06; H, 4.66; Cl, 34.13.

N,N'-bis(dichloroacetyl)-N,N'-diethyl-1,4-bis(aminomethyl)benzene when administered orally to hamsters infected with *Endamoeba criceti* was found to have an $ED_{50}$ of 1.90±0.26 mg./kg./day. This compound was found to have an approximate acute oral toxicity ($ALD_{50}$) in mice of greater than 12,000 mg./kg.

*Example 71.—N,N'bis(dichloroacetyl)-N,N'-diisopropyl-1,4-bis(aminomethyl)-benzene*

This compound was prepared following the procedure described in Example 26B using 3.0 g. of N,N'-diisopropyl-1,4-bis(aminomethyl)benzene dihydrochloride in a mixture containing 20 cc. of ethylene dichloride and 11.2 cc. of 10% aqueous sodium hydroxide solution, and 4.5 g. of dichloroacetyl chloride in 10 cc. of ethylene dichloride. There was thus obtained 1.8 g. of product, M.P. 175.9–180.1° C. (corr.).

*Analysis.*—Calcd. for $C_{18}H_{24}Cl_4N_2O_2$: C, 48.89; H, 5.47; Cl, 32.07. Found: C, 48.60; H, 5.36; Cl, 31.86.

N,N' - bis(dichloroacetyl) - N,N' - diisopropyl-1,4-bis(aminomethyl)benzene when administered orally to hamsters infected with *Endamoeba criceti* was found to clear none out of 5 and 5 out of 8 of the animals at dose levels of 12.5 and 25 mg./kg./day, respectively.

*Example 72.—N,N' - bis(dibromoacetyl) - N,N'-diethyl-1,4-bis(aminomethyl)-benzene*

This preparation was carried out following the procedure described in Example 26B using 5.3 g. of N,N'-diethyl-1,4-bis(aminomethyl)benzene dihydrochloride, 3.2 g. of sodium hydroxide, 50 cc. of water, 50 cc. of ethylene dichloride, and 9.5 g. of dibromoacetyl chloride in 25 cc. of ethylene dichloride. There was thus obtained 9.1 g. of N,N' - bis(dibromoacetyl) - N,N'-diethyl - 1,4-bis(aminomethyl)benzene, M.P. 134.8–136.4° C. (corr.).

*Analysis.*—Calcd. for $C_{16}H_{20}Br_4N_2O_2$: Br, 54.00; N, 4.74. Found: Br, 53.94; N, 4.65.

N,N' - bis(dibromoacetyl)-N,N'-diethyl-1,4-bis(aminomethyl)benzene when administered orally to hamsters infected with *Endamoeba criceti* was found to have an $ED_{50}$ of 0.85±0.20 mg./kg./day. This compound was found to have an approximate acute oral toxicity ($ALD_{50}$) in mice of greater than 8,000 mg./kg.

*Example 73.—N,N' - bis(difluoroacetyl) - N,N'-diethyl-1,4-bis(aminomethyl)benzene*

This compound was prepared following the procedure described in Example 26B using 9.8 g. of N,N'-diethyl-1,4-bis(aminomethyl)benzene dihydrochloride, 6 g. of sodium hydroxide, about 50 cc. of water, about 100 cc. of ethylene dichloride, and about 12.5 g. of difluoroacetyl chloride in benzene. There was thus obtained 4.5 g. of N,N' - bis(difluoroacetyl) - N,N' - diethyl-1,4-bis(aminoethyl)benzene, M.P. 97.2–100.2° C. (corr.).

*Analysis.*—Calcd. for $C_{16}H_{20}F_4N_2O_2$: N, 8.04; O, 9.20. Found: N, 7.92; O, 9.20.

N,N' - bis(difluoroacetyl) - N,N' - diethyl - 1,4-bis(aminomethyl)benzene when administered orally to hamsters infected with *Endamoeba criceti* was found to clear one out of 5 and 3 out of 5 of the animals at dose levels of 50 and 100 mg./kg./day, respectively.

*Example 74.—N,N' - bis(dichlorofluoroacetyl) - N,N'-diethyl-1,4bis(aminomethyl)benzene*

This compound was prepared following the procedure described in Example 26B using 10 g. of N,N'-diethyl-1,4-bis(aminomethyl)benzene dihydrochloride, 6.1 g. of sodium hydroxide, about 50 cc. of water, about 50 cc. of ethylene dichloride, and 12.5 g. of dichlorofluoroacetyl chloride in about 50 cc. of ethylene dichloride. There was thus obtained 16.4 g. of N,N'-bis(dichlorofluoroacetyl)-N,N'-diethyl-1,4-bis(aminomethyl)benzene, M.P. 95.4–100.4° C. (corr.).

*Analysis.*—Calcd. for $C_{16}H_{18}Cl_4F_2N_2O_2$: C, 42.72; H, 4.04; N, 6.22. Found: C, 42.51; H, 4.19; N, 6.18.

N,N' - bis(dichlorofluoroacetyl) - N,N' - diethyl-1,4-bis(aminomethyl)benzene when administrated orally to hamsters infected with *Endamoeba criceti* was found to clear 1 out of 5 and 2 out of 4 of the animals at dose levels of 50 and 100 mg./kg./day, respectively.

*Example 75.—N,N'-bis(dichloroacetyl)-N,N'-di-n-propyl-1,4-bis(aminomethyl)benzene*

This compound was prepared following the procedure described in Example 26B using 10 g. of N,N'-di-n-propyl-1,4-bis(aminomethyl)benzene dihydrochloride, 5.7 g. of sodium hydroxide, about 50 cc. of water, about 50 cc. of ethylene dichloride, and 10.5 g. of dichloroacetyl chloride in about 50 cc. of ethylene dichloride. There was thus obtained 11.5 g. of N,N'-bis(dichloroacetyl)-N,N'-di-n-propyl-1,4-bis(aminomethyl)benzene, M.P. 81.2–84.0° C. (corr.).

*Analysis.*—Calcd. for $C_{18}H_{24}Cl_4N_2O_2$: Cl, 32.08; N, 6.33. Found: Cl, 31.60; N, 6.30.

N,N' - bis(dichloroacetyl) - N,N' - di-n-propyl-1,4-bis(aminomethyl)benzene when administered orally to hamsters infected with *Endamoeba criceti* was found to have an $AED_{50}$ of 16 mg./kg./day.

*Example 76.—N,N'-bis(dichloroacetyl)-N,N'-diethyl-1,6-hexanediamine*

The intermediate N,N'-diethyl-1,6-hexanediamine in the form of its dihydrobromide was prepared as follows: To 300 cc. of 70% aqueous ethylamine was added with stirring 24.4 g. of 1,6-dibromohexane. Stirring was continued for about five hours after which time the reaction mixture was concentrated in vacuo; and white crystalline solid that separated was collected, washed with ether and recrystallized from isopropyl alcohol-ethanol to yield 19.9 g. of N,N'-diethyl-1,6-hexanediamine dihydrobromide, M.P. 259–260° C.

*Analysis.*—Calcd. for $C_{10}H_{24}N_2 \cdot 2HBr$: Br, 47.82. Found: Br, 46.70.

Following the above-described procedure for the preparation of N,N'-diethyl-1,6-hexanediamine dihydrobromide using corresponding molar equivalent quantities of the appropriate dibromoalkanes and primary amines ($2NH_2$) in place of 1,6-dibromohexane and ethylamine, respectively, the compounds of Table A were prepared.

TABLE A $Z-NH-(CH_2)_n-NHZ \cdot 2HBr$

| No. | Z | n | M.P., ° C. |
|---|---|---|---|
| 1 | $CH_3$ | 6 | 200–203 |
| 2 | i-$C_3H_7$ | 6 | 229–232 |
| 3 | n-$C_3H_7$ | 6 | a 294–298 |
| 4 | n-$C_4H_9$ | 6 | >300 |
| 5 | $(CH_2)_2OH$ | 6 | 163–166 |
| 6 | $(CH_2)_2OC_2H_5$ | 6 | 222–225 |
| 7 | $(CH_2)_2OCH_3$ | 6 | 194–197 |
| 8 | $C_2H_5$ | 10 | 275–276 | a Dec.

To a stirred mixture containing 10 g. of N,N'-diethyl-1,6-hexanediamine dihydrobromide, 6.0 g. of sodium hydroxide, 100 cc. of water and 100 cc. of ethylene dichloride kept between 5–10° C., was added dropwise a solution of 10.3 g. of dichloroacetyl chloride in 50 cc. of ethylene dichloride. The reaction mixture was stirred at about 5° C. for an additional 30 minutes, the layers were then separated, and the aqueous layer was washed with ethylene dichloride. The combined ethylene dichloride layer and washings were washed successively with water, 1 N HCl, water, aqueous sodium acetate solution and water. The ethylene dichloride solution was then dried over anhydrus sodium sulfate and distilled in vacuo. The residual material was crystallized by dissolving it in isopropyl alcohol and then adding ether. The crystalline product thus obtained was recrystallized from isopropyl alcohol to yield 7.6 g. of N,N'-bis(dichloroacetyl)-N,N'-diethyl-1,6-hexanediamine, M.P. 72.8–74.4° C. (corr.).

*Analysis.*—Calcd. for $C_{14}H_{24}Cl_4N_2O_2$: Cl, 35.97; N, 7.11. Found: Cl, 35.41; N, 7.07.

N,N' - bis(dichloroacetyl)-N,N'-diethyl-1,6-hexanediamine when administered orally to hamsters infected with *Endamoeba criceti* was found to clear 3 out of 5 and 5 out of 5 of the animals at dose levels of 3.12 and 6.25 mg./kg./day, respectively. This compound was found to have an acute oral toxicity (ALD$_{50}$) in mice of greater than 16,000 mg./kg.

*Example 77.—N,N'-bis(dichloroacetyl)-N,N'-diethyl-1,3-propanediamine*

This preparation was carried out following the procedure described in Example 76 using 5.2 g. of N,N'-diethyl-1,3-propanediamine dihydrochloride, 4.4 g. of sodium hydroxide, about 75 cc. of water about 75 cc. of ethylene dichloride, and 7.6 g. of dichloroacetyl chloride in about 75 cc. of ethylene dichloride. There was thus obtained 3.2 g. of N,N'-bis(dichloroacetyl)-N,N'-diethyl-1,3-propanediamine, B.P. 177–180° C. at 0.005 mm., $n_D^{27}$=1.5210.

*Analysis.*—Calcd. for $C_{11}H_{18}Cl_4N_2O$: Cl, 40.20; N, 7.95. Found: Cl, 39.90; N, 7.90.

N,N' - bis(dichloroacetyl) - N,N'-diethyl-1,3-propanediamine when administered orally to hamsters infected with *Endamoeba criceti* was found to clear none out of 5 and 4 out of 5 of the animals at dose levels of 25 and 50 mg./kg./day, respectively.

The intermediate N,N'-diethyl-1,3-propanediamine dihydrochloride was prepared by the following procedure: To 130 cc. of 70% aqueous ethylamine solution was added gradually 17.2 g. of methyl acrylate, whereupon an exothermic reaction took place. The reaction mixture was allowed to stand at room temperature overnight; the excess ethylamine was distilled in vacuo; and the residual oil was distilled in vacuo to yield 25.1 g. of N,N'-diethyl-3-aminopropanamide, B.P. 105–106° C. at 1 mm., $n_D^{25}$=1.4600.

*Analysis.*—Calcd. for $C_7H_{16}N_2O$: $N_{AP}$, 9.70. Found: $N_{AP}$, 9.55.

To a stirred suspension containing 8.55 g. of lithium aluminum hydride in 200 cc. of ether was added dropwise a solution containing 14.4 g. of N,N'-diethyl-3-aminopropanamide in 100 cc. of ether, the addition taking about one hour. The reaction mixture was then refluxed with stirring for an additional five hours. The reaction mixture was next treated dropwise with stirring with successive portions of 9 cc. of 20% aqueous sodium hydroxide solution and 27 cc. of water; the resulting mixture was filtered; the layers of the filtrate were separated; and the ether layer was dried over anhydrous magnesium sulphate. The dried ether solution was concentrated in vacuo to yield an oil which was dissolved in ethanol and treated with excess ethanolic hydrogen chloride. The mixture was cooled and treated with ether to yield 5.5 g. of N,N' - diethyl - 1,3 - propanediamine dihydrochloride, M.P. 309–310° C. A small sample was recrystallized from ethanol for analysis.

*Analysis.*—Calcd. for $C_7H_{18}N_2$·2HCl: Cl$^-$, 34.90. Found: Cl, 35.20.

*Example 78*

N,N' - bis(dichloroacetyl) - N,N'-diethyl-1,4-butanediamine was prepared following the procedure described in Example 76 using 4.3 g. of N,N'-diethyl-1,4-butanediamine dihydrochloride, 3.5 g. of sodium hydroxide, 50 cc. of water, 6.2 g. of dichloroacetyl chloride and a total of 150 cc. of ethylene dichloride. There was thus obtained 5.5 g. of N,N'-bis(dichloroacetyl)-N,N'-diethyl-1,4-butanediamine, M.P. 139.8–142.0° C. (corr.).

*Analysis.*—Calcd. for $C_{12}H_{20}Cl_4N_2O_2$: Cl, 38.74; N, 7.65. Found: Cl, 38.50; N, 7.51.

N,N' - bis(dichloroacetyl) - N,N'-diethyl-1,4-butanediamine when administered orally to hamsters infected with *Endamoeba criceti* was found to have an ED$_{50}$ of 5.6±0.8 mg./kg./day.

The intermediate N,N'-diethyl-1,4-butanediamine dihydrochloride was prepared by refluxing for about twenty-four hours a stirred mixture containing 13 g. of N,N'-diethylsuccinamide, 12.9 g. of lithium aluminum hydride and about 300 cc. of absolute ether. The reaction mixture was then treated successfully with 13 cc. of water, 13 cc. of 20% aqueous sodium hydroxide solution and 39 cc. of water. The mixture was filtered, and the ether layer was separated and concentrated in vacuuo to yield an oil. The oil was dried by azeotropically distilling with benzene and was then dissolved in isopropyl alcohol and treated with excess ethanolic hydrogen chloride followed by addition of ether to give 4.0 g. of N,N'-diethyl-1,4-butanediamine dihydrochloride, M.P. 300–302° C.

*Analysis.*—Calcd. for $C_8H_{20}N_2$·2HCl: Cl, 32.70. Found: Cl, 32.80.

*Example 79*

N,N' - bis(dichloroacetyl) - N,N'-diethyl-1,5-pentanediamine was prepared following the procedure described in Example 76 using 5 g. of N,N'-diethyl-1,5-pentanediamine dihydrochloride, 3.8 g. of sodium hydroxide, 75 cc. of water, 6.4 g. of dichloroacetyl chloride and a total of 150 cc. of ethylene dichloride. There was thus obtained 5.6 g. of N,N'-bis(dichloroacetyl)-N,N'-diethyl-1,5-pentanediamine, M.P. 106.0–107.2° C. (corr.), after one recrystallization from isopropyl alcohol.

*Analysis.*—Calcd. for $C_{13}H_{22}Cl_4N_2O_2$: Cl, 37.35; N, 7.37. Found: Cl, 37.40; N, 7.23.

N,N' - bis(dichloroacetyl) - N,N'-diethyl-1,5-pentanediamine when administered orally to hamsters infected with *Endamoeba criceti* was found to clear 5 out of 5 and 5 out of 5 of the animals at dose levels of 12.5 and 25 mg./kg./day, respectively.

The intermediate N,N'-diethyl-1,5-pentanediamine dihydrobromide was prepared as follows: A mixture containing 25 g. of diethyl glutarate and about 150 cc. of 70% aqueous ethylamine solution was allowed to stand at room temperature for about forty hours and then distilled in vacuuo. The resulting white solid was treated with 200 cc. of benzene and the resulting mixture dried by azeotropic distillation of some of the benzene. The benzene solution was cooled and the precipitate that separated was collected to yield 25 g. of N,N'-diethyl-1,5-pentanediamide, M.P. 137–139° C. A sample was recrystallized from benzene for analysis.

*Analysis.*—Calcd. for $C_9H_{18}N_2O_2$: N, 15.05. Found: N, 14.16.

To a stirred mixture of 23 g. of lithium aluminum hydride in about 350 cc. of ether was added in small portions 25 g. of N,N'-diethyl-1,5-pentanediamide; and the resulting mixture stirred under reflux for about five hours. The reaction mixture was worked up according to the procedure described above in Example 78 for the preparation of N,N'-diethyl-1,4-butanediamine dihydrochloride and there was thus obtained 15 g. of N,N'-diethyl-1,5-pentanediamine dihydrochloride, M.P. 288–290° C. with decomposition.

*Analysis.*—Calcd. for $C_9H_{22}N_2$·2HCl: Cl$^-$, 30.70. Found: Cl$^-$, 31.10.

*Example 80*

N,N' - bis(dichloroacetyl) - N,N'-dimethyl-1,6-hexanediamine was prepared following the procedure described in Example 76 using 5.7 g. of N,N'-dimethyl-1,6-hexanediamine dihydrobromide, 3.1 g. of sodium hydroxide, 50 cc. of water, 50 cc. of ethylene dichloride, and 5.6 g. of dichloroacetyl chloride in 50 cc. of ethylene dichloride. There was thus obtained 5.1 g. of N,N'-bis(dichloroacetyl) - N,N'-dimethyl-1,6-hexanediamine, M.P. 122.2–123.2° C. (corr.), after one recrystallization from isopropyl alcohol.

*Analysis.*—Calcd. for $C_{12}H_{20}Cl_4N_2O_2$: Cl, 38.74; N, 7.65. Found: Cl, 38.60; N, 7.59.

N,N' - bis(dichloroacetyl) - N,N' - dimethyl - 1,6-hexanediamine when administered orally to hamsters infected with *Endamoeba criceti* was found to clear 3 out of 5 and

Example 81

N,N' - bis(dibromoacetyl) - N,N' - diethyl - 1,6-hexanediamine was prepared following the procedure described in Example 76 using 6.0 g. of N, N'-diethyl-1,6-hexanediamine dihydrobromide, 3.6 g. of sodium hydroxide, 50 cc. of water, 50 cc. of ethylene dichloride, and 8.5 g. of dibromoacetyl chloride in 50 cc. of ethylene dichloride. There was thus obtained 6.3 g. of N,N'-bis(dibromoacetyl)-N,N'-diethyl-1,6-hexanediamine, M.P. 109.4–111.6° C. (corr.), after crystallization from isopropyl alcohol.

Analysis.—Calcd. for $C_{14}H_{24}Br_4N_2O_2$: Br, 55.90; N, 4.90. Found: Br, 55.75; N, 4.79.

N,N' - bis(dibromoacetyl) - N,N'-diethyl-1,6-hexanediamine when administered orally to hamsters infected with *Endamoeba criceti* was found to clear 4 out of 5 and 5 out of 5 of the aminals at dose levels of 3.12 and 6.25 mg./kg./day, respectively.

Example 82

N,N' - bis(dichloroacetyl) - N,N'-diisopropyl-1,6-hexanediamine was prepared following the procedure described in Example 76 using 5.1 g. of N,N'-diisopropyl-1,6-hexanediamine dihydrobromide, 2.8 g. of sodium hydroxide, 50 cc. of water, 50 cc. of ethylene dichloride, and 4.1 g. of dichloroacetyl chloride in 50 cc. of ethylene dichloride. There was thus obtained 3.8 g. of N,N'-bis(dichloroacetyl) - N,N'-diisopropyl-1,6-hexanediamine, M.P. 105.6–110.0° C. (corr.).

Analysis.—Calcd. for $C_{16}H_{28}Cl_4N_2O_2$: Cl, 33.58; N, 6.64. Found: Cl, 34.00; N, 6.56.

N,N' - bis(dichloroacetyl)-N,N'-diisopropyl-1,6-hexanediamine when administered orally to hamsters infected with *Endamoeba criceti* was found to clear 3 out of 4 and 5 out of 5 of the animals at dose levels of 6.25 and 12.5 mg./kg./day, respectively.

Example 83

N,N' - bis(dichloroacetyl)-N,N'-di-n-propyl-1,6-hexanediamine was prepared following the procedure described in Example 76 using 5.0 g. of N,N'-di-n-propyl-1,6-hexanediamine dihydrobromide, 2.8 g. of sodium hydroxide, 50 cc. of water, 75 cc. of ethylene dichloride, and 4.1 g. of dichloroacetyl chloride in 25 cc. of ethylene dichloride. There was thus obtained 2.9 g. of N,N'-bis(dichloroacetyl)-N,N'-di-n-propyl-1,6-hexanediamine, M.P. 56.0–58.2° C. (corr.), after two recrystallizations from cyclohexane.

Analysis.—Calcd. for $C_{16}H_{28}Cl_4N_2O_2$: Cl, 33.58; N, 6.64. Found: Cl, 33.65; N, 6.62.

N,N' - bis(dichloroacetyl)-N,N'-di-n-propyl-1,6-hexanediamine when administered orally to hamsters infected with *Endamoeba criceti* was found to clear 5 out of 5 of the animals at each of the dose levels of 6.25 and 12.5 mg./kg./day, respectively.

Example 84

N,N' - bis(dichloroacetyl)-N,N'-di-n-butyl-1,6-hexanediamine was prepared following the procedure described in Example 76 using 7.0 g. of N,N'-di-n-butyl-1,6-hexanediamine dihydrobromide, 3.6 g. of sodium hydroxide, 100 cc. of water, 100 cc. of ethylene dichloride, and 5.3 g. of dichloroacetyl chloride in 50 cc. of ethylene dichloride. There was thus obtained, as a light brown oil, 7.2 g. of N,N' - bis(dichloroacetyl)-N,N'-di-n-butyl-1,6-hexanediamine, after drying at 2.5 mm. and 40° C. for one hour.

Analysis.—Calcd. for $C_{18}H_{32}Cl_4N_2O_2$: Cl, 31.50; N, 6.22. Found: Cl 31.60; N, 6.12.

N,N' - bis(dichloroacetyl)-N,N'-di-n-butyl-1,6-hexanediamine when administered orally to hamsters infected with *Endamoeba criceti* was found to clear 3 out of 5 and 4 out of 5 of the animals at dose levels of 6.25 and 12.5 mg./kg./day, respectively.

Example 85

N,N'-bis(dichloroacetyl)-N,N'-bis(2-hydroxyethyl)-1,6-hexanediamine was prepared following the procedure described in Example 76 using 7.9 g. of N,N'-bis(2-hydroxyethyl)-1,6-hexanediamine dihydrobromide, 4.4 g. of sodium hydroxide, 100 cc. of water, 100 cc. of ethylene dichloride, and 7.4 g. of dichloroacetyl chloride in 50 cc. of ethylene dichloride. There was thus obtained 3.9 g. of N,N' - bis(dichloroacetyl)-N,N'-bis(2-hydroxyethyl)-1,6-hexanediamine, M.P. 127.8–130.2° C. (corr.), after two recrystallizations from isopropyl alcohol.

Analysis.—Calcd. for $C_{14}H_{24}Cl_4N_2O_4$: Cl: 33.27; N, 6.57. Found: Cl, 33.00; N, 6.41.

N,N' - bis(dichloroacetyl)-N,N'-bis(2-hydroxyethyl-1,6-hexanediamine when administered orally to hamsters infected with *Endamoeba criceti* was found to clear 2 out of 5, 3 out of 5 and 5 out of 5 of the animals at dose levels of 6.25, 12.5 and 25 mg./kg./day, respectively.

Example 86

N,N' - bis(2 - acetoxyethyl)-N,N'-bis(dichloroacetyl)-1,6-hexanediamine was prepared as follows: To 4.0 g. of N,N' - bis(dichloroacetyl)-N,N'-bis(2-hydroxyethyl)-1,6-hexanediamine was added 2.5 g. of acetic anhydride and 0.7 g. of pyridine and the resulting mixture was allowed to stand at room temperature overnight. Water was added to the reaction mixture and the viscous white oily precipitate was extracted with ethyl acetate. The extract was dried, evaporated, and the residual oily material was dissolved in isopropyl alcohol. The alcohol solution was treated with decolorizing charcoal, filtered and water was added to the filtrate to yield a solid precipitate, which was recrystallized from isopropyl alcohol and dried at 20 mm. and 50° C. for two hours to yield 2.9 g. of N,N'-bis(2 - acetoxyethyl) - N,N'-bis(dichloroacetyl)-1,6-hexanediamine, M.P. 64.2–66.6° C. (corr.).

Analysis.—Calcd. for $C_{18}H_{28}Cl_4N_2O_6$: Cl 27.77; N, 5.49. Found: Cl, 27.50; N, 5.51.

N,N' - bis(2 - acetoxyethyl)-N,N'-bis(dichloroacetyl)-1,6-hexanediamine when administered orally to hamsters infected with *Endamoeba criceti* was found to clear 4 out of 5 and 5 out of 5 of the animals at dose levels of 25 and 50 mg./kg./day, respectively.

Example 87

N,N' - bis(dichloroacetyl) - N,N'-bis(2-ethoxyethyl)-1,6-hexanediamine was prepared following the procedure described in Example 76 using 7.0 g. of N,N'-bis(2-ethoxyethyl)-1,6-hexanediamine dihydrobromide, 3.4 g. of sodium hydroxide, 100 cc. of water, 100 cc. of ethylene dichloride, and 5.0 g. of dichloroacetyl chloride in 50 cc. of ethylene dichloride. There was thus obtained 6.2 g. of N,N'-bis(dichloroacetyl) - N,N' - bis(2 - ethoxyethyl)-1,6-hexanediamine, M.P. 92.0–93.6° C. (corr.).

Analysis.—Calcd for $C_{18}H_{32}Cl_4N_2O_4$: Cl, 29.40; N, 5.81. Found: Cl, 29.30; N, 5.76.

N,N' - bis(dichloroacetyl)-N,N'-bis(2-ethoxyethyl)-1,6-hexanediamine when administered orally to hamsters infected with *Endamoeba criceti* was found to clear 5 out of 5 of the animals at each of the dose levels of 3.12 and 6.25 mg./kg./day, respectively.

Example 88

N,N' - bis(dichloroacetyl)-N,N'-bis(2-methoxyethyl)-1,6-hexanediamine was prepared following the procedure described in Example 76 using 8.9 g. of N,N'-bis(2-methoxyethyl)-1,6-hexanediamine dihydrobromide, 4.8 g. of sodium hydroxide, 100 cc. of water, 100 cc. of ethylene dichloride, and 6.8 g. of dichloroacetyl chloride in 50 cc. of ethylene dichloride. There was thus obtained 7.3 g. of N,N' - bis(dichloroacetyl) - N,N' - bis(2-methoxyethyl)-1,6-hexanediamine, M.P. 96.6–98.2° C. (corr.).

Analysis.—Calcd. for $C_{16}H_{28}Cl_4N_2O_4$: Cl, 31.21; N, 6.16. Found: Cl, 31.50; N, 5.97.

N,N' - bis(dichloroacetyl) - N,N'-bis(2-methoxyethyl)-1,6-hexanediamine when administered orally to hamsters infected with *Endamoeba criceti* was found to clear 5 out of 5 of the animals at each of the dose levels of 6.25 and 12.5 mg./kg./day, respectively.

Example 89

N,N' - diethyl - N,N'-bis(trichloroacetyl)-1,6-hexanediamine was prepared following the procedure described in Example 76 using 7.0 g. of N,N'-diethyl-1,6-hexanediamine dihydrobromide, 4.4 g. of sodium hydroxide, 100 cc. of water, 100 cc. of ethylene dichloride, and 9.1 g. of trichloroacetyl chloride in 50 cc. of ethylene dichloride. There was thus obtained, as a yellow viscous oil, 8.2 g. of N,N' - diethyl - N,N' - bis(trichloroacetyl) - 1,6-hexanediamine, $n_D^{25}=1.5190$, after drying at 5 mm. for one hour at room temperature.

*Analysis.*—Calcd. for $C_{14}H_{22}Cl_6N_2O_2$: Cl, 45.92; N, 6.05. Found: Cl, 45.50; N, 6.0.

N,N' - diethyl - N,N'-bis(trichloroacetyl)-1,6-hexanediamine when administered orally to hamsters infected with *Endamoeba criceti* was found to clear 6 out of 10 and 5 out of 5 of the animals at dose levels of 6.25 and 12.5 mg./kg./day, respectively.

Example 90

N,N' - bis(dichloroacetyl) - N,N'-diethyl-1,10-decanediamine was prepared following the procedure described in Example 76 using 8.2 g. of N,N'-diethyl-1,10-decanediamine dihydrobromide, 4.4 g. of sodium hydroxide, 150 cc. of water, 100 cc. of ethylene dichloride, and 7.4 g. of dichloroacetyl chloride in 50 cc. of ethylene dichloride. There was thus obtained, as a yellow viscous oil, 5.9 g. of N,N' - bis(dichloroacetyl)-N,N'-diethyl-1,10-decanediamine after drying at 3.5 mm. for 30 minutes at room temperature.

*Analysis.*—Calcd. for $C_{18}H_{32}Cl_4N_2O_2$: Cl, 31.49; N, 6.22. Found: Cl, 31.31; N, 6.14.

N,N' - bis(dichloroacetyl) - N,N'-diethyl-1,10-decanediamine when administered orally to hamsters infected with *Endamoeba criceti* was found to have an $ED_{50}$ of 0.70±0.23 mg./kg./day. This compound was found to have an approximate acute oral toxicity ($ALD_{50}$) in mice of greater than 2,000 mg./kg.

Example 91

N,N' - bis(dichloroacetyl) - N,N'-diethyl-3-methyl-1,6-hexanediamine was prepared following the procedure described in Example 76 using 9 g. of N,N'-diethyl-3-methyl-1,6-hexanediamine dihydrochloride, 2.6 g. of sodium hydroxide, 100 cc. of water, 11.4 g. of dichloroacetyl chloride and a total of 100 cc. of ethylene dichloride. There was thus obtained, as a colorless oil, 7.6 g. of N,N' - bis(dichloroacetyl) - N,N' - diethyl-3-methyl-1,6-hexanediamine, $n_D^{27}=1.5102$, after drying at about 70° C. and 1 mm. for several minutes.

*Analysis.*—Calcd. for $C_{15}H_{26}Cl_4N_2O_2$: Cl, 34.8; N, 6.87. Found: Cl, 33.53; N, 6.65.

N,N' - bis(dichloroacetyl) - N,N'-diethyl-3-methyl-1,6-hexanediamine when administered orally to hamsters infected with *Endamoeba criceti* was found to clear 2 out of 5, 7 out of 10, 5 out of 5 of the animals at dose levels of 12.5, 25 and 50 mg./kg./day, respectively.

The intermediate N,N' - diethyl - 3-methyl-1,6-hexanediamine dihydrochloride was prepared by the following procedure: A solution containing 25 g. of 3-methyladipic acid (i.e., 1,4-dicarboxy-2-methylbutane) in 150 cc. of benzene was stirred under reflux on a steam bath while 40 g. of thionyl chloride in about 50 cc. of benzene was added dropwise. The reaction mixture was stirred under reflux overnight. The excess thionyl chloride and most of the benzene was removed by distilling in vacuo the reaction mixture with stirring. The residual oil containing the bis(acid chloride) of 1,4-dicarboxy-2-methylbutane was taken up in benzene, and the benzene removed by distilling in vacuo. The bis(acid chloride) was then diluted with benzene and added dropwise with stirring to a chilled portion of 250 cc. of 70% aqueous ethylamine, keeping the reaction temperature between about 5–20° C. The excess ethylamine, the water and the benzene were removed by distilling in vacuo and the resulting oil was treated with about 300 cc. of benzene and the water was removed azeotropically by distilling some of the benzene. The benzene layer was then decanted and the remaining solid was treated twice again with benzene as above. The benzene solutions were combined and cooled to yield 4 g. of N,N'-diethyl-3-methyl-1,6-hexanediamide, M.P. 130–133.5° C. The above residue left after the three benzene extractions was extracted several times with hot ethyl acetate; the resulting extracts were cooled; and there was obtained an additional 8 g. of the product, M.P. 130–132° C.

To a stirred suspension containing 10 g. of lithium aluminium hydride and 500 cc. of absolute ether was added in small portions a hot solution containing 12 g. of N,N'-diethyl-3-methyl-1,6-hexanediamide and the resulting mixture was refluxed with stirring for about six hours and then allowed to stand overnight at room temperature. The reaction mixture was then treated successively with 10 cc. of water, 10 cc. of 20% aqueous sodium hydroxide solution and 30 cc. of water. The mixture was filtered and the filtrate was dried over anhydrous magnesium sulphate. The solution was distilled in vacuo to yield an oil which was treated with ethanolic hydrogen chloride and the resulting mixture cooled to yield 9.0 g. of N,N'-diethyl - 3 - methyl - 1,6-hexanediamine dihydrochloride, M.P. 258–260° C.

Following the above described procedure for the preparation of N,N'-diethyl-3-methyl-1,6-hexanediamine dihydrochloride using the corresponding molar equivalent quantities first of the appropriate alkane-dicarboxylic acid and thionyl chloride, next reacting the resulting alkane-bis (carboxylic acid chloride) and ethylamine to form the corresponding N,N'-diethyl-alkanediamide, and then reducing the diamide with lithium aluminium hydride, the compounds of Table B were prepared. The corresponding intermediate N,N'-diethyl-alkanediamides are given in Table C.

TABLE B $C_2H_5NH—(CH_2)n—NHC_2H_5.2HCl$

| No. | n. | M.P., ° C. |
|---|---|---|
| 1 | 7 | 281–283 |
| 2 | 8 | 274–276 |
| 3 | 9 | 280–281 |
| 4 | 12 | (a) | a B.P. of base is 116–120° C. at 0.15 mm.

TABLE C $C_2H_5NH—\underset{\underset{O}{\|}}{C}—(CH_2)_n—\underset{\underset{O}{\|}}{C}—NHC_2H_5$

| No. | n | M.P., ° C. |
|---|---|---|
| 1 | 5 | 89–102 |
| 2 | 6 | 120–130 |
| 3 | 7 | 120–126 |
| 4 | 10 | 144.5–146 |

Example 92

N,N'-bis(dichloroacetyl)-N,N' - diethyl - 1,7 - heptanediamine was prepared following the procedure described in Example 76 using 5.0 g. of N,N'-diethyl-1,7-heptanediamine dihydrochloride, 3.1 g. of sodium hydroxide, 100 cc. of water, 80 cc. of ethylene dichloride, and 8.8. g. of dichloroacetyl chloride in 20 cc. of ethylene dichloride. There was thus obtained, as an amber oil, 5.5 g. of N,N'-bis(dichloroacetyl) - N, - diethyl - 1,7 - heptanediamine, $n_D^{26}=1.5100$, after drying at 2.0 mm. at room temperature for about 15 minutes.

*Analysis.*—Calcd. for $C_{15}H_{26}Cl_4N_2O_2$: Cl, 34.76; N, 6.87. Found: Cl, 34.00; N, 6.64.

Example 93

N,N'-bis(dichloroacetyl)-N,N'-diethyl - 1,8 - octanediamine was prepared following the procedure described in Example 76 using 4.5 g. of N,N'-diethyl-1,8-octanediamine dihydrochloride, 2.68 g. sodium hydroxide, 50 cc. of water, 75 cc. of ethylene dichloride, and 4.9 g. of dichloroacetyl chloride in 20 cc. of ethylene dichloride. There was thus obtained, as an amber oil, 4.7 g. of N,N'-bis(dichloroacetyl) - N,N' - diethyl - 1,8 - octanediamine, $n_D^{25}=1.5090$, after drying at 2.5 mm. at room temperature for 30 minutes.

*Analysis.*—Calcd. for $C_{16}H_{28}Cl_4N_2O_2$: Cl, 33.4; N, 6.57. Found: Cl, 33.70; N, 6.34.

N,N'-bis(dichloroacetyl)-N,N' - diethyl - 1,8 - octanediamine when administered orally to hamsters infected with *Endamoeba criceti* was found to clear 4 out of 5 and 5 out of 5 of the animals at dose levels of 12.5 and 25 mg./kg./day, respectively.

Example 94

N,N'-bis(dichloroacetyl)-N,N'-diethyl - 1,9 - nonanediamine was prepared following the procedure described in Example 76 using 16.0 g. of N,N'-diethyl-1,9-nonanediamine, 8.0 g. of sodium hydroxide, 50 cc. of water, 50 cc. of ethylene dichloride, and 22 g. of dichloroacetyl chloride in 50 cc. of ethylene dichloride. There was thus obtained, as a dark amber oil, 20.3 g. of N,N'-bis(dichloroacetyl)-N,N'-diethyl - 1,9 - nonanediamine, $n_D^{25}=1.5069$, after drying at 1.5 mm. at room temperature for 45 minutes.

*Analysis.*—Calcd. for $C_{17}H_{30}Cl_4N_2O_2$: Cl, 32.59; N, 6.44. Found: Cl, 32.40; N, 6.33.

Example 95

N,N'-bis(dichloroacetyl)-N,N'-diethyl-1,12 - dodecanediamine was prepared following the procedure described in Example 76 using 7.9 g. of N,N'-diethyl-1,12-dodecanediamine, 2.7 g. of sodium hydroxide, 150 cc. of water, 9.2 g. of dichloroacetyl chloride and a total of 50 cc. of ethlene dichloride. There was thus obtained, as a yellow oil, 11.5 g. of N,N'-bis(dichloroacetyl)-N,N'-diethyl-1,12-dodecanediamine, $n_D^{25}=1.5021$, after drying at 150–160° C.

*Analysis.*—Calcd. for $C_{20}H_{36}Cl_4N_2O_2$: Cl, 29.65; N, 5.86. Found: Cl, 29.40; N, 5.82.

N,N' - bis(dichloroacetyl) - N,N' - 1,12 - dodecanediamine when administered orally to hamsters infected with *Endamoeba criceti* was found to clear 3 out of 5, 3 out of 5 and 5 out of 5 of the animals at dose levels of 3.12, 6.25 and 12.5 mg./kg./day, respectively.

Example 96

N,N'-bis(2,2-dichloropropanoyl) - N,N' - diethyl - 1,6-hexanediamine was prepared following the procedure described in Example 76 using 7.5 g. of N,N'-diethyl-1,6-hexanediamine dihydrobromide, 4.4 g. of sodium hydroxide, 50 cc. of water, 50 cc. of ethylene dichloride, and 7.3 g. of 2,2-dichloropropanoyl chloride in 50 cc. of ethylene dichloride. There was thus obtained, as a pale yellow oil, 5.6 g. of N,N'-bis(2,2-dichloropropanoyl)-N,N'-diethyl-1,6-hexanediamine, when dried at 2.0 mm. and 40° C. for two hours.

*Analysis.*—Calcd. for $C_{16}H_{28}Cl_4N_2O_2$: Cl, 33.58; N, 6.64. Found: Cl, 33.80; N, 6.68.

Example 97

N,N'-bis(dichloroacetyl) - 1,2 - ethanediamine was prepared following the procedure described in Example 76 using 3.0 g. of 1,2-ethandiamine (ethylenediamine), 4.4 g. of sodium hydroxide, 55 cc. of water, 15.0 g. of dichloroacetyl chloride and a total of about 150 cc. of ethylene dichloride. There was thus obtained 8.7 g. of N,N'-bis(dichloroacetyl)-1,2-ethanediamine, M.P. 207.0–210.0° C. (corr.), when recrystallized from ethanol.

*Analysis.*—Calcd. for $C_6H_8Cl_4N_2O_2$: Cl, 50.39; N, 9.92. Found: Cl, 50.30; N, 9.78.

N,N'-bis(dichloroacetyl)-1,2 - ethanediamine when administered orally to hamsters infected with *Endamoeba criceti* was found to clear none out of 5 and 1 out of 5 of the animals at dose levels of 50 and 100 mg./kg./day, respectively.

Example 98

N,N'-bis(dichloroacetyl)-1,3-propanediamine was prepared following the procedure described in Example 76 using 3.7 g. of 1,3-propanediamine, 6.0 g. of sodium hydroxide, 50 cc. of water, 50 cc. of ethylene dichloride, and 14.7 g. of dichloroacetyl chloride in 50 cc. of ethylene dichloride. There was thus obtained 4.7 g. of N,N'-bis(dichloroacetyl)-1,3-propanediamine, M.P. 135.6–137.4° C. (corr.), after three recrystallizations from isopropyl alcohol.

*Analysis.*—Calcd. for $C_7H_{10}Cl_4N_2O_2$: Cl, 47.90; N, 9.47. Found: Cl, 48.20; N, 9.24.

N,N'-bis(dichloroacetyl)-1,3-propanediamine when administered orally to hamsters infected with *Endamoeba criceti* was found to clear none out of 5 and 4 out of 5 and 4 out of 5 of animals at dose levels of 25, 50 and 100 mg./kg./day, respectively.

Example 99

N,N'-bis(dichloroacetyl) - 1,4 - butanediamine was prepared following the procedure described in Example 76 using 4.4 g. of 1,4-butanediamine, 6.0 g. of sodium hydroxide 50 cc. of water, 50 cc. of ethylene dichloride, and 14.7 g. of dichloroacetyl chloride in 50 cc. of ethylene dichloride. There was thus obtained 11.3 g. of N,N'-bis(dichloroacetyl)-1,4-butanediamine, M.P. 158.0–160–8° C. (corr.), when recrystallized from isopropyl alcohol.

*Analysis.*—Calcd. for $C_8H_{12}Cl_4N_2O_2$: C, 30.99; H, 3.90; Cl, 45.73; N, 9.04. Found: C, 31.18; H, 3.86; Cl, 45.70; N, 8.98.

N,N'-bis(dichloroacetyl)-1,4-butanediamine when administered orally to hamsters infected with *Endamoeba criceti* was found to clear none out of 5 and 3 out of 5 of the animals at dose levels of 25 and 50 mg./kg./day, respectively.

Example 100

N,N'-bis(dichloroacetyl)-1,5-pentanediamine was prepared following the procedure described in Example 76 using 3.0 g. of 1,5-pentanediamine, 2.58 g. of sodium hydroxide, 50 cc. of water, 8.3 g. of dichloroacetyl chloride and a total of about 125 cc. of ethylene dichloride. There was thus obtained 4.5 g. of N,N'-bis(dichloroacetyl)-1,5-pentanediamine, M.P. 146.0–148.0° C. (corr.), when recrystallized twice from ethanol.

*Analysis.*—Calcd. for $C_9H_{14}Cl_4N_2O_2$: C, 33.27; H, 4.36; Cl, 43.70; N, 8.64. Found: C, 33.60; H, 4.47; Cl, 43.90; N, 8.61.

Example 101

N,N'-bis(dibromoacetyl)-1,6-hexanediamine was prepared following the procedure described in Example 76 using 2.8 g. of 1,6-hexanediamine (70% in water), 2.1 g. of sodium hydroxide, 50 cc. of water, 50 cc. of ethylene dichloride, and 8.0 g. of dibromoacetyl chloride in 50 cc. of ethylene dichloride. There was thus obtained 5.5 g. of N,N'-bis(dibromoacetyl)-1,6-hexanediamine, M.P. 161.0–165.0° C. (corr.), when recrystallized from isopropyl alcohol.

*Analysis.*—Calcd. for $C_{10}H_{16}Br_4N_2O_2$: Br, 61.97; N, 5.43. Found: Br, 62.30; N, 5.50.

N,N'-bis(dibromoacetyl)-1,6-hexanediamine when administered orally to hamsters infected with *Endamoeba criceti* was found to clear 5 out of 5 of the animals at each of the dose levels of 12.5 and 25 mg./kg./day, respectively.

Example 102

N,N'-bis(trichloroacetyl)-1,6-hexanediamine was prepared as follows: To 4.0 g. of 1,6-hexanediamine (72% in water), was added with chilling in an ice bath 8.9 g. of methyl trichloroacetate. The solid that separated was collected and recrystallized twice from isopropyl alcohol to yield 3.5 g. of N,N'-bis(trichloroacetyl)-1,6-hexanediamine, M.P. 152.6–154.4° C. (corr.).

*Analysis.*—Calcd. for $C_{10}H_{14}Cl_6N_2O_2$: Cl, 52.26; N, 6.89. Found: Cl, 52.2; N, 6.90.

N,N'-bis(trichloroacetyl)-1,6-hexanediamine when administered orally to hamsters infected with *Endamoeba criceti* was found to clear 2 out of 5 and 3 out of 5 of the animals at dose levels of 12.5 and 25 mg./kg./day, respectively.

Example 103

N,N'-bis(dichloroacetyl)-1,7-heptanediamine was prepared following the procedure described in Example 76 using 3.0 g. of 1,7-heptanediamine, 2.26 g. of sodium hydroxide, 50 cc. of water, 50 cc. of ethylene dichloride, and 7.6 g. of dichloroacetyl chloride in 50 cc. of ethylene dichloride. There was thus obtained 2.7 g. of N,N'-bis(dichloroacetyl)1,7-heptanediamine, M.P. 113.4–115.0° C. (corr.), after recrystallization once from chloroform-hexane and once from chloroform.

*Analysis.*—Calcd. for $C_{11}H_{18}Cl_4N_2O_2$: Cl, 40.30; N, 7.96. Found: Cl, 40.30; N, 7.98.

N,N'-bis(dichloroacetyl)1,7-heptanediamine when administered orally to hamsters infected with *Endamoeba criceti* was found to clear 2 out of 5 and 3 out of 5 of the animals at dose levels of 6.25 and 12.5 mg./kg./day, respectively.

Example 104

N,N'-bis(dichloroacetyl)-1,8-octanediamine was prepared following the procedure described in Example 76 using 3.0 g. of 1,8-octanediamine, 1.9 g. of sodium hydroxide, 50 cc. of water, 50 cc. of ethylene dichloride, and 6.13 g. of dichloroacetyl chloride in 50 cc. of ethylene dichloride. There was thus obtained 3.9 g. of N,N'-bis(dichloroacetyl)1,8-octanediamine, M.P. 122.4–123.6° C. (corr.), when recrystallized from chloroform.

*Analysis.*—Calcd. for $C_{12}H_{20}Cl_4N_2O_2$: Cl, 38.74; N, 7.64. Found: Cl, 38.50; N, 7.56.

Example 105

N,N'-bis(dichloroacetyl)-1,9-nonanediamine was prepared following the procedure described in Example 76 using 8.0 g. of 1,9-nonanediamine dihydrochloride, 4.17 g. of sodium hydroxide, 50 cc. of water, 50 cc. of ethylene dichloride, and 10.2 g. of dichloroacetyl chloride in 50 cc. of ethylene dichloride. There was thus obtained 4.4 g. of N,N'-bis(dichloroacetyl)-1,9-nonanediamine, M.P. 81.2–84.0° C. (corr.), after three recrystallizations from benzene.

*Analysis.*—Calcd. for $C_{13}H_{22}Cl_4N_2O_2$: Cl, 37.30; N, 7.36. Found: Cl, 37.20; N, 7.38.

The intermediate 1,9-nonanediamine dihydrochloride was prepared following the procedure described in Example 91 for the preparation of N,N'-diethyl-3-methyl-1,6-hexanediamine using 15.5 g. of 1,9-nonanediamide (i.e., 1,7-dicarbamylheptane), 12.5 g. of lithium aluminum hydride, 100 cc. of tetrahydrofuran and 500 cc. of absolute ether. There was thus obtained 8.0 g. of 1,9-nonanediamine dihydrochloride which was used in the above preparation without further purification.

Example 106

N,N'-bis(dichloroacetyl)1,10-decanediamine was prepared following the procedure described in Example 76 using 8.6 g. of 1,10-decanediamine, 6.0 g. of sodium hydroxide, 50 cc. of water, 50 cc. of ethylene dichloride, and 14.7 g. of dichloroacetyl chloride in 50 cc. of ethylene dichloride. There was thus obtained 14.6 g. of N,N'-bis(dichloroacetyl)-1,10-decanediamine, M.P. 87.8–89.8° C. (corr.), when recrystallized from isopropyl alcohol.

*Analysis.*—Calcd. for $C_{14}H_{24}Cl_4N_2O_2$: Cl, 35.97; N, 7.11. Found: Cl, 36.0; N, 7.07.

N,N'-bis(dichloroacetyl)-1,10-decanediamine when administered orally to hamsters infected with *Endamoeba criceti* was found to clear none out of 5 and 4 out of 5 of the animals at dose levels of 25 and 50 mg./kg./day, respectively.

Example 107

N,N'-bis(2,2-dichloropropanoyl) - 1,6 - hexanediamine was prepared following the procedure described in Example 76 using 2.7 g. of 1,6-hexanediamine, 2.0 g. of sodium hydroxide, 50 cc. of water, 50 cc. of ethylene dichloride, and 7.7 g. of 2,2-dichloropropanoyl chloride in 50 cc. of ethylene dichloride. There was thus obtained 4.9 g. of N,N'-bis(2,2-dichloropropanoyl)-1,6-hexanediamine, M.P. 105.2–113.6° C. (corr.), after recrystallization from isopropyl alcohol.

*Analysis.*—Calcd. for $C_{12}H_{20}Cl_4N_2O_2$: Cl, 38.73; N, 7.65. Found: Cl, 38.40; N, 7.71.

Example 108

N,N' - bis(dichloroacetyl) - N - propargyl - 1,6 - hexanediamine was prepared following the procedure described in Example 76 using 7.7 g. of N-propargyl-1,6-hexanediamine, about 8 g. of sodium hydroxide, about 200 cc. of water, 100 cc. of ethylene dichloride, and 21.6 g. of dichloroacetyl chloride in 50 cc. of ethylene dichloride. There was thus obtained, as a viscous yellow oil, 14.0 g. of N,N' - bis(dichloroacetyl) - N - propargyl - 1,6- hexanediamine.

*Analysis.*—Calcd. for $C_{13}H_{18}Cl_4N_2O_2$: Cl, 37.72; N, 7.45. Found: Cl, 37.80; N, 7.23.

The intermediate N-propargyl-1,6-hexanediamine was prepared as follows: To 500 g. of 70% aqueous 1,6-hexanediamine solution was added dropwise with stirring 59.5 g. of propargyl bromide, the addition taking about one hour. The reaction mixture was stirred for an additional two hours and then allowed to stand for two days. The mixture was concentrated in vacuo to about two-thirds of its initial volume and poured into two liters of ether. The mixture was filtered; and the filtrate was made basic with 35% aqueous sodium hydroxide solution and extracted with n-butanol. The butanol solution was concentrated, ether added, the mixture filtered, and the filtrate first concentrated in vacuo and then distilled in vacuo to first remove the excess 1,6-hexanediamine, B.P. 80–115° C. at 12 mm. and then to yield 49.2 g. of the desired N-propargyl-1,6-hexanediamine, B.P. 121–123° C. at 12 mm., $n_D^{28}$=1.4732.

*Analysis.*—Calcd. for $C_9H_{18}N_2$: N, 18.16. Found: N, 18.06.

N-propargyl-1,6-hexanediamine dihydrochloride melted at 196–197° C.

Example 109

2 - chloro - N,N' - bis(dichloroacetyl) - N,N' - diethyl-1, 4 - bis(aminomethyl)benzene was prepared following the procedure described in Example 26B using 6 g. of 2-chloro - 1,4 - bis(ethylaminomethyl)benzene dihydrochloride, 3.5 g. of sodium hydroxide, 75 cc. of water, about 100 cc. of ethylene dichloride, and 6.5 g. of dichloroacetyl chloride in about 10 cc. of ethylene dichloride. There was thus obtained 7.5 g. of 2 - chloro - N,N' - bis(dichloroacetyl) - N,N' - diethyl - 1,4 - bis(aminomethyl)benzene, M.P. 90.2–92.6° C. (corr.), when recrystallized from isopropyl alcohol.

*Analysis.*—Calcd. for $C_{16}H_{19}Cl_5N_2O_2$: Cl, 39.52; N, 6.24. Found: Cl, 39.30; N, 6.12.

The intermediate 2 - chloro - 1,4 - bis(ethylaminomethyl) - benzene as its dihydrochloride was prepared as follows: A mixture containing 14 g. of chloro-para-xylene (2 - chloro - 1,4 - dimethylbenzene), 30 g. (19 cc.) of sulfuryl chloride and 150 mg. of benzoyl peroxide was refluxed on a steam bath for one hour under an efficient condenser. The reaction mixture was then concentrated in vacuo to yield 2 - chloro - 1,4 - bis(chloromethyl)benzene which was then treated with 140 g. of 70% aqueous ethylamine and the resulting mixture was stirred at room temperature overnight. The reaction mixture was then concentrated in vacuo to yield a crystalline material which was recrystallized from absolute ethanol to yield 7 g. of 2 - chloro - 1,4 - bis(ethylaminomethyl)benzene dihydrochloride, M.P. 300° C.

*Analysis.*—Calcd. for $C_{12}C_{19}ClN \cdot 2HCl$: Cl⁻, 23.62. Found: Cl⁻, 23.23.

2 - chloro - N,N' - bis(dichloroacetyl) - N,N' - diethyl-1,4 - bis(aminomethyl)benzene when administered orally to hamsters infected with *Endamoeba criceti* was found to have an $ED_{50}$ of $0.47 \pm 0.14$ mg./kg./day. This compound was found to have an approximate acute oral toxicity ($ALD_{50}$) in mice of greater than 4,000 mg./kg.

*Example 110*

2 - chloro - N,N' - bis(dibromoacetyl) - N,N' - diethyl-1,4 - bisaminomethyl)benzene was prepared following the procedure described in Example 26B using 6.0 g. of 2 - chloro - 1,4 - bis(ethylaminomethyl)benzene dihydrochloride, 4.0 g. of sodium hydroxide, 50 cc. of water, 50 cc. of ethylene dichloride, and 9.5 g. of dibromoacetyl bromide in 50 cc. of ethylene dichloride. There was thus obtained 3.3 g. of 2 - chloro - N,N' - bis(dibromoacetyl) - N,N' - diethyl - 1,4 - bis(aminomethyl)benzene, M.P. 115.2–122.4° C. (corr.), when crystallized from ethanol and recrystallized once from ethanol-ether and once from isopropyl alcohol.

*Analysis.*—Calcd. for $C_{16}H_{19}Br_4ClN_2O_2$: C, 30.70; H, 3.06; Br, 51.03; N, 4.47. Found: C, 30.78; H, 3.40; Br, 52.12; N, 4.45.

2 - chloro - N,N' - bis(dibromoacetyl) - N,N' - diethyl-1,4 - bis(aminomethyl)benzene when administered orally to hamsters infected with *Endamoeba criceti* was found to clear 8 out of 9 and 4 out of 4 of the animals at dose levels of 1.56 and 3.12 mg./kg./day, respectively.

*Example 111*

N,N' - bis(dichloroacetyl) - N,N' - diethyl - 2,3,5,6-tetramethyl - 1,4 - bis(aminomethyl)benzene was prepared following the procedure described in Example 26B using 10 g. of 1,4 - bis(ethylaminomethyl) - 2,3,5,6 - tetramethylbenzene, 3.5 g. of sodium hydroxide, 75 cc. of water, about 100 cc. of ethylene dichloride, and 12 g. of dichloroacetyl chloride in about 20 cc. of ethylene dichloride. Since the product did not recrystallize readily from the usual solvents, it was washed in hot ethanol, the ethanol mixture was chilled, and the crystalline product was collected and dried to yield 12.6 g. of N,N' - bis(dichloroacetyl) - N,N' - diethyl - 2,3,5,6 - tetramethyl - 1,4 - bis(aminomethyl)benzene, M.P. 190.6–194.6° C. (corr.).

*Analysis.*—Calcd. for $C_{20}H_{20}Cl_4N_3O_2$: Cl, 30.14; N, 5.95. Found: Cl, 30.54; N, 5.84.

The intermediate 1,4 - bis(ethylaminomethyl) - 2,3,5,6-tetramethylbenzene was prepared by warming a mixture of 23.1 g. of 1,4 - bis(chloromethyl) - 2,3,5,6 - tetramethylbenzene [i.e., bis(chloromethyl)durene] and 140 g. of 70% aqueous ethylamine solution until dissolution was effected. The solution was then stirred overnight and the precipitate that separated was collected and dried in vacuo to yield 27.3 g. of 1,4 - bis(ethylaminomethyl) - 2,3,5,6-tetramethylbenzene, M.P. 70–71° C.

N,N' - bis(dichloroacetyl) - N,N' - diethyl - 2,3,5,6-tetramethyl - 1,4 - bis(aminomethyl)benzene when administered orally to hamsters infected with *Endamoeba criceti* was found to clear 1 out of 5, 2 out of 5 and 2 out of 5 of the animals at dose levels of 25, 50 and 100 mg./kg./day, respectively.

*Example 112*

N,N' - bis(dichloroacetyl) - N,N' - diethyl - 1,3 - bis(aminomethyl)benzene was prepared following the procedure described in Example 26B using 13.5 g. of 1,3-bis(ethylaminomethyl)benzene dihydrochloride, 8.5 g. of sodium hydroxide, 50 cc. of water, 100 cc. of ethylene dichloride, and 16.6 g. of dichloroacetyl chloride in 50 cc. of ethylene dichloride. There was thus obtained, as a pale yellow viscous oil, 18.2 g. of N,N'-bis(dichloroacetyl)-N,N'-diethyl-1,3-bis(aminomethyl)benzene after drying at 0.2 mm. with warming.

*Analysis.*—Calcd. for $C_{16}H_{20}Cl_4N_2O_2$: Cl, 34:23; N, 6.77. Found: Cl, 34.72; N, 6.44.

The intermediate 1,3-bis(ethylaminomethyl)benzene as its dihydrochloride was prepared following the procedure described in Example 26A using 11 g. of isophthalaldehyde, and 65 g. of 70% aqueous ethylamine to form the bis-anil which was then hydrogenated using 25 cc. of ethanol and 300 mg. of $PdCl_2$ on 2 g. of charcoal at 30° C. and about 30–40 lbs. per sq. inch of hydrogen. The hydrogenation took about 2 hours. There was thus obtained 14 g. of 1,3-bis(ethylaminomethyl)benzene dihydrochloride, M.P. 212–213° C.

*Analysis.*—Calcd. for $C_{12}H_{20}N_2 \cdot 2HCl$: Cl⁻, 26.74. Found: Cl⁻, 26.72.

N,N' - bis(dichloroacetyl) - N,N' - diethyl - 1,3 - bis(aminomethyl)benzene when administered orally to hamsters infected with *Endamoeba criceti* was found to clear none out of 5 and 5 out of 5 of the animals at dose levels of 25 and 50 mg./kg./day, respectively.

*Example 113*

N,N' - bis(dichloroacetyl) - N,N' - diethyl - 1,4 - bis(aminomethyl)naphthalene was prepared following the procedure described in Example 26B using 24 g. of N,N'-diethyl-1,4-bis(aminomethyl)naphthalene, 250 cc. of 1 N aqueous sodium hydroxide solution, 200 cc. of ethylene dichloride, and 32.3 g. of dichloroacetyl chloride in 70 cc. of ethylene dichloride. There was thus obtained 7 g. of N,N'-bis(dichloroacetyl)-N,N'-diethyl-1,4-bis(aminomethyl)naphthalene, M.P. 140.2–157.2° C. (corr.), after an initial purification chromatographically on a silica column with acetone-pentane (1:5) solvent and three recrystallizations from isopropyl alcohol.

*Analysis.*—Calcd. for $C_{20}H_{22}Cl_4N_2O_2$: C, 51.72; H, 4.78; N, 6.04. Found: C, 51.83; H, 4.73; N, 5.95.

The intermediate N,N'-diethyl-1,4-bis(aminomethyl) naphthalene was prepared by stirring a mixture of 22.5 g. of 1,4-bis(chloromethyl)naphthalene and 130 cc. of 70% aqueous ethylamine for about two hours. The reaction mixture was then allowed to stand overnight, treated with excess 35% aqueous sodium hydroxide solution and extracted with benzene. The benzene extract was washed with water, dried and distilled in vacuo to yield, as an oil, 24 g. of N,N'-diethyl-1,4-bis(aminomethyl)naphthalene.

N,N' - bis(dichloroacetyl) - N,N' - diethyl - 1,4 - bis(aminomethyl)naphthalene when administered orally to hamsters infected with *Endamoeba criceti* was found to clear none out of 5 and 5 out of 5 of the animals at dose levels of 25 and 50 mg./kg./day, respectively.

*Example 114*

N,N' - bis(dichloroacetyl) - N,N' - bis(2 - dihydroxyethyl) - 1,4 - bis(aminomethyl)naphthalene was prepared following the procedure described in Example 1B using 5 g. of N,N'-bis(2-hydroxyethyl)-1,4-bis(aminomethyl) naphthalene and 5.7 g. of methyl dichloroacetate. There was thus obtained 4 g. of N,N'-bis(dichloroacetyl)-N,N'-bis(2 - dihydroxyethyl) - 1,4 - bis(aminomethyl)naphthalene, M.P. 180.2–183.2° C. (corr.).

*Analysis.*—Calcd. for $C_{20}H_{22}Cl_4N_2O_4$: Cl, 28.56; O, 12.90. Found: Cl, 28.04; O, 13.15.

The intermediate N,N' - bis(2 - hydroxyethyl) - 1,4-bis(aminomethyl)naphthalene was prepared by mixing 11.2 g. of 1,4-bis(chloromethyl)naphthalene and 60 g. of 2-hydroxyethylamine. The reaction was exothermic with a maximum temperature of 70° C. being reached after about ten minutes, at which time dissolution had been completed. The reaction mixture was allowed to stand overnight and then poured into one liter of water. The aqueous mixture was then made basic with excess 35% aqueous sodium hydroxide solution and extracted first with ethylene dichloride and then with chloroform. The extracts were evaporated in vacuo; and the respective white solids were combined and recrystallized from benzene to yield 5 g. of the product. A sample was recrystallized for analysis, M.P. 128.5–130.5° C. (corr.).

*Analysis.*—Calcd. for $C_{16}H_{22}N_2O_2$: N, 10.20. Found: N, 10.02.

N,N' - bis(dichloroacetyl) - N,N' - bis(2 - dihydroxyethyl) - 1,4 - bis(aminomethyl)naphthalene when administered orally to hamsters infected with *Endamoeba criceti* was found to clear 1 out of 4 of the animals at a dose level of 100 mg./kg./day.

*Example 115*

N,N' - bis(dichloroacetyl) - N,N' - bis(2 - methoxyethyl) - 1,4 - bis(aminomethyl)naphthalene was prepared following the procedure described in Example 47B using 30 g. of N,N'-bis(2-methoxyethyl)-1,4-bis(aminomethyl)naphthalene, 250 cc. of 1 N sodium hydroxide solution, 250 cc. of ethylene dichloride, and 32.5 g. of dichloroacetyl chloride in 50 cc. of ethylene dichloride. There was thus obtained 9 g. of N,N'-bis(dichloroacetyl)-N,N'-bis(2 - methoxyethyl) - 1,4 - bis(aminomethyl)naphthalene, M.P. 147.2–149.6° C. (corr.), after two recrystallizations from benzene and one from ethanol.

*Analysis.*—Calcd. for $C_{22}H_{26}Cl_4N_2O_4$: Cl, 27.02; N, 5.34. Found: Cl, 27.16; N, 5.34.

The intermediate N,N' - bis(2 - methoxyethyl) - 1,4-bis(aminomethyl)naphthalene was prepared following the procedure described in Example 116 for the preparation of the corresponding N,N'-bis(2-hydroxyethyl) compound using 22.5 g. of 1,4-bis(chloromethyl)naphthalene and 200 cc. of 65% aqueous 2-methoxyethylamine solution. There was thus obtained, as an oil, 30 g. of the intermediate.

N,N' - bis(dichloroacetyl) - N,N' - bis(2 - methoxyethyl) - 1,4 - bis(aminomethyl)naphthalene when administered orally to hamsters infected with *Endamoeba criceti* was found to clear none out of 5 and 5 out of 5 of the animals at dose levels of 50 and 100 mg./kg./day, respectively.

*Example 116*

N,N' - bis(dichloroacetyl)-N,N'-bis(2-formyloxyethyl)-1,4-bis(aminomethyl)naphthalene was prepared following the procedure described in Example 66 using 20 g. of N,N' - bis(dichloroacetyl)-N,N'-bis(2-hydroxyethyl)-1,4-bis(aminomethyl)naphthalene and 200 cc. of formic acid. The resulting product, N,N'-bis(dichloroacetyl)-N,N'-bis(2-formyloxyethyl)-1,4-bis(aminomethyl)naphthalene, melted at 146.0–149.4° C. (corr.).

*Analysis.*—Calcd. for $C_{22}H_{22}Cl_4N_2O_6$: Cl, 25.66. Found: Cl, 25.52.

N,N' - bis(dichloroacetyl)-N,N'-bis(2-formyloxyethyl)-1,4 - bis(aminomethyl)naphthalene when administered orally to hamsters infected with *Endamoeba criceti* was found to clear none out of 5 and 3 out of 5 of the animals at dose levels of 12.5 and 25 mg./kg./day, respectively.

*Example 117*

N,N' - bis(dichloroacetyl) - N,N'-bis(2-hydroxyethyl)-9,10-bis(aminomethyl)anthracene was prepared following the procedure described in Example 1B using 6.5 g. of N,N' - bis(2-hydroxyethyl)-9,10-bis(aminomethyl)anthracene and 7.2 g. of methyldichloroacetate. There was thus obtained 4.5 g. of N,N'-bis(dichloroacetyl)-N,N'-bis(2-hydroxyethyl) - 9,10-bis(aminomethyl)anthracene, M.P. 215–216° C. (corr.) with decomposition.

*Analysis.*—Calcd. for $C_{24}H_{24}Cl_4N_2O_4$: Cl, 25.94; N, 5.13. Found Cl, 26.08; N, 5.14.

The intermediate N,N'-bis(2-hydroxyethyl)-9,10-bis(aminomethyl)anthracene was prepared by heating on a steam bath for about six hours a stirred mixture containing 27.5 g. of 9,10-bis(chloromethyl)anthracene, 122 g. of 2-hydroxyethylamine and 50 cc. of dimethylformamide. The reaction mixture was allowed to stand at room temperature over the weekend. The solid that had separated was collected and dissolved in 1 N aqueous HCl solution. The acidic solution was treated with decolorizing charcoal, filtered, extracted successively with ethylene dichloride and benzene, and then made basic with 35% aqueous NaOH solution. The resulting precipitate was collected, washed with water and recrystallized from ethanol to yield 12 g. of N,N'-bis(2-hydroxyethyl)-9,10-bis(aminomethyl)anthracene, M.P. 165–175° C.

N,N' - bis(dichloroacetyl)-N,N'-bis(2-hydroxyethyl)-9,10-bis(aminomethyl)anthracene when administered orally to hamsters infected with *Endamoeba criceti* was found to clear none out of 5 and 2 out of 5 of the animals at dose levels of 100 and 200 mg./kg./day, respectively.

*Example 118*

N,N' - diisopropyl - N,N'-bis(trichloroacetyl)-2,6-bis(aminomethyl)pyridine was prepared following the procedure described in Example 26B using 5.5 g. of N,N'-diisopropyl - 2,6-bis(aminomethyl)pyridine dihydrochloride, 3.04 g. of sodium hydroxide, 50 cc. of water, 50 cc. of ethylene dichloride, and 6.9 g. of trichloroacetyl chloride in 50 cc. of ethylene dichloride. There was thus obtained 2.4 g. of N,N'-diisopropyl-N,N'-bis(trichloroacetyl)-2,6-bis(aminomethyl)pyridine, M.P. 134.2–135.6° C. (corr.), after two recrystallizations from absolute ethanol and three recrystallizations from isopropyl alcohol, followed by drying at 1 mm. and 80° C. for about eighteen hours.

*Analysis.*—Calcd. for $C_{17}H_{21}Cl_6N_3O_2$: Cl, 41.54; $N_{AP}$, 2.73. Found: Cl, 41.06, 40.84; $N_{AP}$, 2.73.

The intermediate N,N'-diisopropyl-2,6-bis(aminomethyl)-pyridine was prepared following the procedure described in Example 26A using 13.5 g. of pyridine-2,6-dicarboxaldehyde, 12 g. of isopropylamine and 100 cc. of absolute ethanol to form the bis-anil which was catalytically hydrogenated using $PdCl_2$ on charcoal at room temperature. There was thus obtained 24 g. of N,N' - diisopropyl-2,6-bis(aminomethyl)pyridine dihydrochloride, M.P. 245–246° C.

N,N' - diisopropyl - N,N' - bis(trichloroacetyl)-2,6-bis(aminomethyl)pyridine when administered orally to hamsters infected with *Endamoeba criceti* was found to clear 1 out of 5 and 3 out of 5 of the animals at dose levels of 50 and 100 mg./kg./day, respectively.

*Example 119*

N,N'-bis(dichloroacetyl)-N,N'-diethyl-1,4-bis(2-aminoethyl)benzene was prepared following the procedure described in Example 26B using 5.8 g. of N,N'-diethyl-1,4-bis(2-aminoethyl)-benzene, 2.4 g. of sodium hydroxide, 200 cc. of water, 100 cc. of ethylene dichloride, and 7.7 g. of dichloroacetyl chloride in about 50 cc. of ethylene dichloride. There was thus obtained, as a viscous yellow oil, 9.0 g. of N,N'-bis(dichloroacetyl)-N,N'-diethyl-1,4-bis(2-aminoethyl)benzene.

*Analysis.*—Calcd. for $C_{18}H_{24}Cl_4N_2O_2$: Cl, 32.08; N, 6.34. Found: Cl, 31.50; N, 6.38.

The intermediate N,N'-diethyl-1,4-bis(2-aminoethyl)-benzene was prepared as follows: 1,4-bis(cyanomethyl)benzene (15.6 g.) was dissolved in 100 cc. of acetic anhydride and was catalytically hydrogenated using 1.5 g. of platinum oxide to yield 16.4 g. of N,N'-diacetyl-1,4-bis(2-aminoethyl)benzene, M.P. 209–213° C., after recrystallization from ethanol. To a stirred suspension containing 5.7 g. of lithium aluminum hydride in 200 cc. of tetrahydrofuran was added portionwise 16.4 g. of N,N'-diacetyl-1,4-bis(2-aminoethyl)benzene and the resulting mixture was stirred under reflux for about six hours. The reaction mixture was cooled and, while stirring, was treated succesively with 6 cc. of water, 4.5 cc. of 20% aqueous sodium hydroxide solution and 21 cc. of water. The reaction mixture was filtered; the filtrate was concentrated in vacuo to remove the solvent; and the resulting oil was distilled in vacuo to yield 5.8 g. of N,N'-diethyl-1,4-bis(2-aminoethyl)benzene, B.P. 97–105° C. at 0.18–0.80 mm., $n_D^{25}$=1.5132.

N,N' - bis(dichloroacetyl) - N,N' - diethyl - 1,4-bis(2-aminoethyl)benzene when administered orally to hamsters infected with Endamoeba criceti was found to clear none out of 4 and 4 out of 5 of the animals at dose levels of 25 and 50 mg./kg./day, respectively.

Example 120

N,N' - bis(dichloroacetyl) - N,N'-4-aminobenzylamine was prepared following the procedure described in Example 26B using 5.8 g. of N,N'-diethyl-4-aminobenzylamine, 3.0 g. of sodium hydroxide, 200 cc. of water, 100 cc. of ethylene dichloride and 9.6 g. of dichloroacetyl chloride. There was thus obtained 6.5 g. of N,N'-bis(dichloroacetyl) - N,N' - diethyl-4-aminobenzylamine, M.P. 96.4.98.8° C. (corr.), when crystallized from cyclohexane and recrystallized from isopropyl alcohol-water.

Analysis.—Calcd. for $C_{15}H_{18}Cl_4N_2O_2$: Cl, 35.45; N, 7.00. Found: Cl, 35.20; N, 6.88.

The intermediate N,N'-diethyl-4-aminobenzylamine was prepared as follows: To a stirred suspension of 4.4 g. of lithium aluminum hydride in 100 cc. of tetrahydrofuran was added portionwise 11.0 g. of N-ethyl-4-(acetamido)-benzamide. The mixture was then refluxed for five hours and allowed to stand overnight. Then there were successively added dropwise with stirring 4.4 cc. of water, 3.3 cc. of 20% aqueous sodium hydroxide solution and 15 cc. of water. The reaction mixture was filtered and the granular precipitate was washed with benzene. The combined filtrate and benzene washings were concentrated in vacuo to remove the solvent and the residual oil was distilled in vacuo yielding, as a yellow oil, 6.0 g. of N,N'-diethyl-4-aminobenzylamine, B.P. 94–97.5° C. at 0.1 mm., $n_D^{25}$=1.5488.

The N-ethyl-4-(acetamido)benzamide was prepared by catalytically hydrogenating N-ethyl-4-nitrobenzamide (35 g.) dissolved in 50 cc. of acetic anhydride and 50 cc. of dimethylformamide using 0.5 g. of platinum oxide. After the hydrogenation had been completed, the catalyst was filtered off, the filtrate was concentrated in vacuo to remove the solvent, and the residual material was triturated with ethyl acetate. The ethyl acetate mixture was filtered to yield 11.0 g. of N-ethyl-4-(acetamido)benzamide, M.P. 215–223° C.

N,N'-bis(dichloroacetyl) - N,N' - dimethyl - 4 - aminobenzylamine when administered orally to hamsters infected with Endamoeba oriceti was found to clear 2 out of 5 and 5 out of 5 of the animals at dose levels of 12.5 and 25 mg./kg./day, respectively.

Example 121

N,N'-bis(dichloroacetyl)-N,N'-diethyl-2,4-dimethyl-1,5-bis(aminomethyl)benzene was prepared as follows: To 16.4 g. of 2,4-dimethyl-1,5-bis(aminomethyl)benzene was added 50 cc. of acetic anhydride. The reaction mixture was cooled in ice and 100 cc. of chloroform was added. The resulting precipitate was collected, washed with chloroform and air-dried to yield 23.5 g. of N,N'-diacetyl-2,4-dimethyl-1,5-bis(aminomethyl)benzene, M.P. 253–255° C.

To a stirred suspension containing 9.1 g. of lithium aluminum hydride in 300 cc. of tetrahydrofuran was added portionwise 20 g. of N,N'-diacetyl-2,4-dimethyl-1,5-bis(aminomethyl)benzene. The resulting mixture was refluxed with stirring for 16 hours, cooled and worked up following the procedure described in Example 121 for the preparation of N,N'-diethyl-1,4-bis(2-aminomethyl)-benzene to yield, as a light brown oil, N,N'-diethyl-2,4-dimethyl-1,5-bis(aminomethyl)benzene. This compound was then reacted with 23.6 g. of dichloroacetyl chloride following the procedure described in Example 26B using 5.4 g. of sodium hydroxide, 100 cc. of water and a total of about 100 cc. of ethylene dichloride. There was thus obtained 4.5 g. of N,N'-bis(dichloroacetyl)-N,N'-diethyl-2,4-dimethyl-1,5-bis(aminomethyl)benzene, M.P. 96.8–100.0° C. (corr.), after recrystallization from cyclohexane.

Analysis.—Calcd. for $C_{18}H_{24}Cl_4N_2O_2$: Cl, 32.08; N, 6.34. Found: Cl, 32.05; N, 6.37.

Example 122

N,N'-bis(dichloroacetyl)-N,N'-diethyl-2,5-dimethyl-1,4-bis(aminomethyl)benzene was prepared following the procedure described in Example 26B using 7.0 g. of N,N'-diethyl-2,5-dimethyl-1,4-bis(aminomethyl)benzene dihydrochloride, 4.4 g. of sodium hydroxide, 50 cc. of water, 100 cc. of ethylene dichloride, and 7.9 g. of dichloroacetyl chloride in 20 cc. of ethylene dichloride. There was thus obtained 7.5 g. of N,N'-bis(dichloroacetyl)-N,-N'-diethyl-2,5-dimethyl - 1,4 - bis(aminomethyl)benzene, M.P. 177.0–180.0° C. (corr.), when recrystallized from ethylene dichloride.

Analysis.—Calcd. for $C_{18}H_{24}Cl_4N_2O_2$: Cl, 32.08; N, 6.34. Found: Cl, 32.05; N, 6.33.

The intermediate N,N'-diethyl-2,5-dimethyl-1,4-bis-(aminomethyl)benzene was prepared following the procedure described in Example 116 for the preparation of N,N'-diethyl-1,4-bis(aminomethyl)naphthalene using 10.0 g. of 2,5-dimethyl-1,4-bis(chloromethyl)benzene and 100 cc. of 70% aqueous ethylamine solution. There was thus obtained 9.0 g. of the intermediate as its dihydrochloride, M.P. >300° C.

Example 123

N,N'-bis(dichloroacetyl) - 1,4 - bis(aminomethyl)cyclohexane was prepared as follows: To 14.2 g. of 1,4-bis-(aminomethyl)cyclohexane was added 28.6 g. of methyl dichloroacetate. The reaction mixture which became very warm was allowed to cool and then stand at room temperature whereupon a white crystalline solid separated. The solid was collected and recrystallized from dimethylformamide using decolorizing charcoal to yield 13.7 g. of N,N'-bis(dichloroacetyl)-1,4-bis(aminomethyl)cyclohexane, M.P. 239.4–241.4° C. (corr.), with decomposition.

Analysis.—Calcd. for $C_{12}H_{18}Cl_4N_2O_2$: Cl, 38.94; N, 7.69. Found: Cl, 38.80; N, 7.94.

N,N'-bis(dichloroacetyl) - 1,4 - bis(aminomethyl)cyclohexane when administered orally to hamsters infected with Endamoeba criceti was found to clear none out of 5 and 4 out of 5 of the animals at dose levels of 25 and 50 mg./kg./day, respectively.

Example 124

N,N'-bis(dichloroacetyl) - N,N' - diethyl-trans-1,4-bis-(aminomethyl)cyclohexane was prepared following the procedure described in Example 26B using 12.5 g. of N,N'-diethyl-trans-1,4-bis(aminomethyl)cyclohexane, 8.1 g. of sodium hydroxide, 100 cc. of water, 100 cc. of ethylene dichloride, and 15 g. of dichloroacetyl chloride in 50 cc. of ethylene dichloride. The solid product that was obtained was suspended in ethanol and the ethanol mixture boiled. The mixture was chilled and filtered to yield 14 g. of N,N'-bis(dichloroacetyl)-N,N'-diethyl-trans-1,4-bis(aminomethyl)cyclohexane, M.P. 179.2–181.4° C. (corr.).

Analysis.—Calcd. for $C_{16}H_{26}Cl_4N_2O_2$: Cl, 33.75; N, 6.67. Found: 33.25; N, 6.70.

The intermediate N,N'-diethyl-trans - 1,4 - bis(aminomethyl)cyclohexane was prepared as follows: To a stirred mixture containing 15.3 g. of lithium aluminium hydride and 400 cc. of ether was added in small portions 20 g. of N,N'-diacetyl-trans-1,4-bis(aminomethyl)cyclohexane. About 40 cc. of tetrahydrofuran was added and the reaction mixture was then stirred rapidly at reflux for about six hours. The stirred reaction mixture was then treated successively and gradually with 16 cc. of water, 16 cc. of 20% aqueous sodium hydroxide solution and 48 cc. of water. The reaction mixture was then filtered and the filtrate dried overnight under anhydrous magnesium sulphate. The filtrate was distilled in vacuo to remove the ether, resulting in 16.5 g. of N,N'-bis-dietryl-trans-1,4-bis(aminomethyl)cyclohexane as an almost colorless oil. This was treated with isopropyl alcohol and ethanolic hydrogen chloride to yield 12.5 g. of the compound as its dihydrochloride, M.P. 310° C.

N,N'-diacetyl-trans - 1,4 - bis(aminomethyl)cyclohexane was prepared as follows: A solution containing 34 g. of acetyl chloride in ethylene dichloride was added dropwise to an aqueous-ethylene dichloride solution containing 28.4 g. of trans-1,4-bis(aminomethyl)cyclohexane and about 18 g. of sodium hydroxide at a temperature of about 5° C. The resulting precipitate was collected and recrystallized from isopropyl alcohol to yield 27.5 g. of N,N-diacetyl-trans-1,4-bis(aminomethyl)cyclohexane, M.P. 233.6–236.0° C. (corr.).

*Analysis.*—Calcd. for $C_{12}H_{22}N_2O_2$: C, 63.70; H, 9.82; N, 12.40. Found: C, 63.57; H, 10.00; N, 12.34.

N,N'-bis(dichloroacetyl)-N,N'-diethyl-trans - 1,4 - bis-(aminomethyl)cyclohexane when administered orally to hamsters infected with *Endamoeba criceti* was found to clear 1 out of 5, 5 out of 5 and 9 out of 9 of the animals at dose levels of 0.78, 1.56 and 3.12 mg./kg./day, respectively.

Example 125

N,N'-bis(dichloroacetyl) - 1,8 - para-menthanediamine was prepared as follows: A mixture containing 8.4 g. of 1,8-para-menthanediamine, 50 cc. of ethylene dichloride, 50 cc. of water and 4.0 g. of sodium hydroxide was stirred and chilled to 0° C. To this stirred solution was added dropwise 17.6 g. of dichloroacetyl chloride, keeping the temperature between 0–5° C. Additional sodium hydroxide was added to keep the reaction mixture alkaline. After the addition had been completed, the mixture was stirred for an additional thirty minutes, diluted with ethylene dichloride and extracted twice with 10% aqueous hydrochloride solution and once with water. The ethylene dichloride solution was distilled in vacuo to remove the solvent. The residual oily material was crystallized from benzene-hexane to yield 4.5 g. of solid which was then recrystallized twice from benzene to yield 2.3 g. of N,N'-bis(dichloroacetyl) - 1,8 - para-menthanediamine, M.P. 173.8–176.2° C. (corr.).

*Analysis.*—Calcd. for $C_{14}H_{22}Cl_4N_2O_2$: Cl, 36.16; N, 7.13. Found: Cl, 36.00; N, 6.89.

Example 126

N,N'-bis(dichloroacetyl) - N,N' - dimethyl-1,4-phenylenediamine was prepared as follows: To a solution containing 15.8 g. of N,N'-dimethyl-1,4-phenylenediamine dioxalate in warm water was added 10 cc. of concentrated hydrochloric acid to effect dissolution. The mixure was filtered and the filtrate made basic with sodium hydroxide solution to precipitate in free base form N,N'-dimethyl-1,4-phenylenediamine which was mixed with 300 cc. of benzene and 12 cc. of concentrated hydrochloric acid. Water was then removed azeotropically from the mixture; 22.1 g. of dichloroacetyl chloride was added; and the resulting reaction mixture was refluxed for five hours and allowed to stand at room temperature overnight. The solid on the bottom of the flask was broken up; 15 cc. more of dichloroacetyl chloride was added to the mixture of solid and benzene; and refluxing was continued for an additional eight hours. The reaction mixture was allowed to cool and was filtered. The benzene filtrate was evaporated in vacuo and the remaining solid material was recrystallized once from ethyl alcohol and once from acetonitrile to yield, as a dusty rose powder, 4 g. of N,N'-bis(dichloroacetyl)-N,N'-dimethyl - 1,4 - phenylenediamine, M.P. 199.7–203.5° C. (corr.).

N,N'-bis(dichloroacetyl) - N,N' - dimethyl-1,4-phenylenediamine when administered orally to hamsters infected with *Endamoeba criceti* was found to have an $ED_{50}$ of 3.0±0.65 mg./kg./day. This compound was found to have an approximate acute oral toxicity ($ALD_{50}$) in mice of greater than 8,000 mg./kg.

Example 127

N,N'-bis(dichloroacetyl) - N,N' - diisopropyl-1,4-phenylenediamine was prepared as follows: To a stirred mixture containing 13.3 g. of N,N'-diisopropyl-1,4-phenylenediamine dihydrochloride and 250 cc. of ethylene dichloride kept below 5° C. was added dropwise with stirring 17.7 g. of dichloroacetyl chloride in 50 cc. of ethylene dichloride and 125 cc. of 1 N aqueous sodium hydroxide solution, adding the sodium hydroxide solution fast enough to keep the mixture basic. When addition had been completed, mode sodium hydroxide solution was added to make the solution basic. The reaction mixture was stirred at room temperature for about two hours and allowed to stand at room temperature overnight. The ethylene dichloride layer was separated washed twice 1 N aqueous hydrochloric acid, dried, and distilled in vacuo. The resulting solid was recrystallized once from isopropyl alcohol using decolorizing charcoal and an additional two times from isopropyl alcohol, thereby yielding 8.5 g. of N,N'-bis(dichloroacetyl)-N,N'-diisopropyl-1,4-phenylenediamine, M.P. 175.4–177.8° C.

*Analysis.*—Calcd. for $C_{16}H_{20}Cl_4N_2O_2$: Cl, 34.22; N, 6.76. Found: Cl, 34.03; N, 6.85.

The intermediate N,N'-diisopropyl - 1,4 - phenylenediamine was prepared by catalytically hydrogenating 4-nitroaniline (55.2 g.) in acetone (750 cc.) using platinum oxide (4 g.) on charcoal (10 g.) at a temperature between 20–56° C. After removal of the catalyst by filtration, 130 cc. of 6 N ethanolic hydrogen chloride was added to the filtrate, the mixture cooled and the precipitate collected. The precipitate was washed with acetone and dried at 90° C. for about two hours to yield 98 g. of N,N'-diisopropyl-1,4-phenylenediamine as its dihydrochloride, M.P. 292–295° C. with decomposition. A small sample was recrystallized from isopropyl alcohol-water for analysis, M.P. 290–291.5° C. with decomposition.

*Analysis.*—Calcd. for $C_{12}H_{20}N_2 \cdot 2HCl$: Cl, 26.74. Found: Cl, 26.65.

N,N'-bis(dichloroacetyl)-N,N'-diisopropyl - 1,4 - phenylenediamine when administered orally to hamsters infected with *Endamoeba criceti* was found to clear none out of 5, 2 out of 5 and 3 out of 4 of the animals at dose levels of 25, 50 and 100 mg./kg./day, respectively.

Example 128

N,N'-bis(chloroacetyl) - N,N' - diisopropyl-1,4-phenylenediamine was prepared following the procedure described in Example 127 using 13.3 g. of N,N'-diisopropyl-1,4-phenylenediamine, 220 cc. of I N aqueous sodium hydroxide solution, 250 cc. of ethylene dichloride, and 13.6 g. of monochloroacetyl chloride in 50 cc. of ethylene dichloride. There was thus obtained 6.3 g. of N,N'-bis-(chloroacetyl)-N,N'-diisopropyl - 1,4 - phenylenediamine, M.P. 184.4–189.2° C. (corr.), when recrystallized twice from isopropyl alcohol.

*Analysis.*—Calcd. for $C_{16}H_{22}Cl_2N_2O_2$: Cl, 20.53; N, 8.12. Found: Cl, 20.40; N, 7.93.

Example 129

N,N'-bis(dichloroacetyl)-N,N' - diethyl - 1,4 - phenylenediamine was prepared following the procedure described in Example 127 using 13.0 g. of N,N'-diethyl-1,4-phenylenediamine dihydrochloride, 260 cc. of 1 N aqueous sodium hydroxide solution, 130 cc. of ethylene dichloride, and 16.2 g. of dichloroacetyl chloride in 50 cc. of ethylene dichloride. There was thus obtained 12 g. of N,N'-bis(dichloroacetyl)-N,N'-diethyl - 1,4 - phenylenediamine, M.P. 144.0–146.4° C. (corr.), after three recrystallizations from isopropyl alcohol.

*Analysis.*—Calcd. for $C_{14}H_{16}Cl_4N_2O_2$: Cl, 36.72; N, 7.26. Found: Cl, 36.22; N, 7.24.

The intermediate N,N'-diethyl-1,4-phenylenediamine was prepared by catalytic hydrogenation of 1,4-phenylenediamine (21.6 g.) in absolute ethanol (150 cc.) using Raney nickel (20 g.). There was thus obtained 13 g. of N,N'-diethyl-1,4-phenylenediamine dihydrochloride, M.P. 250–253° C., after recrystallization from ethanol-methanol using decolorizing charcoal.

*Analysis.*—Calcd. for $C_{10}H_{16}N_2 \cdot 2HCl$: Cl, 29.90. Found: Cl, 28.58.

N,N'-dis(dichloroacetyl)-N,N'-diethyl-1,4-phenylenediamine when administered orally to hamsters infected with *Endamoeba criceti* was found to clear 1 out of 5 and 5 out of 5 of the animals at dose levels of 50 and 100 mg./kg./day, respectively.

Example 130

N,N'-bis(trichloroacetyl)-N,N'-diisopropyl-1,4-phenylenediamine was prepared as follows: To a stirred mixture containing 17 g. of N,N'-diisopropyl-N-trichloroacetyl-1,4-phenylenediamine, 110 cc. of 1 N aqueous sodium hydroxide solution and 150 cc. of ethylene dichloride was added slowly a solution containing 18.2 g. of trichloroacetyl chloride in 50 cc. of ethylene dichloride. When the addition had been completed, additional 10% aqueous sodium hydroxide solution was added to make the mixture basic. The resulting mixture was then stirred at room temperature for two hours. The ethylene dichloride layer was separated, dried and distilled in vacuo to yield a solid material which was retreated with trichloroacetyl chloride and aqueous sodium hydroxide solution in ethylene dichloride as above. The ethylene dichloride layer was separated, washed once with water and twice with 1 N aqueous hydrochloric acid solution; dried; and distilled in vacuo to yield a solid material. The solid was recrystallized twice from isopropyl alcohol to yield the product, N,N'-bis-(trichloroacetyl)-N,N'-diisopropyl-1,4-phenylenediamine, M.P. 182.2–184.8° C. (corr.).

*Analysis.*—Calcd. for $C_{16}H_{18}Cl_6N_2O_2$: Cl, 44.06; N, 5.80. Found: Cl, 44.10; N, 5.90.

The intermediate N,N'-diisopropyl-N-trichloroacetyl-1,4-phenylenediamine was prepared as follows: To a mixture containing 13.3 g. of N,N'-diisopropyl-1,4-phenylenediamine dihydrochloride, 95 cc. of 1 N aqueous sodium hydroxide solution and 250 cc. of ethylene dichloride kept below 5° C. was added dropwise with stirring a solution containing 21.7 g. of trichloroacetyl chloride in 50 cc. of ethylene dichloride. The sodium hydroxide solution was added fast enough to keep the mixture basic. When addition of the acid chloride had been completed, an additional 10 cc. of 1 N sodium hydroxide solution was added; and the resulting solution was stirred at room temperature for about thirty minutes and then allowed to stand at room temperature overnight. The ethylene dichloride layer was separated; washed successively with 1 N aqueous hydrochloric acid, 2% aqueous sodium hydroxide solution and water; dried; and distilled in vacuo to yield a solid material. The solid was recrystallized twice from isopropyl alcohol using decolorizing charcoal and once again from isopropyl alcohol. There was thus obtained, as a white crystalline solid, 7.7 g. of N,N'-diisopropyl-N-trichloroacetyl-1,4-phenylenediamine, M.P. 137.2–140.0° C. (corr.).

*Analysis.*—Calcd. for $C_{14}H_{19}Cl_3N_2O$: Cl, 31.52; N, 8.30. Found: Cl, 31.76; N, 8.24.

Example 131

N,N'-bis(2-butyl)-N,N'-bis(dichloroacetyl)-1,4-phenylenediamine was prepared as follows: A mixture containing 14.7 g. of N,N'-bis(2-butyl)-1,4-phenylenediamine dihydrochloride, 29.4 g. of dichloroacetyl chloride and 500 cc. of benzene was refluxed for twenty-four hours. The reaction mixture was cooled to room temperature; washed successively with 1 N aqueous hydrochloric acid solution, 2% aqueous sodium hydroxide solution and twice with water; dried; and distilled in vacuo to yield 25.9 g. of oily material which partially solidified. This material was crystallized from isopropyl alcohol using decolorizing charcoal and then recrystallized twice from isopropyl alcohol to yield, as a white crystalline solid, 14 g. of N,N'-bis(2-butyl)-N,N'-bis(dichloroacetyl)-1,4-phenylenediamine, M.P. 132.8–137.8° C. (corr.).

*Analysis.*—Calcd. for $C_{18}H_{24}Cl_4N_2O_2$: Cl, 32.07; N 6.34. Found: Cl, 31.78; N, 6.56.

The intermediate N,N'-bis(2-butyl)-1,4-phenylenediamine dihydrochloride was prepared from the known corresponding free base by dissolving the latter in isopropyl alcohol and adding the calculated quantity of 6 N ethanolic hydrogen chloride solution, whereupon there separated the solid dihydrochloride which was collected, washed with ether and recrystallized from ethanol-methanol. The product melted at 253–255° C.

*Analysis.*—Calcd. for $C_{14}H_{24}N_2 \cdot 2HCl$: Cl, 24.16. Found: Cl, 22.25.

Example 132

N,N'-bis(dichloroacetyl)-N-methyl-1,4-phenylenediamine was prepared as follows: To a stirred mixture containing 19.5 g. of N-methyl-1,4-phenylenediamine dihydrochloride, 450 cc. of 1 N aqueous sodium hydroxide solution and 200 cc. of ethylene dichloride kept at a temperature below 10° C. was slowly added a solution containing 29.4 g. of dichloroacetyl chloride in 50 cc. of ethylene dichloride. The reaction mixture was stirred at room temperature for an additional sixty minutes and then allowed to stand at room temperature overnight. The ethylene dichloride layer was separated; washed successively with 1 N aqueous hydrochloric acid solution and water; dried; and distilled in vacuo to yield a solid material. The solid was recrystallized from isopropyl alcohol using decolorizing charcoal and dried at 90° C. for about three hours to yield 27 g. of N,N'-bis(dichloroacetyl-N-methyl-1,4-phenylenediamine, M.P. 142.0–155.2° C. (corr.).

*Analysis.*—Calcd. for $C_{11}H_{10}Cl_4N_2O_2$: Cl, 41.20; N, 8.14. Found: Cl, 41.63; N, 8.07.

N,N'-bis(dichloroacetyl)-N-methyl-1,4-phenylenediamine when administered orally to hamsters infected with *Endamoeba criceti* was found to have an $ED_{50}$ of $3.4 \pm 0.6$ mg./kg./day. This compound was found to have an approximate acute oral toxicity ($ALD_{50}$) in mice of greater than 4,000 mg./kg.

Example 133

N,N'-bis(dichloroacetyl-bis(2-aminoethyl)sulfide was prepared as follows: To 17.3 g. of methyl dichloroacetate was added slowly with cooling 6 g. of bis(2-aminoethyl)sulfide. The mixture was then allowed to stand at room temperature for about one hour and the crystalline precipitate that had separated was collected and recrystallized several times from water-ethanol using decolorizing charcoal to yield 12.7 g. of N,N'-bis(dichloroacetyl)-bis(2-aminoethyl)sulfide, M.P. 117.2–119.2° C. (corr.), after drying in a vacuum desiccator over $P_2O_5$ for two days.

*Analysis.*—Calcd. for $C_8H_{12}Cl_4N_2O_2S$: Cl, 41.47; S, 9.37. Found: Cl, 41.50, 42.00; S, 9.64.

Example 134

N,N'-bis(dichloroacetyl)-N,N'-diethyl-bis(2-aminoethyl)sulfide was prepared as follows: To a mixture containing 15 g. of N,N'-diethyl-bis(2-aminoethyl)sulfide, 50 cc. of ethylene dichloride, 35 cc. of 35% aqueous sodium hydroxide solution and enough ice to chill the mixture to about 5° C. was added dropwise with stirring a solution containing 36.8 g. of dichloroacetyl chloride in 50 cc. of ethylene dichloride, keeping the reaction mixture below about 10° C. The addition took about fifteen minutes. The reaction mixture was then stirred for one hour at room temperature. The ethylene dichloride layer was washed successively with water, dilute aqueous hydrochloric acid and dilute sodium bicarbonate solution; dried over anhydrous sodium sulfate; and concentrated to yield, as a red-orange oil, 30.9 g. of N,N'-bis(dichloroacetyl)-N,N'-diethyl-bis(2-aminoethyl)sulfide.

*Analysis.*—Calcd. for $C_{12}H_{20}Cl_4N_2O_2S$: Cl, 35.62; S, 8.05. Found: Cl, 35.30; S, 8.07.

N,N'-bis(dichloroacetyl) - N,N' - diethyl-bis(2-aminoethyl)sulfide when administered orally to hamsters infected with *Endamoeba criceti* was found to clear none out of 4 and 2 out of 5 of the animals at dose levels of 50 and 100 mg./kg./day, respectively.

The intermediate N,N'-diethyl-bis(2-aminoethyl)sulfide was prepared by refluxing with stirring for eight hours a mixture containing 59.2 g. of N,N'-diacetyl-bis(2-aminoethyl)sulfide, 30 g. of lithium aluminium hydride and one liter of tetrahydrofuran. The reaction mixture was then allowed to stand overnight and treated successively with 35 cc. of water, 26 cc. of 20% aqueous sodium hydroxide solution and 120 cc. of water. The mixture was filtered to remove inorganic salts and the filtrate was concentrated in vacuo to a volume of about 75 cc. This residual oily concentrate was taken up in benzene and the benzene solution was first dried over anhydrous sodium sulfate and then concentrated in vacuo to yield an oil. The oil was distilled in vacuo, yielding, as a pale yellow liquid, 43 g. of N,N'-diethyl-bis(2 - aminoethyl)sulfide, B. P. 101–107° C. at 4 mm.

Example 135

N,N'-bis(dichloroacetyl) - N,N' - diethyl-bis(2-aminoethyl)sulfone was prepared as follows: To a solution containing 12.0 g. of N,N'-bis(dichloroacetyl)-N,N'-diethyl-bis(2-aminoethyl)sulfide in 90 cc. of acetic acid was added with stirring over a period of about 30 minutes, keeping the acetic acid solution at about 30–40° C., a solution containing 9.35 g. of potassium permanganate in 135 cc. of water. The reaction mixture was then stirred for an additional hour at about 30–40° C. and then was treated with solid sodium bisulfate to decolorize the solution. The reaction mixture was then allowed to stand overnight, neutralized with aqueous sodium hydroxide solution and extracted with n-butanol. The extract was concentrated in vacuo and the remaining solid was taken up in etheyl acetate. The resulting mixture was filtered to remove inorganic salts and the filtrate concentrated in vacuo to yield an orange oil which partially crystalized on standing. This material was triturated with pentane-ethyl acetate (9:1) to yield a white solid. The solid was recrystallized from ethyl acetate-n-pentane to yield 3.8 g. of N,N'-bis(dichloroacetyl) - N,N' - diethyl-bis(2-aminoethyl)sulfone, M.P. 96.0–100.4° C. (corr.).

*Analysis.*—Calcd. for $C_{12}H_{20}Cl_4N_2O_4S$: Cl, 32.97; S, 7.45. Found: Cl, 33.10; S, 7.26.

N,N'-bis(dichloroacetyl) - N,N' - diethyl-bis(2-aminoethyl)sulfone when administered orally to hamsters infected with *Endamoeba criceti* was found to clear 1 out of 5, 2 out of 5 and 4 out of 5 of the animals at dose levels 25, 50 and 100 mg./kg./day, respectively.

Example 136

Bis(3-dichloroacetamidopropyl)amine was prepared by mixing 6.5 g. of bis(3-aminopropyl)amine and 14.4 g. of methyl dichloroacetate with cooling. The reaction mixture was then allowed to stand for about five hours in an ice bath and the crystalline solid that separated was collected, triturated with ether and recrystallized several times from ethyl acetate to yield 4.1 g. of bis(3-dichloroacetamidoproppyl)amine, M.P. 113.2–116.0° C. (corr.).

*Analysis.*—Calcd. for $C_{10}H_{17}Cl_4N_3O_2$: Cl, 40.17; N, 11.90. Found: Cl, 40.30; N, 11.83.

Bis(3 - dichloroacetamidopropyl)amine when administered orally to hamsters infected with *Endamoeba criceti* was found to clean none out of 4 and 4 out of 4 of the animals at dose levels of 50 and 100 mg./kg./day, respectively.

Example 137

N,N' - bis(3 - dichloroacetamidopropyl)dichloroacetamide was prepared as follows: To a stirred mixture containing 6.5 g. of N,N'-bis(3-aminopropyl)amine, 50 cc. of ethylene dichloride, 35 cc. of 35% aqueous sodium hydroxide solution and enough ice to keep the temperature below 10° C. was added slowly a solution containing 28.8 g. of dichloroacetyl chloride and 50 cc. of ethylene dichloride. The addition took about fifteen minutes. The reaction mixture was stirred for an additional thirty minutes then allowed to stand at room temperature for another two hours. The layers were separated and the aqueous layer was washed with ethylene dichloride. The ethylene dichloride layer and washings were combined and concentrated in vacuo to a volume of about 50 cc. The concentrate was dissolved in ethyl acetate; washed successively with water, dilute aqueous hydrochloride, dilute aqueous sodium bicarbonate solution and water; and, concentrated in vacuo to an orange oil. The oil was again dissolved in ethyl acetate and the resulting solution concentrated in vacuo to yield an oil, which was then warmed in vacuo (1.5 mm.) and, after foaming had stopped, was poured out onto a cover glass. The material solidified on cooling, was ground to a light tan powder, and was dried in vacuo over $P_2O_5$. There was thus obtained 17.0 g. of N,N'-bis(3-dichloroacetamidopropyl)dichloroacetamide, M.P. 62.0–75.0° C. (corr.).

*Analysis.*—Calcd. for $C_{12}H_{17}Cl_6N_3O_3$: Cl, 45.83; N, 9.06. Found: Cl, 45.50; N, 8.74.

N,N' - bis(3 - dichloroacetamidopropyl)dichloroacetamide when administered orally to hamsters infected with *Endamoeba criceti* was found to clear none out of 5 and 4 out of 5 of the animals at dose levels of 25 and 50 mg./kg./day, respectively.

Example 138

N,N' - bis(dichloroacetyl) - bis(2 - methylaminoethyl) methylamine was prepared as follows: To a solution containing 10 g. of bis(2-methylaminoethyl)methylamine in 25 cc. of ethylene dichloride was added dropwise with stirring a solution containing 30.2 g. of dichloroacetyl chloride and 25 cc. of ethylene dichloride, keeping the solution at 5–10° C. by addition of ice and keeping it basic by addition of portions of 35% aqueous sodium hydroxide solution. After the addition of the acid halide had been completed, the reaction mixture was stirred for an hour at room temperature. The ethylene dichloride layer was separated; washed successively with water, aqueous sodium bicarbonate solution and water; dried over anhydrous sodium sulfate; and treated with ethereal hydrogen chloride to yield a gummy precipitate. The ethylene dichloride solution was decanted from the gum and concentrated in vacuo to a volume of about 25 cc. This solution was then added to a solution of the gum in methanol and the resulting solution was concentrated in vacuo to a volume of about 50 cc. The crystalline material that separated on cooling was recrystallized from methanol-ethyl acetate to yield 5.6 g. of N,N'-bis(dichloroacetyl)-bis(2-methylaminoethyl)methylamine as its hydrochloride, M.P. 165.6–166.4° C. (corr.).

*Analysis.*—Calcd. for $C_{11}H_{19}Cl_4N_3O_2 \cdot HCl$: Cl, 43.93; N, 10.42. Found: Cl, 43.60; N, 10.38.

Example 139

N,N'-bis(dichloroacetyl) - N,N' - diethyl - 1,2 - bis(2-aminoethoxy)ethane was prepared as follows: A solution containing 6.1 g. of dichloroacetyl chloride in 50 cc. of ethylene dichloride was added dropwise with stirring to a mixture kept between 5–10° C. and containing 5.0 g. of N,N'-diethyl-1,2 - bis(2-aminoethoxy)ethane, 3.6 g. of sodium hydroxide, 100 cc. of water and 100 cc. of ethylene dichloride. After the addition had been completed, the reaction mixture was stirred with cooling for an additional hour. The layers were separated and the aqueous layer washed with ethylene dichloride. The combined ethylene dichloride layer and washings were washed successively with water, 1 N HCl, water, aqueous sodium acetate solution and water; dried over anhydrous sodium sulfate; and evaporated in vacuo to yield 7.7 g. of oil which crystallized. The crystalline material was recrystallized from isopropyl alcohol to yield 5.7 g. of N,N'-bis(dichloroacetyl)-N,N'-diethyl-1,2-bis(2 - aminoethoxy) ethane, M.P. 84.4–87.8° C. (corr.).

*Analysis.*—Calcd. for $C_{14}H_{24}Cl_4N_2O_4$: Cl, 33.27; N, 6.57. Found: Cl, 33.70; N, 6.47.

The intermediate N,N'-diethyl-1,2-bis(2-aminoethoxy) ethane dihydrochloride was prepared by mixing 18.7 g. of bis(2-chloroethoxy)ethane with 150 cc. of 70% aqueous ethylamine and allowing the mixture to stand at room temperature for eight days. The reaction mixture was concentrated in vacuo to yield a white crystalline solid which was washed with ether and then recrystallized from isopropyl alcohol to yield 23.5 g. of the intermediate, M.P. 175–177° C.

*Analysis.*—Calcd. for $C_{10}H_{24}N_2O_2 \cdot HCl$: Cl, 25.58. Found: Cl, 23.60.

N,N'-bis(dichloroacetyl) - N,N' - diethyl - 1,2 - bis(2-aminoethoxy)ethane when administered orally to hamsters infected with *Endamoeba criceti* was found to clear 2 out of 5 and 4 out of 5 of the animals at dose levels of 50 and 100 mg./kg./day, respectively.

Example 140

N,N' - bis(dichloroacetyl) - 1,4 - bis(ethylamino)butene-2 was prepared following the procedure described in Example 76 using 17 g. of 1,4-bis(ethylamino)butene-2 dihydrochloride, 10 g. of sodium hydroxide, 75 cc. of water, 75 cc. of ethylene dichloride, and 18 g. of dichloroacetyl chloride in 25 cc. of ethylene dichloride. There was thus obtained 17 g. of N,N'-bis(dichloroacetyl)-1,4-bis(ethylamino)butene-2, M.P. 110.0–111.2° C. (corr.).

*Analysis.*—Calcd. for $C_{12}H_{18}Cl_4N_2O_2$: Cl, 39.00; N, 7.70. Found: Cl, 39.30; N, 7.62.

Example 141

1,12 - bis(dichloroacetamido) - 4,9 - diazododecane was prepared as follows: To a solution containing 10.1 g. of 1,12-diamino-4,9-diazododecane in 100 cc. of cyclohexane and 30 cc. of benzene was added 15.7 g. of methyl dichloroacetate. The precipitated oil was separated and taken up in ethanol. To the alcohol solution was added excess ethanolic hydrogen chloride and the resulting solid precipitate was collected and recrystallized several times from ethanol-water to yield 20.4 g. of 1,12-bis(dichloroacetamido) - 4,9 - diazododecane dihydrochloride, M.P. 252.6–255–6° C. (corr.) with decomposition.

*Analysis.*—Calcd. for $C_{14}H_{26}Cl_4N_4O_2 \cdot 2HCl$: Cl, 42.95; N, 11.32. Found: Cl, 42.80; N, 11.21.

The intermediate 1,12-diamino-4,9-diazododecane was prepared by the following two-step procedure: To a solution containing 42 g. of 1,4-butanediamine in 20 cc. of ether was added over a period of two and one-half hours with cooling and stirring 50.7 g. of acrylonitrile. The mixture was then stirred for an additional five hours and allowed to stand overnight. The ether was removed by distilling in vacuo to yield 89.4 g. of 1,10-dicyano-3,8-diazodecane. A small sample of this intermediate was converted into its dihydrochloride salt, M.P. 243–244° C. after recrystallization from water-ethanol. A mixture containing 89.4 g. of 1,10-dicyano-3,8-diazodecane, 20 g. of Raney nickel and 150 cc. of 15% ammonia in methanol was catalytically hydrogenated. The hydrogenation was carried out at about 90–102° C. and took about five hours. The reaction mixture was filtered; the filtrate was concentrated in vacuo to an oil; and the oil was distilled in vacuo. There was thus obtained 35.5 g. of 1,12-diamino-4,9-diazododecane boiling at 120–140° C. at 0.1 mm., $n_D^{26} = 1.4880$. The tetrahydrochloride melted at 309–311° C.

1,12-bis(dichloroacetamido)-4,9-diazododecane dihydrochloride when administered orally to hamsters infected with *Endamoeba criceti* was found to clear 1 out of 5 of the animals at a dose level of 100 mg./kg./day.

Example 142

N,N'-bis(dichloroacetyl)-bis(2-aminoethyl) ether was prepared as follows: To a solution containing 8.1 g. of bis(2-aminoethyl) ether dissolved in 50 cc. of benzene and 50 cc. of cyclohexane was added 26 g. of methyl dichloroacetate. The precipitated oil which crystallized on standing was recrystallized several times from ethanol-benzene and once from ethanol to yield 16.8 g. of N,N'-bis(dichloroacetyl)-bis(2-aminoethyl) ether, M.P. 119.6–121.0° C. (corr.).

*Analysis.*—Calcd. for $C_8H_{12}Cl_4N_2O_3$: Cl, 43.51; N, 8.60. Found: Cl, 43.60; N, 8.63.

N,N'-bis(dichloroacetyl)-bis(2-aminoethyl) ether when administered orally to hamsters infected with *Endamoeba criceti* was found to clear none out of 5 and 1 out of 5 of the animals at dose levels of 25 and 50 mg./kg./day, respectively.

Example 143

N,N'-bis(dichloroacetyl)-1,4-bis(aminomethyl)benzene was prepared following the procedure described in Example 26B using 4 g. of 1,4-bis(aminomethyl)benzene dihydrochloride, 3.2 g. of sodium hydroxide, 50 cc. of water, 50 cc. of ethylene dichloride, and 6 g. of dichloroacetyl chloride in 25 cc. of ethylene dichloride. There was thus obtained 2 g. of N,N'-bis(dichloroacetyl)-1,4-bis(aminomethyl)benzene, M.P. 201.2–204.4° C. (corr.), when recrystallized from isopropyl alcohol and dried at 30 mm. for 100° C. for twenty-four hours.

*Analysis.*—Calcd. for $C_{12}H_{12}Cl_4N_2O_2$: Cl, 39.59; N, 7.83. Found: Cl, 39.30; N, 7.71.

N,N'-bis(dichloroacetyl)-1,4-bis(aminomethyl)benzene when administered orally to hamsters infected with *Endamoeba criceti* was found to clear none out of 4 and 1 out of 4 of the animals at dose levels of 50 and 100 mg./kg./day, respectively.

Example 144

N,N'-bis(3-chloropropanoyl) - 1,4 - bis(aminomethyl) benzene was prepared following the procedure described in Example 26B using 3 g. of 1,4-bis(aminomethyl) benzene, 2.3 g. of sodium hydroxide, 40 cc. of water, 40 cc. of ethylene dichloride, and 3.6 g. of 3-propanoyl chloride in 10 cc. of ethylene dichloride. There was thus obtained 3 g. of N,N'-bis(3-chloropropanoyl)-1,4-bis (aminomethyl)benzene, M.P. 197.8–198.8° C. (corr.) with decomposition, after recrystallization from ethanol and drying at 70–80° C. at 1 mm. for 48 hours.

*Analysis.*—Calcd. for $C_{14}H_{18}Cl_2N_2O_2$: Cl, 22.36; N, 8.84. Found: Cl, 22.17; N, 8.83.

N,N'-bis(3-chloropropanoyl) - 1,4 - bis(aminomethyl) benzene when administered orally to hamsters infected with *Endamoeba criceti* was found to clear 4 out of 5 and 5 out of 5 of the animals at dose levels of 50 and 100 mg./kg./day, respectively.

Example 145

N,N' - bis(trichloroacetyl)-N,N'-diethyl-1,4-bis(aminomethyl)benzene was prepared following the procedure described in Example 26B using 5 g. of N,N'-diethyl-1,4-bis(aminomethyl)benzene dihydrochloride, 32 cc. of 10% aqueous sodium hydroxide solution, 50 cc. of ethylene dichloride, and 7.6 g. of trichloroacetyl chloride in 15 cc. of ethylene dichloride. There was thus obtained 5.3 g. of N,N'-bis(trichloroacetyl) - N,N' - diethyl-1,4-bis(aminomethyl)benzene, M.P. 125.8–127.4° C. (corr.), when recrystallized from benzene.

*Analysis.*—Calcd. for $C_{16}H_{18}Cl_6N_2O_2$: C, 39.78; H, 3.75; Cl 44.05. Found: C, 39.55; H, 3.50; Cl, 44.05.

N,N' - bis(trichloroacetyl)-N,N'-diethyl-1,4-bis(aminomethyl)benzene when administered orally to hamsters infected with *Endamoeba criceti* was found to clear none out of 5, 3 out of 5 and 4 out of 4 of the animals at dose levels of 12.5, 25 and 50 mg./kg./day, respectively.

*Example 146*

N,N'-bis(dichloroacetyl) - N,N' - bis(2-hydroxyethyl)-4-(3-aminopropyl)benzylamine is obtained following the procedure described in Example 1B using molar equivalent quantities of N,N'-bis(2-hydroxyethyl)-4-(3-aminopropyl)benzylamine and methyl dichloroacetate.

*Example 147*

N,N' - bis(bromochloroacetyl)-N,N'-diethyl-1,4-bis(4-aminobutyl)benzene is obtained following the procedure described in Example 26B using molar equivalent quantities of N,N'-diethyl-1,4-bis(4-aminobutyl)benzene and bromochloroacetyl chloride.

*Example 148*

N,N' - bis(2,2,3 - trichloropropanoyl)-2-chloro-N,N'-diethyl-4-(2-aminoethyl)benzylamine is obtained following the procedure described in Example 26B using molar equivalent quantities of 2-chloro-N,N'-diethyl-4-(2-aminoethyl)benzylamine and 2,2,3-trichloropropanoyl chloride.

*Example 149*

N,N'-bis(dibromoacetyl)-N,N'-diethyl-1,4-bis(2-amino,ethyl)cyclohexane is obtained following the procedure described in Example 124 using molar equivalent quantities of N,N'-diethyl-1,4-bis(2-aminoethyl)cyclohexane and dibromoacetyl bromide.

*Example 150*

N,N' - bis(dichloroacetyl) - N,N'-bis(2-methoxyethyl)-1,2-bis(aminomethyl)cyclopropane is obtained following the procedure described in Example 124 using molar equivalent quantities of N,N'-bis(2-methoxyethyl)-1,2-bis(aminomethyl)cyclopropane and dichloroacetyl chloride.

*Example 151*

N,N' - bis(dichloroacetyl) - N,N' - dimethyl - 1,3 - bis(3-aminopropyl)cyclopentane is obtained following the procedure described in Example 124 using molar equivalent quantities of N,N'-dimethyl-1,3-bis(3-aminopropyl)cyclopentane and dichloroacetyl chloride.

*Example 152*

N,N'-bis(dichloroacetyl)-N,N' - diethyl-1,6-bis(aminomethyl)naphthalene is obtained following the procedure described in Example 26B using molar equivalent quantities of N,N'-diethyl-1,6-bis(aminomethyl)naphthalene and dichloroacetyl chloride.

*Example 153*

N,N'-bis(dibromoacetyl) - N,N' - bis(2-hydroxyethyl)-2,5-bis(aminomethyl)pyridine is obtained following the procedure described in Example 1B using molar equivalent quantities of N,N' - bis(2 - hydroxyethyl) - 2,5 - bis(aminomethyl)pyridine and methyl dibromoacetate.

*Example 154*

N,N'-bis(dichloroacetyl)-N,N' - diethyl-2,4-bis(aminomethyl)quinoline is obtained following the procedure described in Example 26B using molar equivalent quantities of N,N' - diethyl - 2,4 - bis(aminomethyl)quinoline and dichloroacetyl chloride.

*Example 155*

N,N'-bis(dichloroacetyl)-7 - chloro - N,N'-diethyl-4,8-bis(aminomethyl)quinoline is obtained following the procedure described in Example 26B using molar equivalent quantities of 7-chloro-N,N'-diethyl-4,8-bis(aminomethyl)quinoline and dichloroacetyl chloride.

*Example 156*

N,N' - bis(dichloroacetyl) - N,N' - diethyl - 1,4 - bis(aminomethyl)acridine is obtained following the procedure described in Example 26B using molar equivalent quantities of N,N'-diethyl-1,4-bis(aminomethyl)acridine and dichloroacetyl chloride.

*Example 157*

N,N' - bis(dichloroacetyl) - N,N' - diethyl - 2,4 - bis(aminoethyl)pyrimidine is obtained following the procedure described in Example 26B using molar equivalent quantities of N,N'-diethyl-2,4-bis(aminomethyl)pyrimidine and dichloroacetyl chloride.

*Example 158*

N,N'-bis(dichloroacetyl) - N,N'-diethyl-1,4-bis(aminomethyl)isoquinoline is obtained following the procedure described in Example 26B using molar equivalent quantities of N,N'-diethyl-1,4-bis(aminomethyl)isoquinoline and dichloroacetyl chloride.

*Example 159*

N,N'-bis(dichloroacetyl)-N,N'-diethyl - 2,5-bis(aminomethyl)furan is obtained following the procedure described in Example 26B using molar equivalent quantities of N,N'-diethyl-2,5-bis(aminomethyl)furan and dichloroacetyl chloride.

*Example 160*

N,N'-bis(dichloroacetyl)-N,N' - diethyl-2,5-bis(aminomethyl)thiazole is obtained following the procedure described in Example 26B using molar equivalent quantities of N,N' - diethyl - 2,5 - bis(aminomethyl)thiazole and dichloroacetyl chloride.

*Example 161*

N,N'-bis(dichloroacetyl)-N,N' - diethyl-2,5-bis(aminomethyl)thiophene is obtained following the procedure described in Example 26B using molar equivalent quantities of N,N' - diethyl - 2,5 - bis(aminomethyl)thiophene and dichloroacetyl chloride.

*Example 162*

N,N'-bis(dichloroacetyl)-N,N' - diethyl-2-methoxy-1,4-bis(aminomethyl)benzene is obtained following the procedure described in Example 26B using molar equivalent quantities of N,N'-diethyl - 2 - methoxy - 1,4 - bis(aminomethyl)benzene and dichloroacetyl chloride.

*Example 163*

N,N' - bis(dichloroacetyl) - N,N' - diethyl - 2 - methylmercapto-1,4-bis(aminomethyl)benzene is obtained following the procedure described in Example 26B using molar equivalent quantities of N,N'-diethyl-2-methylmercapto - 1,4 - bis(aminomethyl)benzene and dichloroacetyl chloride.

*Example 164*

N,N' - bis(dichloroacetyl) - 2 - n - butylsulfinyl - N,N'-diethyl-1,4-bis(aminomethyl)benzene is obtained following the procedure described in Example 26B using molar equivalent quantities of 2-n-butylsulfinyl-N,N'-diethyl-1,4-bis(aminomethyl)benzene and dichloroacetyl chloride.

*Example 165*

N,N' - bis(dichloroacetyl) - 2 - n - butylsulfonyl - N,N'-diethyl-1,4-bis(aminomethyl)benzene is obtained following the procedure described in Example 26B using molar equivalent quantities of 2-n-butylsulfonyl-N,N'-diethyl-1,4-bis(aminomethyl)benzene and dichloroacetyl chloride.

*Example 166*

N,N' - bis(dichloroacetyl) - 2 - n - butylmercapto-N,N'-diethyl-1,4-bis(aminomethyl)benzene is obtained following the procedure described in Example 26B using molar equivalent quantities of 2-n-butylmercapto-N,N'-diethyl-1,4-bis(aminomethyl)benzene and dichloroacetyl chloride.

Example 167

N,N' - bis(dichloroacetyl) - N,N' - diethyl - 2 - nitro-1,4-bis(aminomethyl)benzene is obtained following the procedure described in Example 26B using molar equivalent quantities of N,N'-diethyl-2-nitro-1,4-bis(aminomethyl)benzene and dichloroacetyl chloride.

Example 168

N,N' - bis(dichloroacetyl) - N,N' - diethyl - 5 - diethylamino-2,6-bis(aminomethyl)pyridine is obtained following the procedure described in Example 26B using molar equivalent quantities of N,N'-diethyl-5-diethylamino-2,6-bis(aminomethyl)pyridine and dichloroacetyl chloride.

Example 169

N,N' - bis(dichloroacetyl) - N,N' - diethyl - 1,4 - bis(1-aminoethyl)benzene is obtained following the procedure described in Example 26B using molar equivalent quantities of N,N'-diethyl-1,4-bis(1-aminoethyl)benzene and dichloroacetyl chloride.

Example 170

N,N' - bis(tribromoacetyl)-N,N'-bis(4-methylphenyl)-1,4-bis(aminomethyl)benzene is obtained following the procedure described in Example 26B using molar equivalent quantities of N,N'-bis(4-methylphenyl)-1,4-bis(aminomethyl)benzene and tribromoacetyl chloride.

Example 171

N,N' - bis(2 - cyanoethyl)-N,N'-bis(dichloroacetyl)-1,4-bis(aminomethyl)benzene is obtained following the procedure described in Example 26B using molar equivalent quantities of N,N'-bis(2-cyanoethyl)-1,4-bis(aminomethyl)benzene and dichloroacetyl chloride.

Example 172

N,N' - bis(5 - cyanopentyl)-N,N'-bis(dichloroacetyl)-1,6-hexanediamine is obtained following the procedure described in Example 76 using molar equivalent quantities of N,N'-bis(5-cyanopentyl)-1,6-hexanediamine and dichloroacetyl chloride.

Example 173

N,N' - bis(2-carbamylethyl)-2-bromo-N,N'-bis(dichloroacetyl)-1,4-bis(aminomethyl)benzene is obtained following the procedure described in Example 26B using molar equivalent quantities of N,N'-bis(2-carbamylethyl)-2-bromo-1,4-bis(aminomethyl)benzene and dichloroacetyl chloride.

Example 174

N,N' - bis(3-carbamylpropyl)-N,N'-bis(dichloroacetyl)-1,8-octanediamine is obtained following the procedure described in Example 76 using molar equivalent quantities of N,N' - bis(3-carbamylpropyl)-1,8-octanediamine and dichloroacetyl chloride.

Example 175

N,N'-bis(dichloroacetyl) - N,N' - diethyl-1,2-ethanediamine is obtained following the procedure described in Example 76 using molar equivalent quantities of N,N'-diethyl-1,2-ethanediamine and dichloroacetyl chloride.

Example 176

N,N' - bis(dichloroacetyl)-N,N'-diethyl-1,16-hexadecanediamine is obtained following the procedure described in Example 76 using molar equivalent quantities of N,N'-diethyl-1,16-hexadecanediamine and dichloroacetyl chloride.

Example 177

N,N' - bis(dibromoacetyl)-N,N'-diethyl-1,10-decanediamine is obtained following the procedure described in Example 76 using molar equivalent quantities of N,N'-diethyl-1,10-decanediamine and dibromoacetyl bromide.

Example 178

N,N' - bis(dichloroacetyl) - N,N'-diethyl-3-ethyl-1,6-hexanediamine is obtained following the procedure described in Example 76 using molar equivalent quantities of N,N'-diethyl-3-ethyl-1,6-hexanediamine and dichloroacetyl chloride.

Example 179

N,N' - bis(dichloroacetyl) - N,N'-bis(2-ethoxyethyl)-2,3-dimethyl-1,6-hexanediamine is obtained following the procedure described in Example 76 using molar equivalent quantities of N,N' - bis(2-ethoxyethyl)-2,3-dimethyl-1,6-hexanediamine and dichloroacetyl chloride.

Example 180

N,N' - bis(dichloroacetyl)-3-methyl-1,8-octanediamine is obtained following the procedure described in Example 76 using molar equivalent quantities of 3-methyl-1,8-octanediamine and dichloroacetyl chloride.

Example 181

N,N' - bis(3 - chloropropanoyl)-N,N'-diethyl-1,4-bis(aminomethyl)benzene is obtained following the procedure described in Example 26B using molar equivalent quantities of N,N'-diethyl-1,4-bis(aminomethyl)benzene and 3-chloropropanoyl chloride.

Example 182

N,N' - bis(2,2-diiodopropanoyl)-N,N'-diethyl-1,6-hexanediamine is obtained following the procedure described in Example 76 using molar equivalent quantities of N,N'-diethyl-1,6-hexanediamine and 2,2-diiodopropanoyl chloride.

Example 183

N,N' - bis(3-chlorobutanoyl)-N,N'-diethyl-1,4-bis(aminomethyl)benzene is obtained following the procedure described in Example 26B using molar equivalent quantities of N,N'-diethyl-1,4-bis(aminomethyl)benzene and 3-chlorobutanoyl chloride.

Example 184

N,N' - bis(4-chlorobutanoyl)-N,N'-diethyl-1,4-bis(aminomethyl)benzene is obtained following the procedure describe din Example 26B using molar equivalent quantities of N,N'-diethyl-1,4-bis(aminomethyl)benzene and 4-chlorobutanoyl chloride.

Example 185

N,N' - bis(2,3,4-trichlorobutanoyl)-N,N'-diethyl-1,4-bis(aminomethyl)benzene is obtained following the procedure described in Example 26B using molar equivalent quantities of N,N'-diethyl-1,4-bis(aminomethyl)benzene and 2,3,4-trichlorobutanoyl chloride.

Example 186

N,N'-bis(dichloroacetyl) - N,N' - diethyl-bis(2-aminoethyl)sulfoxide is obtained following the procedure described in Example 76 using molar equivalent quantities of N,N'-diethyl-bis(2-aminoethyl)sulfoxide and dichloroacetyl chloride or, alternatively, it can be prepared by reacting the corresponding N,N' - bis(dichloroacetyl)-N,N'-diethyl-bis(2-aminoethyl)sulfide with an oxidizing agent effective to oxidize sulfides to sulfoxides, e.g., hydrogen peroxide.

Example 187

N,N'-bis(dichloroacetyl) - N,N' - diethyl-bis(2-aminoethyl)dichloroacetamide is obtained following the procedure described in Example 76 using molar equivalent quantities of N,N' - diethyl-bis(2-aminoethyl)dichloroacetamide and dichloroacetyl chloride.

Example 188

N,N' - bis(dichloroacetyl) - N,N' - diethyl - bis(2-aminoethyl)allylamine is obtained following the procedure described in Example 138 using molar equivalent quantities of N,N'-diethyl-bis(2-aminoethyl)allylamine and dichloroacetyl chloride.

*Example 189*

N,N' - bis(dichloroacetyl) - N,N' - diethyl - bis(3-aminopropyl)propargylamine is obtained following the procedure described in Example 138 using molar equivalent quantities of N,N'-diethyl-bis(3-aminopropyl)propargylamine and dichloroacetyl chloride.

*Example 190*

N,N' - bis(dichloroacetyl) - N,N' - diethyl - 1,8 - diaminooctyne-4,5 is obtained following the procedure described in Example 76 using molar equivalent quantities of N,N'-diethyl-1,8-diaminooctyne-4,5 and dichloroacetyl chloride.

*Example 191*

N,N' - bis(dichloroacetyl) - N,N' - diethyl - 1,10 - diaminodecadiene-3,4,7,8 is obtained following the procedure described in Example 76 using molar equivalent quantities of N,N'-diethyl-1,10-diaminodecadiene-3,4,7,8 and dichloroacetyl chloride.

*Example 192*

N,N' - bis(dichloroacetyl) - N,N' - bis(2 - formyloxyethyl)-1,6-hexanediamine is obtained following the procedure described in Example 66 using molar equivalent quantities of N,N'-bis(dichloroacetyl)-N,N'-bis(2-hydroxyethyl)-1,6-hexanediamine and formic acid.

*Example 193*

N,N' - bis(dichloroacetyl) - N,N' - diethyl - 2 - trifluoromethyl-1,4-bis(aminomethyl)benzene is obtained following the procedure described in Example 26B using molar equivalent quantities of N,N'-diethyl-2-trifluoromethyl-1,4-bis(aminomethyl)benzene and dichloroacetyl chloride.

*Example 194*

N,N' - bis(dichloroacetyl) - N,N' - dipropargyl - 1,4-bis(aminomethyl)benzene is obtained following the procedure described in Example 26B using molar equivalent quantities of N,N'-dipropargyl-1,4-bis(aminomethyl)benzene and dichloroacetyl chloride.

*Example 195*

N,N' - bis(dichloroacetyl) - N,N' - dipropargyl - 1,6-hexanediamine is obtained following the procedure described in Example 76 using molar equivalent quantities of N,N'-dipropargyl-1,6-hexanediamine and dichloroacetyl chloride.

*Example 196*

N,N' - bis(dichloroacetyl) - N,N' - diallyl - 1,6 - hexanediamine is obtained following the procedure described in Example 76 using molar equivalent quantities of N,N'-diallyl-1,6-hexanediamine and dichloroacetyl chloride.

*Example 197*

N,N' - bis(dichloroacetyl) - N,N' - dicyclohexyl - 1,8-octanediamine is obtained following the procedure described in Example 76 using molar equivalent quantities of N,N'-dicyclohexyl-1,8-octanediamine and dichloroacetyl chloride.

*Example 198*

N,N' - bis(dichloroacetyl) - N,N' - bis(cyclopentylmethyl)-1,7-heptanediamine is obtained following the procedure described in Example 76 using molar equivalent quantities of N,N'-bis(cyclopentylmethyl)-1,7-heptanediamine and dichloroacetyl chloride.

*Example 199*

N,N' - bis(dichloroacetyl) - N,N' - diphenyl - 1,6 - hexanediamine is obtained following the procedure described in Example 76 using molar equivalent quantities of N,N'-diphenyl-1,6-hexanediamine and dichloroacetyl chloride.

*Example 200*

N,N' - bis(dichloroacetyl) - N,N' - bis(3 - ethylphenyl)-1,6-hexanediamine is obtained following the procedure described in Example 76 using molar equivalent quantities of N,N'-bis(3-ethylphenyl)-1,6-hexanediamine and dichloroacetyl chloride.

*Example 201*

N,N' - bis(dichloroacetyl) - N,N' - bis(4 - methylphenyl)1,6-hexanediamine is obtained following the procedure described in Example 76 using molar equivalent quantities of N,N'-bis(4-methylphenyl)-1,6-hexanediamine and dichloroacetyl chloride.

*Example 202*

N,N' - bis(dichloroacetyl) - N,N' - dibenzyl - 1,10-decanediamine is obtained following the procedure described in Example 76 using molar equivalent quantities of N,N'-dibenzyl-1,10-decanediamine and dichloroacetyl chloride.

*Example 203*

N,N' - bis(dichloroacetyl) - N,N' - bis(2-phenylethyl)-1,6-hexanediamine is obtained following the procedure described in Example 76 using molar equivalent quantities of N,N'-bis(2-phenylethyl)-1,6-hexanediamine and dichloroacetyl chloride.

*Example 204*

N,N'-bis(trichloroacetyl)-1,8-octanediamine was prepared following the procedure described in Example 76 using 7.0 g. of 1,8-octanediamine, 4.4 g. of sodium hydroxide, 50 cc. of water, about 100 cc. of ethylene dichloride, and 20 g. of trichloroacetyl chloride in about 50 cc. of ethylene dichloride. There was thus obtained 9.2 g. of N,N'-bis(trichloroacetyl)-1,8-octanediamine, M.P. 123.6–126.2° C. (corr.), when recrystallized twice from ethylene dichloride.

Analysis.—Calcd. for $C_{12}H_{18}N_2Cl_6O_2$: Cl, 48.80; N, 6.44. Found: Cl, 48.50; N, 6.36.

*Example 205*

N,N'-bis(dibromoacetyl) - N,N' - diethyl-1,8-octanediamine is obtained following the procedure described in Example 76 using molar equivalent quantities of N,N'-diethyl - 1,8 - octanediamine and dibromoacetyl bromide. Alternatively, the preparation can be carried out using methyl dibromoacetate in place of dibromoacetyl chloride.

*Example 206*

N,N' - bis(tribromoacetyl) - N,N'-diethyl-1,8-octanediamine is obtained following the procedure described in Example 76 using molar equivalent quantities of N,N'-diethyl-1,8-octanediamine and tribromoacetyl chloride. Alternatively, the preparation can be carried out using methyl tribromoacetate in place of tribromoacetyl chloride.

*Example 207*

N,N' - bis(tribromoacetyl) - N,N'-diethyl-1,6-hexanediamine is obtained following the procedure described in Example 76 using molar equivalent quantities of N,N'-diethyl-1,6-hexanediamine and tribromoacetyl chloride.

*Example 208*

N,N'-bis(bromochloroacetyl)-N,N'-diethyl-1,8-octanediamine is obtained following the procedure described in Example 76 using molar equivalent quantities of N,N'-diethyl-1,8-octanediamine and bromochloroacetyl chloride.

*Example 209*

N,N' - bis(diiodoacetyl) - N,N'-diethyl-1,8-octanediamine is obtained following the procedure described in Example 76 using molar equivalent quantities of N,N'-diethyl-1,8-octanediamine and diiodoacetyl chloride.

Example 210

N,N' - bis(diiodoacetyl) - N,N'-diethyl-1,6-hexanediamine is obtained following the procedure described in Example 76 using molar equivalent quantities of N,N'-diethyl-1,6-hexanediamine and diiodoacetyl chloride.

Example 211

N,N' - bis(dibromoacetyl) - 1,3-propanediamine is obtained following the procedure described in Example 76 using molar equivalent quantities of 1,3-propanediamine and dibromoacetyl chloride.

Example 212

N,N'-bis(dibromoacetyl)1-4-butanediamine is obtained following the procedure described in Example 76 using molar equivalent quantities of 1,4-butanediamine and dibromoacetyl chloride.

Example 213

N,N' - bis(dibromoacetyl) - 1,5-pentanediamine is obtained following the procedure described in Example 76 using molar equivalent quantities of 1,5-pentanediamine and dibromoacetyl chloride.

Example 214

N,N' - bis(dibromoacetyl) - 1,7-heptanediamine is obtained following the procedure described in Example 76 using molar equivalent quantities of 1,7-heptanediamine and dibromoacetyl chloride.

Example 215

N,N'-bis(dibromoacetyl) 1,8-octanediamine is obtained following the procedure described in Example 76 using molar equivalent quantities of 1,8-octanediamine and dibromoacetyl chloride.

Example 216

N,N'-bis(dibromoacetyl) - 1,10 - decanediamine is obtained following the procedure described in Example 76 using molar equivalent quantities of 1,10-decanediamine and dibromoacetyl chloride.

Example 217

N,N'-bis(dibromoacetyl)-1,12-dodecanediamine is obtained following the procedure described in Example 76 using molar equivalent quantities of 1,12-dodecanediamine and dibromoacetyl chloride.

Example 218

N,N' - bis(dibromoacetyl) - 1,16-hexadecanediamine is obtained following the procedure described in Example 76 using molar equivalent quantities of 1,16-hexadecanediamine and dibromoacetyl chloride.

Example 219

N,N'-bis(2,2-dibromopropanoyl)-1,6-hexanediamine is obtained following the procedure described in Example 76 using molar equivalent quantities of 1,6-hexanediamine and 2,2-dibromopropanoly chloride.

Example 220

N,N'-bis(2,2-dibromobutanoyl) - 1,8 - octanediamine is obtained following the procedure described in Example 76 using molar equivalent quantities of 1,8-octanediamine and 2,2-dibromobutanoyl chloride.

Example 221

N,N' - bis(2,2,3-tribromopropanoyl)-1,6-hexanediamine is obtained following the procedure described in Example 76 using molar equivalent quantities of 1,6-hexanediamine and 2,2,3-tribromopropanoyl chloride.

Example 222

N,N'-bis(dibromoacetyl)-N,N'-dimethyl-1,4-phenylenediamine is obtained following the procedure described in Example 76 using molar equivalent quantities of N,N'-dimethyl-1,4-phenylenediamine and dibromoacetyl chloride.

Example 223

N,N'-bis(dibromoacetyl)-N,N'-diethyl-1,4-phenylenediamine is obtained following the procedure described in Example 76 using molar equivalent quantities of N,N'-diethyl-1,4-phenylenediamine and dibromoacetyl chloride.

Example 224

N,N' - bis(dichloroacetyl)-2-chloro-N,N'-dimethyl-1,4-phenylenediamine is obtained following the procedure described in Example 76 using molar equivalent quantities of 2-chloro-N,N'-dimethyl-1,4-phenylenediamine and dichloroacetyl chloride.

Example 225

N,N' - bis(dichloroacetyl) - N,N' - dimethyl - 2 - methoxy-1,4-phenylenediamine is obtained following the procedure described in Example 76 using molar equivalent quantities of N,N'-dimethyl-2-methoxy-1,4-phenylenediamine and dichloroacetyl chloride.

Example 226

N,N' - bis(dichloroacetyl) - N,N',2,5 - tetramethyl - 1,4-phenylenediamine is obtained following the procedure described in Example 76 using molar equivalent quantities of N,N',2,5 - tetramethyl - 1,4 - phenylenediamine and dichloroacetyl chloride.

Example 227

N,N' - bis(dichloroacetyl) - N,N' - dimethyl - 1,3-phenylenediamine is obtained following the procedure described in Example 76 using molar equivalent quantities of N,N'-dimethyl-1,3-phenylenediamine and dichloroacetyl chloride.

Example 228

N,N' - bis(dichloroacetyl) - 4 - chloro - N,N' - dimethyl-1,3-phenylenediamine is obtained following the procedure described in Example 76 using molar equivalent quantities of 4 - chloro - N,N' - dimethyl - 1,3 - phenylenediamine and dichloroacetyl chloride.

Example 229

N,N' - bis(dichloroacetyl) - 2,4 - dimethyl - 1,5 - bis (aminomethyl)benzene was prepared following the procedure described in Example 26B using 16.4 g. of 2,4-dimethyl-1,5-bis(aminomethyl)benzene, 8.8 g. of sodium dihydroxide, 200 cc. of water, 100 cc. of ethylene dichloride, and 29.4 g. of dichloroacetyl chloride in 150 cc. of ethylene dichloride. There was thus obtained 30.2 g. of N,N'-bis (dichloroacetyl) - 2,4 - dimethyl - 1,5 - bis(aminomethyl) benzene, M.P. 261.2–263.4° C. (corr.).

*Analysis.*—Calcd. for $C_{14}H_{16}C_{14}N_2O_2$: Cl, 36.73; N, 7.26. Found: Cl, 36.60; N, 7.09.

Example 230

N,N' - bis(dichloroacetyl) - N,N' - diethyl - 1,4 - bis(6-aminohexyl)benzene is obtained following the procedure described in Example 26B using molar equivalent quantities of N,N'-diethyl-1,4-bis(6-aminohexyl)benzene and dichloroacetyl chloride.

Example 231

N,N' - bis(dichloroacetyl) - N,N' - diethyl - 2 - (4-aminophenyl)ethylamine is obtained following the procedure described in Example 26B using molar equivalent quantities of N,N'-diethyl-2-(4-aminophenyl)ethylamine and dichloroacetyl chloride.

Example 232

N,N' - bis(dichloroacetyl) - N,N' - diethyl - 2 - hydroxy-1,4-bis(aminomethyl)benzene is obtained following the procedure described in Example 26B using molar equivalent quantities of N,N'-diethyl-2-hydroxy-1,4-bis(aminomethyl)benzene and dichloroacetyl chloride.

Example 233

N,N' - bis(dichloroacetyl) - N,N' - diethyl - 1,5 - bis(aminomethyl)cyclooctane is obtained following the procedure described in Example 124 using molar equivalent quantities of N,N'-diethyl-1,5-bis(aminomethyl)cyclooctane and dichloroacetyl chloride.

Example 234

N,N' - bis(dichloroacetyl) - N,N' - diethyl - 1,4 - bis(6-aminohexyl)cyclohexane is obtained following the procedure described in Example 124 using molar equivalent quantities of N,N'-diethyl-1,4-bis(6-aminohexyl)cyclohexane and dichloroacetyl chloride.

Example 235

N,N' - bis(dichloroacetyl) - N,N' - diethyl - 1,4 - diaminocyclohexane is obtained following the procedure described in Example 125 using molar equivalent quantities of N,N'-diethyl-1,4-diaminocyclohexane and dichloroacetyl chloride.

PHARMACEUTICAL PROPERTIES AND COMPOSITIONS

The novel di-(halogenated-alkanamides) of my invention have amebacidal activity, as illustrated in the foregoing examples. These compounds when administered orally in aqueous suspension to hamsters infected with *Endamoeba criceti* were found to completely clear the animals of the infection at varying drug levels of compound per kg. of body weight per day for four consecutive days. Many of the compounds, as shown in the above examples, have $ED_{50}$ values below 10 mg. per kg. of body weight and some have $ED_{50}$ values below 5 mg. per kg. of body weight, $ED_{50}$ meaning the effective dose necessary to clear 50% of the hamsters of the amebic infection. In contrast to their unusually high activity, my compounds have very low toxicity. For example, N,N'-bis(dichloroacetyl) - N,N' - bis(2 - hydroxyethyl) - 1,4 - bis(aminomethyl)benzene and N,N' - bis(dichloroacetyl)-N,N' - diethyl - 1,4 - bis(aminomethyl)benzene each have acute oral $ALD_{50}$ values (in mice) of greater than 12,000 mg. per kg.

In addition to the above novel di-(halogenated-alkanamides) of my invention, I have also prepared other di-(halogenated-alkanamides) some of which are old in the art. These previously known compounds have been tested at my request and found also to have amebacidal activity when tested as described above. Illustrative of these compounds, which as presented hereinbelow are comprehended as active ingredients in the pharmaceutical compositions of my invention, are the following di-(halogenated-alkanamides) given with their respective amebacidal activities as determined when administered orally to hamsters infected with *Endamoeba criceti* according to the above-described procedure: N,N'-bis(dichloroacetyl)-1,6-hexanediamine, found to clear none out of 5 and 4 out of 5 of the animals at dose levels of 12.5 and 25 mg./kg./day, respectively; N,N'-bis(chloroacetyl)-N,N'-dimethyl-1,4-phenylenediamine, found to clear none out of 5, 3 out of 5, 4 out of 5 and 5 out of 5 of the animals at dose levels of 3.12, 6.25, 12.5 and 25 mg./kg./day, respectively; and N,N' - bis(dichloroacetyl) - 1,4 - phenylenediamine, found to clear 1 out of 5 and 3 out of 5 of the animals at dose levels of 25 and 50 mg./kg./day, respectively.

The di-(halogenated-alkanamides) of my invention also were tested in vitro and found to have amebacidal activity against *Endamoeba histolytica*. This test procedure is described as follows using as the test drug N,N' - bis(dichloroacetyl) - N,N' - diethyl - 1,4 - bis(aminomethyl)benzene, hereinafter referred to as Compound 70 (chemical synthesis described above in Example 70): Serial dilutions of Compond 70 were prepared and added in quantities of 0.5 ml. to 4 ml. of egg infusion medium. These preparations were inoculated with *Endamoeba histolytica* obtained from the base of cultures on Boeck-Drbohlav medium after incubation at 36° C. for 30 to 44 hours. Appropriate culture controls were prepared, and all species were incubated at 36° C. At intervals of 30 to 48 hours one or more drops of sediment from each tube were examined microscopically, on a warm stage, and the number of active trophozoites was determined. All tubes of culture which were negative after 48 hours of incubation were re-examined to confirm the findings. The results in these studies indicate that the activity titer of Compound 70 in vitro against *Endamoeba histolytica* is 1:17,500,000.

Other di-(halogenated-alkanamides) of my invention when tested in vitro against *Endamoeba histolytica* following the above-described procedure were found to have the amebacidal titers given in Table D. The number of each compound, as with Compound 70, corresponds to the number of the foregoing example describing the preparation of the particular compound.

TABLE D

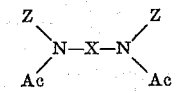

| No. | Z | Ac | X | In vitro Amebacidal Titer |
|---|---|---|---|---|
| 68B | C₃H₇-i | COCH₂Cl | 1,4-bis(CH₂)-phenylene | 1:10 million. |
| 47B | (CH₂)₂OC₂H₅ | COCHCl₂ | 1,4-bis(CH₂)-phenylene | 1:10 million. |
| 72 | C₂H₅ | COCHBr₂ | 1,4-bis(CH₂)-phenylene | 1:1 million. |
| 109 | C₂H₅ | COCHCl₂ | 2-Cl-1,4-bis(CH₂)-phenylene | 1:5 million. |
| 76 | C₂H₅ | COCHCl₂ | (CH₂)₆ | 1:40 million. |
| 90 | C₂H₅ | COCHCl₂ | (CH₂)₁₀ | 1:8 million. |
| 82 | C₃H₇-l | COCHCl₂ | (CH₂)₆ | 1:15 million. |

A number of the di-(halogenated-alkanamides) of the foregoing examples, in particular, di-(dichloroalkanamides), when administered subcutaneously in an oil suspension to sexually mature male rats treated concurrently with a gonadal hormone were found to exhibit gonadal hormone potentiating effects and when administered orally in gum tragacanth suspension to sexually mature male rate were found to have antispermatogenic activity.

A test for gonadal hormone potentiating activity was carried out as follows: The compound to be tested is administered subcutaneously in a vehicle of cottonseed oil containing 10% ethyl alcohol to sexually mature male rats that receive concurrently a standard dose of the estrogen, diethylstilbestrol dipalmitate. Injections are given once daily, six days a week for two weeks. At autopsy the weights of the testes and sex accessory organs of rats which received the test compound and estrogen are compared with those of the group of rats which were given only estrogen. A significant decrease in the weights of the testes and sex accessory organs is used as an index to the estrogen-potentiating properties of the test compound. This procedure and the results obtained are illustrated by the following testing of N,N'-bis(dichloroacetyl) - N,N' - diethyl -1,6 - hexanediamine, hereinafter referred to as Compound 76 (synthesis described above in Example 76): Compound 76 (50 mg./kg.) and diethylstilbestrol dipalmitate (0.1 mg./kg.) were each placed in 0.2 cc. of cottonseed oil containing 10% ethyl alcohol and injected subcutaneously at different sites into sexually mature male Sprague-Dawley rats weighing approximately 165 grams. This same medication was given once daily, six days a week, for two weeks. Within 24 hours after the last medication, all of the rats were sacrified. The testes, ventral prostate, seminal vesicles, thymus, adrenals, and pituitary were removed and weighed on a microtorsion balance. Compound 76 thus tested was found to increase the testicular and sex accessory organ atrophy as well as the body weight loss induced by the administration of estrogen to the mature male intact rats, as summarized in Table E.

TABLE G

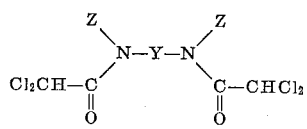

| No. | Z | Y | Percent Activity [a] |
|---|---|---|---|
| 133 | H | (CH₂)₂—S—(CH₂)₂ | 40 |
| 134 | C₂H₅ | (CH₂)₂—S—(CH₂)₂ | 10 |
| 136 | H | (CH₂)₃—NH—(CH₂)₃ | 10 |
| 140 | C₂H₅ | CH₂CH—CHCH₂ | 10 |
| 141 | H | (CH₂)₂NH(CH₂)₄NH(CH₂)₃ | 12 |
| 124 | C₂H₅ | 1,4-bis(CH₂)-cyclohexylene | 10 |
| 70 | C₂H₅ | 1,4-bis(CH₂)-phenylene | 80–100 |
| 69B | CH₃ | 1,4-bis(CH₂)-phenylene | 80–100 |
| 109 | C₂H₅ | 2-Cl-1,4-bis(CH₂)-phenylene | 100 |

[a] Based on Compound 76 as 100%.

TABLE E.—POTENTIATION OF ESTROGEN-INDUCED ENDOCRINOPATHIES IN MATURE MALE RATS BY THE CONCURRENT ADMINISTRATION OF COMPOUND 76

| Test | Body Weight (grams) | | Average Organ Weights (mgs.) | | | | | |
|---|---|---|---|---|---|---|---|---|
| | Initial | Final | Pituitary | Adrenal | Thymus | Testes | Seminal Vesicles | Ventral Prostate |
| (1) | 166 | 291 | 10.9 | 43.7 | 515 | 2.82 | 212.1 | 183.5 |
| (2) | 163 | 257 | 11.0 | 43.2 | 448 | 2.93 | 151.4 | 144.5 |
| (3) | 165 | 206 | 9.0 | 34.2 | 304 | 1.95 | 90.4 | 91.9 |

(1) 10% alcohol-oil vehicle (0.2 cc./kg./day for 12 days) using 6 rats.
(2) Same as (1) plus diethylstilbestrol (0.1 mg./kg./day for 12 days) using 5 rats.
(3) Same as (2) plus Compound 76 (50 mg./kg./day for 12 days) using 5 rats.

Other compounds tested by the above-described procedure and found to potentiate estrogen-induced endocrinopathies in mature male rats are listed in Tables F and G with their relative activities given percentagewise in terms of Compound 76 as 100%. The number of each compound, as with Compound 76, corresponds to the number of the foregoing example describing the preparation of the particular compound.

TABLE F

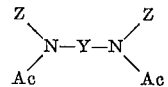

| No. | Z | Ac | Y | Percent Activity [a] |
|---|---|---|---|---|
| 77 | C₂H₅ | COCHCl₂ | (CH₂)₃ | 40 |
| 78 | C₂H₅ | COCHCl₂ | (CH₂)₄ | 35 |
| 79 | C₂H₅ | COCHCl₂ | (CH₂)₅ | 10 |
| 80 | CH₃ | COCHCl₂ | (CH₂)₆ | 50 |
| 83 | n-C₃H₇ | COCHCl₂ | (CH₂)₆ | 50 |
| 84 | n-C₄H₉ | COCHCl₂ | (CH₂)₆ | 10 |
| 87 | (CH₂)₂OC₂H₅ | COCHCl₂ | (CH₂)₆ | 20 |
| 89 | C₂H₅ | COCCl₃ | (CH₂)₆ | 25 |
| 91 | C₂H₅ | COCHCl₂ | (b) | 110 |
| 92 | C₂H₅ | COCHCl₂ | (CH₂)₇ | 100–200 |
| 93 | C₂H₅ | COCHCl₂ | (CH₂)₈ | 100–200 |
| 94 | C₂H₅ | COCHCl₂ | (CH₂)₉ | 200 |
| 90 | C₂H₅ | COCHCl₂ | (CH₂)₁₀ | 25 |
| 97 | H | COCHCl₂ | (CH₂)₂ | 12 |
| 98 | H | COCHCl₂ | (CH₂)₃ | 40 |
| 99 | H | COCHCl₂ | (CH₂)₄ | 30 |
| 100 | H | COCHCl₂ | (CH₂)₅ | 25 |
| (c) | H | COCCl₃ | (CH₂)₆ | 100 |
| 102 | H | COCCl₃ | (CH₂)₆ | 20 |
| 103 | H | COCHCl₂ | (CH₂)₇ | 250–600 |
| 104 | H | COCCl₂ | (CH₂)₈ | 250–600 |
| 105 | H | COCHCl₂ | (CH₂)₉ | 100 |
| 106 | H | COCHCl₂ | (CH₂)₁₀ | 33 |
| 76 | C₂H₅ | COCHCl₂ | (CH₂)₆ | 100 |

[a] Based on Compound 76 as 100%.
[b] Y=CH₂CH₂CH(CH₃)CH₂CH₂CH₂.
[c] Compound previously disclosed in the literature.

The estrogen-potentiating effect of Compound 76 and the compounds of Tables F and G is an indication also of their antispermatogenic activity. Another test, mentioned above, for testing antispermatogenic activity was carried out by oral administration of the test compound as follows: Graded doses of the test compound were administered orally to groups of 5 or 6 reproductivity mature male rats each weighing 175 to 200 grams. Medication was given by stomach tube as a suspension in one percent gum tragacanth, and dosage was adjusted according to the weekly body weight gain of each rat. At the end of the 3-week medication period the rats were autopsied, and the seminal vesicles, testes, prostate, adrenals, pituitary and thymus were excised, cleaned and weighed on a microtorsion balance. The testes and adrenals were fixed in Zenker-formalin, imbedded in paraffin, sectioned at 6 microns, and stained with hemotoxylin and eosin for histopathologic study. The extent to which the test compound curtailed spermatogenesis was graded as follows: Slight effect—Noticeable suppression in the production of spermatids and late stage cells in many tubules when viewed at 100× magnification; moderate effect—Few, if any, spermatids present. Definite suppression in the development of secondary spermatocytes in many tubules when viewed at 430×magnification; marked effect—No spermatids or late stage cells present; and few, if any, primary spermatocytes present. The tubules show mainly Sertoli cells interspersed among spermatogenia at 430× magnification.

Compound 76 when tested by this procedure in an oral dose of 250 mg./kg./day, 6 days a week for 3 weeks produced marked testicular weight regression in reproductively mature male rats. At this dose level of Compound 76 there occurred at marked and selective impairment of spermatogenesis, unaccompanied by evidence of damage to architecture or curtailment of function of other cells of the body. The degree of antispermatogenic effects at lower doses was closely correlated with the degree of testicular weight regression. Doses of Compound 76 that produced a marked curtailment in spermatogenesis did not effect the weights of the seminal vesicles and prostate glands. At dose levels of 500 and 600 mg./kg./day, a moderate but statistically significant decrease occurred in the weight of the prostate without a corresponding change in the weight of the seminal vesicles. Compound 76 did not affect the body weight gain, behavior or appearance of the rats in this test.

Other compounds tested for antispermatogenic effect according to the above-described procedure and found to have moderate to marked effects at various dose levels are given in Table H.

TABLE H

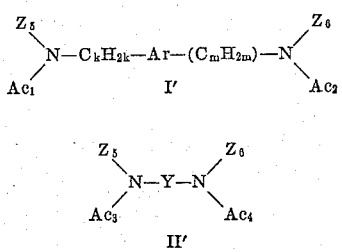

| No. | Z | Y | Dose level [a] mg./kg./day |
|---|---|---|---|
| 70 | $C_2H_5$ | 1,4-bis($CH_2$)-phenylene | 500–1,000 |
| 104 | H | $(CH_2)_8$ | 125 |
| ([b]) | H | $(CH_2)_6$ | 150–250 |
| 103 | H | $(CH_2)_7$ | 250 |
| 69B | $CH_3$ | 1,4-bis($CH_2$)-phenylene | 500–1,000 |
| 94 | $C_2H_5$ | $(CH_2)_9$ | [c] 125 |

[a] Moderate to marked effect at dose level given.
[b] See footnote (c) in Table F.
[c] Slight to moderate effect.

In addition to potentiating the action of estrogens in intact male rats, as illustrated above, the foregoing di-(halogenated-alkanamides) also have been found to potentiate the estrogenic activity of gonadal hormones in female rats with respects to vaginal cornification and uterine growth stimulation. The test procedures for determining this activity in castrated female rats were carried out by orally administering the di-(halogenated-alkanamides) as suspensions in one percent gum tragacanth once a day for two days for the vaginal cornification test and once a day for three days for the uterotrophic test, and the following results were obtained.

*Vaginal cornification.*—Diethylstilbestrol when given alone produced vaginal cornification within the dose levels of 0.002 to 0.010 mg./kg. When this estrogen was combined with Compound 70, i.e., N,N'-bis(dichloroacetyl)-N,N'-diethyl-1,4-bis(aminomethyl)benzene, the dose limits of the estrogen for comparable response were reduced to 0.00005 to 0.0004 mg./kg. using dose levels of Compound 70 ranging from 25 to 100 mg./kg. Thus, a 25 to 50 fold increase in the degree of activity of diethylstilbestrol was accomplished by merely giving the estrogen with 25 to 100 mg./kg. of Compound 70. This becomes even more striking in view of the observation that oral levels of Compound 70 to 125, 250 and 500 mg./kg., alone, were found not to effect the cellular characteristics of the vaginal epithelium as determined by vaginal smears. When tested by the same procedure, 100 mg./kg. of Compound 76, i.e., N,N'-bis(dichloroacetyl)-N,N'-diethyl-1,6-hexanediamine, administered in combination with 0.0004 mg./kg. of diethylstilbestrol (which was ineffective when given alone at this dose level) produced vaginal cornification in immature castrate female rats comparable to the response produced by a dose level of 0.1 mg./kg. of diethylstilbestrol alone in mature castrated female rats.

*Uterine response.*—The estrogen-induced growth response of the uterus of immature rats weighing 40 to 50 grams is also enhanced by concurrent administration of Compound 70. The oral dose ratio for equivalent uterine responses for diethylstilbestrol (at dose levels of 0.00025 to 0.00625 mg./kg.) administered alone and with Compound 70 (at a dose level of 100 mg./kg.) was found to be approximately 3:1.

The potentiating effect of the foregoing di-(halogenated-alkanamides on androgens is illustrated as follows: Methyltestosterone was administered orally to male rats at a dose level of 25 mg./kg./day for two weeks, alone and with 250 mg./kg./day, orally of Compound 70. At this dose level the methyltestosterone alone exerted no demonstable testicular degenerating effect. However, when this same amount of androgen was combined with 250 m./kg./day of Compound 70, marked testicular atrophy resulted with no change in sex accessory organ weights. This dose of Compound 70 did not significantly affect the testes when given alone over a three-week instead of a two-week period.

Another aspect of my invention resides in a composition of matter comprising, as an essential ingredient, a di-(halogenated-alkanamide) in a pharmaceutical carrier, said di-(halogenated-alkanamide) being selected from the group consisting of compounds having the Formulas I' and II'

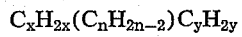

and where $k$ and $m$ each are numbers from 0 to 6 inclusive; $C_kH_{2k}$ and $C_mH_{2m}$ each represent lower-alkylene when $k$ and $m$ each are from 1 to 6; Ar is a lower-divalent aromatic radical; $Ac_1$ and $Ac_2$ each are halogenated-(lower-alkanoyl); $Z_5$ and $Z_6$ each are members selected from the group consisting of hydrogen, hydrocarbon radicals of the formula R, hydroxyalkyl radicals of the formula —$Y_2$—OH, hydrocarbonoxyalkyl radicals of the formula —$Y_2$—O—R, acyloxyalkyl radicals of the formula —$Y_2$—O—Ac', cyanoalkyl radicals of the formula —$Y_2$—CN and carbamylalkyl radicals of the formula —$Y_2$—$CONH_2$ where $Y_2$ is alkylene having from two to six carbon atoms and having its two free valence bonds on different carbon atoms, R is a hydrocarbon radical having from one to eight carbon atoms and Ac' is carboxylic-acyl having from one to eight carbon atoms; Y is selected from the group consisting of $$C_xH_{2x}(C_nH_{2n-2})C_yH_{2y}$$

and alkylene having from two to sixteen carbon atoms which can be interrupted by members selected from the group consisting of O, S, SO, $SO_2$, NH, N(lower-alkyl), N(lower-alkenyl), N(lower-alkynyl, N[halogenated-(lower-alkanoyl)] CH=CH and C≡C, where $x$ and $y$ each are numbers from 0 to 6 inclusive and $n$ is an integer from 3 to 8 inclusive, $C_xH_{2x}$ and $C_yH_{2y}$ each representing lower-alkylene when $x$ and $y$ each are from 1 to 6 and $C_nH_{2n-2}$ representing cycloalkylene; and, $Ac_3$ and $Ac_4$ each are halogenated-(lower-alkanoyl) having from two to three halogen atoms.

It will be noted that the above Formulas I' and II" comprehend not only my novel di-(halogenated-alkanamides) represented hereinabove by Formulas I, II, III, IV, V, VI and VII but also certain known di-(halogenated-alkanamides) as well as other di-(halogenated-alkanamides) related to the known compounds. Illustrative of said known compounds are N,N'-bis(dichloroacetyl)-1,6-hexanediamine and N,N'-bis(chloroacetyl)-N,N'-dimethyl-1,4-phenylenediamine, which have the pharmaceutical properties herein disclosed, i.e., mebacidal activity, gonadal hormone potentiating effects and antispermatogenic properties.

Preferred compositions of my invention are those in which the di-(halogenated-alkanamide) is the compound having the Formula I' where $Z_5$ and $Z_6$ each are alkyl having from one to eight carbon atoms, $C_kH_{2k}$ and $C_mH_{2m}$ each are $CH_2$ and Ar is a lower-divalent-aromatic radical of the benzene series; and those in which the di-(halogenated-alkanamide) is the compound having Formula II' where Y is alkylene having from two to sixteen carbon atoms, and $Z_5$ and $Z_6$ each are either H or alkyl having from one to eight carbon atoms.

By a "pharmaceutical carrier," as used hereinabove and in the claims, I means any pharmaceutically-acceptable vehicle suitable in formulating my compositions, e.g., solid, oily, aqueous and other non-aqueous vehicles. The nature of the pharmaceutical carrier can vary widely, depending upon the intended use and/or route of administration of the composition. For example, the di-(halogenated-alkanamides) are conveniently administered orally in solid form with the aid of a solid carrier. Thus, the compounds can be formulated in unit dosage form as tablets in combination with an adjuvant such as one or more of the following: calcium carbonate, starch, gelatain, talc, magnesium stearate, acacia, and the like, or, alternatively, they can be employed in capsule form either alone or admixed with a solid adjuvant. Alternatively, for oral administration, the di-(halogenated-alkanamide) can be dissolved or suspended in a pharmaceutically-acceptable oil or suspended in an aqueous vehicle.

If the composition is to be administered parenterally by injection, the pharmaceutical carrier can be an aqueous solution of a surfactant of thickening agent in which the di-(halogenated-alkanamide) in finely divided form produces a stable suspension. Other ingredients may be present if desired, such as sodium chloride to make the solution isotonic, buffers to control pH, germicidal agents, and the like.

Non-aqueous compositions for intramuscular injection can be prepared by dissolving or suspending the di-(halogenated-alkanamide) in a pharmaceutically-acceptable oil, e.g., peanut oil, cottonseed oil, olive oil, and the like. Other non-aqueous solvents which can be employed are for example absolute ethanol, dodecyl alcohol, dimethylformamide and dimethylacetamide.

Examples of such compositions have already been given in the section supra following Example 235. The following additional specific compositions will further illustrate my invention without limiting it thereto. Illustrative of a tablet formulation is one weighing 660 mg. and containing 500 mg. of N,N'-bis(dichloroacetyl)-N,N'-bis(2-hydroxyethyl)-1,4-bis(aminomethyl)benzene, 25 mg. of calcium carbonate as a diluent, 90 mg. of starch as a disintegrator, 30 mg. of gelatin as a binder and 15 mg. of talcum as a lubricant. Illustrative of a capsule formulation is one containing 500 mg. of N'N'-bis(dichloroacetyl)-N,N'-diethyl-1,4-bis-(aminomethyl)benzene, 40 mg. of starch and 10 mg. of talcum. The compounds can also be advantageously combined, when desired, with other active drugs, for example, chloroquine, stilbestrol, oxytetracycline, etc. Other tablet and capsule formulations can be made varying the quantities of adjuvants or using other di-(halogenated-alkanamides) as active ingredients, as for instance, the following: N,N'-bis(dichloroacetyl)-N,N'-diethyl-1,6-hexanediamine, N,N'-bis(dichloroacetyl) - 1,8 - octanediamine, N,N'-bis(dichloroacetyl)-1,6 - hexanediamine and N,N'-bis(chloroacetyl)-N,N'-dimethyl - 1,4 - phenylenediamine.

I claim:

1. An antispermatogenic and amebicidal composition comprising N,N'-bis-(dichloroacetyl)-1,6 - hexanediamine as the anti-spermatogenic and amebacidal ingredient and a pharmaceutical carrier.

2. An amebacidal composition comprising N,N'-bis-(chloroacetyl)-N,N'-dimethyl-1,4-phenylenediamine as the amebacidal ingredient and a pharmaceutical carrier.

3. The method of combatting amebic infestation in an animal host which comprises administering to said host a di(halogenated-alkanamide) selected from the group consisting of compounds having the formula

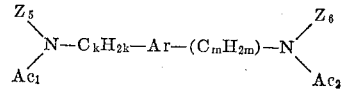

and

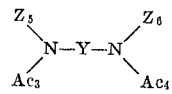

where $k$ and $m$ each are numbers from 0 to 6 inclusive; $C_kH_{2k}$ and $C_mH_{2m}$ each represent lower-alkylene when $k$ and $m$ each are from 1 to 6; Ar is a lower-divalent-aromatic radical; $Ac_1$ and $Ac_2$ each are halogenated-(lower-alkanoyl); $Z_5$ and $Z_6$ each are members selected from the group consisting of hydrogen, hydrocarbon radicals of the formula R, hydroxyalkyl radicals of the formula $-Y_2-OH$, hydrocarbonoxyalkyl radicals of the formula $-Y_2-O-R$, acyloxyalkyl radicals of the formula $-Y_2-O-Ac'$, cyanoalkyl radicals of the formula $-Y_2-CN$ and carbamyalkyl radicals of the formula $-Y_2-CONH_2$ where $Y_2$ is alkylene having from two to six carbon atoms and having its two free valence bonds on different carbon atoms, R is a hydrocarbon radical having from one to eight carbon atoms and Ac' is carboxylicacyl having from one to eight carbon atoms; Y is selected from the group consisting of $$C_xH_{2x}(C_nH_{2n-2})C_yH_{2y}$$

and alkylene having from two to sixteen carbon atoms which can be interrupted by members selected from the group consisting of O, S, SO, $SO_2$, NH, N(lower-alkyl), N(lower - alkenyl), N(lower - alkynyl), N[halogenated-(lower-alkanoyl)], CH=CH and C≡C, where $x$ and $y$ each are numbers from 0 to 6 inclusive and $n$ is an integer from 3 to 8 inclusive, $C_xH_{2x}$ and $C_yH_{2y}$ each representing lower-alkylene when $x$ and $y$ are each from 1 to 6 and $C_nH_{2n-2}$ representing cycloalkylene; and $A_3$ and $A_4$ are each halogenated-(lower-alkanoyl) having from two to three halogen atoms.

4. The method of combatting amebic infestation in an animal host which comprises administering to said host N,N'-bis(dichloroacetyl)-1,6-hexanediamine.

5. The method of inhibiting spermatogenesis in a male animal which comprises administering to said animal N,N'-bis(dichloroacetyl)-1,6-hexanediamine.

6. The method of combatting amebic infestation in an animal host which comprises administering to said host N,N'-bis(chloroacetyl)-N,N'-dimethyl - 1,4 - phenylenediamine.

References Cited

UNITED STATES PATENTS

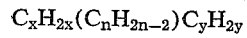 8/1964 Surrey _____ 260—490

ALBERT T. MEYERS, *Primary Examiner.*

SHELDON J. SINGER, *Assistant Examiner.*

UNITED STATES PATENT OFFICE
CERTIFICATE OF CORRECTION

Patent No. 3,332,845

July 25, 1967

Alexander R. Surrey

It is certified that error appears in the above identified patent and that said Letters Patent are hereby corrected as shown below:

Column 4, line 35, "-$CH_2CH_2CH_2SCH_2CH$-" should read -- -$CH_2CH_2CH_2SCH_2CH_2$- --. Column 6, line 3, "$Z_1,Z_2,Ar$" should read -- $Z_1,Z_2,Y_1,Ar$ --; line 64, "N,N'-1-diethyl" should read -- N,N'-diethyl --. Column 8, line 52, "bis(2-hydroethyl)-1,4-" should read -- bis(2-hydroxyethyl)-1,4- --. Column 10, line 35, "(aminoethyl)benzene" should read -- (aminomethyl)benzene --; line 42, "bis(dichloroacetyl-N,N'-" should read -- bis(dichloroacetyl)-N,N'- --; line 70, "N,N-disubstituted" should read -- N,N'-disubstituted --. Column 14, line 26, "(2-hydroxyethyl)-1,3-" should read -- (2-hydroxyethyl)-1,4- --. Column 24, line 40, "(2$NH_2$)" should read -- (Z$NH_2$) --. Column 25, line 44, "portions of 9 cc. of 20% aqueous sodium hydroxide" should read -- portions of 9 cc. of water, 9 cc. of 20% aqueous sodium hydroxide --. Column 28, line 15, "(2-hydroxyethyl-1,6" should read -- (2-hydroxyethyl)-1,6 --. Column 30, line 75, "(dichloroacetyl)-N,-diethyl" should read -- (dichloroacetyl)-N,N'-diethyl --. Column 31, line 51, "N,N'-1,12-" should read -- N,N'-diethyl-1,12- --; line 69, "N, 6.68" should read -- N, 6.69 --. Column 32, line 38, "160-8° C." should read -- 160.8° C. --. Column 35, line 10, "$C_{12}C_{19}ClN.2HCl$:" should read -- $C_{12}H_{19}ClN_2.2HCl$: --; line 21, "bisaminomethyl)" should read -- bis(aminomethyl) --; line 55, "$C_{20}H_{20}Cl_4N_3O_2$:" should read -- $C_{20}H_{20}Cl_4N_2O_2$: --. Column 39, line 48, "dimethyl" should read -- diethyl --; line 50, "oriceti" should read -- criceti --. Column 40, line 66, "Found: 33.25;" should read -- Found: Cl, 33.25; --. Column 41, line 5, "-dietryl-" should read -- -diethyl- --. Column 42, line 16, "mode" should read -- more --; lines 20 and 21, "twice 1N" should read -- twice with 1N --; line 53, "1N" should read -- 1N --. Column 43, line 10, "N,N'-dis" should read -- N,N'-bis --. Column 44, line 38, "(dichloroacetyl" should read -- (dichloroacetyl) --; line 49, "(dichloroacetyl" should read -- (dichloroacetyl) --. Column 45, line 73, "clean" should read -- clear --. Column 47, line 52, "252.6-255-6°" should read -- 252.6-255.6° --. Column 50, line 9, "(aminoethyl)" should read -- (aminomethyl) --. Column 52, line 63, "(2-aminoethyl)sulfoxide" should read -- (2-aminoethyl)sulfide --. Columns 59 and 60, TABLE E, footnote 2 thereof, "diethylstibestrol" should read -- diethylstilbestrol --. Column 62, lines 6 and 7, "demonstable" should read -- demonstrable --; line 8, "250 m./kg." should read -- 250 mg./kg. --; line 61, "II″" should read -- II′ --; line 70, "mebacidal" should read -- amebacidal --. Column 64, line 34, "carboxylicacyl" should read -- carboxylic-acyl --.

Signed and sealed this 24th day of February 1970.

(SEAL)
Attest:

EDWARD M. FLETCHER, JR.
Attesting Officer

WILLIAM E. SCHUYLER, JR.
Commissioner of Patents